United States Patent
Tokunaga et al.

(10) Patent No.: US 12,204,603 B2
(45) Date of Patent: Jan. 21, 2025

(54) WEB PAGE PROCESSING APPARATUS AND METHOD USING BLOCK INFORMATION WITHIN WEB

(71) Applicant: PLAID, INC., Tokyo (JP)

(72) Inventors: Takahiro Tokunaga, Tokyo (JP); Yuichi Yabu, Tokyo (JP); Takami Yamada, Tokyo (JP); Kazuhiro Kimura, Tokyo (JP); Ryosuke Suzuki, Tokyo (JP); Naoya Muto, Tokyo (JP); Hirofumi Tanahashi, Tokyo (JP); Minori Tokuda, Tokyo (JP)

(73) Assignee: PLAID, INC., Tokyo (JP)

( * ) Notice: Subject to any disclaimer, the term of this patent is extended or adjusted under 35 U.S.C. 154(b) by 0 days.

(21) Appl. No.: 18/007,193

(22) PCT Filed: Jun. 2, 2021

(86) PCT No.: PCT/JP2021/020943
§ 371 (c)(1),
(2) Date: Jan. 27, 2023

(87) PCT Pub. No.: WO2022/024545
PCT Pub. Date: Feb. 3, 2022

(65) Prior Publication Data
US 2023/0237118 A1    Jul. 27, 2023

(30) Foreign Application Priority Data
Jul. 29, 2020   (JP) ................. 2020-128147

(51) Int. Cl.
*G06F 16/958* (2019.01)
*G06F 40/143* (2020.01)
*G06F 40/166* (2020.01)

(52) U.S. Cl.
CPC .......... *G06F 16/958* (2019.01); *G06F 40/143* (2020.01); *G06F 40/166* (2020.01)

(58) Field of Classification Search
None
See application file for complete search history.

(56) References Cited

U.S. PATENT DOCUMENTS 7,594,189 B1 * 9/2009 Walker ................... G06Q 30/02
715/811
8,914,736 B2 * 12/2014 Cardasco .............. G06F 16/958
715/744

(Continued)

FOREIGN PATENT DOCUMENTS

JP    2010-102621 A    5/2010
JP    2017-523535 A    8/2017

(Continued)

OTHER PUBLICATIONS

Grady, "Random Walks for Image Segmentation" IEEE Transactions on Pattern Analysis and Machine Intelligence, vol. 28, No. 11, Nov. 2006, pp. 1768-1783. (Year: 2006).*

(Continued)

Primary Examiner — Amelia L Tapp
(74) Attorney, Agent, or Firm — Rimon P.C.

(57) ABSTRACT

In order to solve a conventional problem that it is not possible to manage partial content in a webpage as a block and execute processing on the block, a webpage processing apparatus includes: a block information storage unit in which one or more pieces of block information each having a block identifier for identifying a block, which is partial content in a webpage, and location identifying information for specifying a location of the block in the webpage are stored; a block processing unit that executes block processing, which is processing regarding a block specified with block information, using location identifying information (Continued)

contained in any one of the one or more pieces of block information; and a result output unit that outputs a block processing result, which is a result of the block processing. Accordingly, it is possible to manage a block, which is partial content in a webpage, and execute processing on the block.

13 Claims, 40 Drawing Sheets

(56) References Cited

U.S. PATENT DOCUMENTS

| | | | | |
|---|---|---|---|---|
| 9,275,133 | B1* | 3/2016 | Kirillov | G06F 16/35 |
| 9,762,971 | B1* | 9/2017 | Dodge | H04N 21/4532 |
| 10,198,524 | B1* | 2/2019 | Amalapurapu | G06F 16/958 |
| 2005/0267869 | A1* | 12/2005 | Horvitz | G06Q 30/0256 |
| 2010/0107053 | A1 | 4/2010 | Kanzaki | |
| 2013/0326406 | A1* | 12/2013 | Reiley | G06F 3/048 |
| | | | | 707/723 |
| 2014/0278308 | A1* | 9/2014 | Liu | G06F 16/958 |
| | | | | 703/6 |
| 2015/0177940 | A1* | 6/2015 | Trevino | H04L 67/02 |
| | | | | 715/716 |
| 2021/0158398 | A1* | 5/2021 | Merrill | G06Q 30/0277 |

FOREIGN PATENT DOCUMENTS

| | | | | |
|---|---|---|---|---|
| WO | WO-2008022328 A2 * | 2/2008 | | G06F 16/437 |
| WO | WO-2009120004 A2 * | 10/2009 | | G06F 16/00 |
| WO | 2015-172228 A1 | 11/2015 | | |

OTHER PUBLICATIONS

International Search Report issued in corresponding International Application No. PCT/JP2021/020943 dated Aug. 17, 2021, w/ English Translation (5 pages).

Office Action issued in corresponding Japanese Application No. 2020-128147 dated Dec. 15, 2020, w/ English Translation (7 pages).

* cited by examiner

| User identifier | Static attribute value | | | | | | Dynamic attribute value | | | | | | | |
|---|---|---|---|---|---|---|---|---|---|---|---|---|---|---|
| | Name | E-mail address | Gender | Age | Unmarried /Married | Place of birth | Member | ... | Real-time dynamic attribute value | | | Historical-information-using dynamic attribute value | | |
| | | | | | | | | | Time spent (sec) | Number of pages viewed | ... | Number of visits | Number of purchases | Purchase total (yen) | Average number of PVs | Score | ... |
| 1 | A-o Yamada | ya@x.jp | M | 27 | Unmarried | Aomori | 0 | ... | 128 | 3 | ... | 21 | 5 | 23,000 | 10 | 42 | ... |
| 2 | B-o Ota | ob@y.com | M | 25 | Married | Chiba | 1 | ... | 321 | 8 | ... | 19 | 7 | 127,500 | 7 | 99 | ... |
| 3 | C-suke Tanaka | tc@z.co.jp | M | 48 | Married | Tokyo | 1 | ... | 57 | 2 | ... | 8 | 3 | 81,300 | 11 | 99 | ... |
| ... | ... | ... | ... | ... | ... | ... | ... | ... | ... | ... | ... | ... | ... | ... | ... | ... | ... |

FIG.9

| ID | Condition | Processing execution time | Processing identifier |
|---|---|---|---|
| 1 | \<Age\> 20s<br>\<Number of purchases\> 5 or more time<br>\<Score\> 70 or more | During login | sendmessage("We will send you a coupon to support you");<br>send(coupon); |
| 2 | \<Time spent\> 180 seconds or more<br>\<Member\> 1<br>\<Score\> 50 or more | - | sendmessage("May I help you? Please contact AA if you have any problems"); |
| ... | ... | ... | ... |

FIG.10

| ID | User identifier | Date/time | Operation type identifier | Operation information |
|---|---|---|---|---|
| ... | ... | ... | ... | ... |
| 638 | 1 | 2017/2/4 17:42 | a | Exited from the site |
| ... | ... | ... | ... | ... |
| 821 | 1 | 2017/2/5 10:40 | a | Started viewing of the site |
| 822 | 1 | 2017/2/5 10:40 | b | Displayed customer service "Notice of *Marketo-cooperation* (PLAID page): *hie plan*" |
| ... | ... | ... | ... | ... |
| 848 | 1 | 2017/2/5 10:40 | b | Closed "Notice of *Marketo-cooperation* (PLAID page): *hie plan*" |
| ... | ... | ... | ... | ... |
| 911 | 1 | 2017/2/5 10:42 | a | Viewing "Best ... for customers" |
| 912 | 1 | 2017/2/5 10:42 | b | Displayed customer service "Guide from PC resident *Widget-plaid.co.jp* to *Karate.io*: *dv-plan*" |
| ... | ... | ... | ... | ... |

FIG.11

```
<Page identifier> karte.io
<Block information>
  <Area name> key message
  <CSS selector>body>div:nth-of-type(2)>div:nth-of-type(1)>
div:nth-of-type(2)>>h1
  <Segment condition name> number of visits: three or more times
  <Segment condition> number of visits >= 3
    <Partial content> CX platform KARTE
<Block information>
  <Area name> key visual
  <CSS selector>body>div:nth-of-type(2)>div:nth-of-type(2)>
div:nth-of-type(1)> div:nth-of-type(2)>>h2
  <Segment condition name> search-access user
  <Segment condition>"google.com"
    <Probability condition>50%
      <Partial content>
```

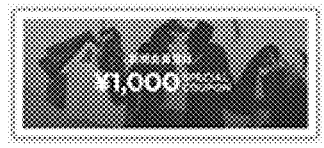

```
    <Probability condition>50%
      <Partial content>
```

FIG.34

WEB PAGE PROCESSING APPARATUS AND METHOD USING BLOCK INFORMATION WITHIN WEB

CROSS REFERENCE TO RELATED APPLICATIONS

This application is the U.S. National Phase under 35 U.S.C. § 371 of International Application No. PCT/JP2021/020943, filed on Jun. 2, 2021, which in turn claims the benefit of Japanese Application No. 2020-128147, filed on Jul. 29, 2020, the entire contents of each are hereby incorporated by reference.

TECHNICAL FIELD

The present invention relates to a webpage processing apparatus and the like for executing processing on a webpage.

BACKGROUND ART

Conventionally, there have been techniques that provide conventional functions such as cutting, copying, and pasting, and allow users to directly edit, operate, and create a webpage using tools for direct operations within a website, wherein the webpage is automatically updated on the Internet when changes are completed (see Patent Document 1, for example).

CITATION LIST

Patent Document

Patent Document 1: JP 2017-52335A (Tokuhyo)

SUMMARY OF INVENTION

Technical Problem

However, in conventional techniques, it is not possible to manage partial content in a webpage as a block and execute processing on the block.

Solution to Problem

A first aspect of the present invention is directed to a webpage processing apparatus including: a block information storage unit in which one or more pieces of block information each having a block identifier for identifying a block, which is partial content in a webpage, and location identifying information for specifying a location of the block in the webpage are stored; a block processing unit that executes block processing, which is processing regarding a block specified with block information, using location identifying information contained in any one of the one or more pieces of block information; and a result output unit that outputs a block processing result, which is a result of the block processing.

With this configuration, it is possible to manage a block, which is partial content in a webpage, and execute processing on the block.

Furthermore, a second aspect of the present invention is directed to the webpage processing apparatus according to the first aspect, wherein the block information has block operation information on a user's operation on the block, the webpage processing apparatus further includes an operation information receiving unit that receives operation information, which is information on a user's operation on the webpage and is information containing operation specifying information for specifying operation content and target specifying information for specifying an operation target, from a user terminal of a user who is a visitor to the webpage, the block processing unit includes: a block specifying part that specifies a block corresponding to the target specifying information contained in the operation information; and a block operation information acquiring part that acquires a block processing result, which is block operation information on an operation on the block corresponding to the target specifying information that is paired with the operation specifying information, using the operation specifying information contained in the operation information, and the result output unit accumulates the block operation information in the block information storage unit in a pair with a block identifier for identifying the block specified by the block specifying part.

With this configuration, it is possible to acquire information for analyzing a user's operation on a block.

Furthermore, a third aspect of the present invention is directed to the webpage processing apparatus according to the first aspect, wherein the block information has two or more different pieces of partial content, the webpage processing apparatus further includes an output instruction receiving unit that receives an output instruction on a webpage, the block processing unit includes: a partial content selecting part that selects, in a block corresponding to block information having two or more pieces of partial content out of block information corresponding to the webpage corresponding to the output instruction, one piece of partial content out of the two or more pieces of partial content contained in the block information; and an output page processing part that executes processing for outputting the webpage containing the partial content selected by the partial content selecting part, thereby acquiring a block processing result, and the result output unit outputs the block processing result.

With this configuration, it is possible to output a webpage in which one piece of partial content is selected out of the two or more pieces of partial content corresponding to the block.

Furthermore, a fourth aspect of the present invention is directed to the webpage processing apparatus according to the third aspect, further including: a user information storage unit in which two or more pieces of user information, each of which is information on a user and is information having one or more attribute values of the user, are stored; an operation information receiving unit that receives operation information, which is information on a user's operation on the webpage and is information containing operation specifying information for specifying operation content and target specifying information for specifying an operation target, from a user terminal of a user who is a visitor to the webpage; and an attribute value acquiring unit that acquires one or more attribute values of the user, using the operation information received by the operation information receiving unit, and accumulates the one or more attribute values in the user information storage unit, wherein each of the two or more pieces of partial content contained in the block information is associated with a segment condition, which is a condition regarding an attribute value, and the partial content selecting part acquires one or more attribute values contained in the user information of the user of the user terminal that transmitted the output instruction, from the user information storage unit, and selects partial content that is paired with a segment condition satisfied by the one or more attribute values.

With this configuration, it is possible to select one piece of partial content suitable for a user, out of the two or more pieces of partial content corresponding to the block.

Furthermore, a fifth aspect of the present invention is directed to the webpage processing apparatus according to the third or fourth aspect, wherein the partial content selecting part selects one piece of partial content at random out of the two or more pieces of partial content contained in the block information.

With this configuration, it is possible to select one piece of partial content at random out of the two or more pieces of partial content corresponding to the block.

Furthermore, a sixth aspect of the present invention is directed to the webpage processing apparatus according to the fifth aspect, wherein the block processing unit includes: a block specifying part that specifies partial content corresponding to the target specifying information contained in the operation information; and a block operation information acquiring part that acquires a block processing result, which is block operation information on an operation on partial content corresponding to the target specifying information that is paired with the operation specifying information, using the operation specifying information contained in the operation information, and the result output unit accumulates the block operation information in the block information storage unit in a pair with the partial content specified by the block specifying part.

With this configuration, it is possible to conduct A/B testing on a block-by-block basis.

Furthermore, a seventh aspect of the present invention is directed to the webpage processing apparatus according to the first aspect, wherein the block information has partial content, the webpage processing apparatus further includes an editing instruction receiving unit that receives an editing instruction on the partial content, the block processing unit includes a partial content editing part that changes the partial content corresponding to the editing instruction, according to the editing instruction, and the result output unit executes partial content output processing for outputting the webpage containing the partial content changed and acquired by the partial content editing part.

With this configuration, it is possible to edit a block.

Furthermore, an eighth aspect of the present invention is directed to the webpage processing apparatus according to any one of the first to seventh aspects, further including: a setting instruction receiving unit that receives a setting instruction, which is an instruction to add block information; and a block accumulating unit that configures block information according to the setting instruction and accumulates the block information in the block information storage unit.

With this configuration, it is possible to set block information.

Advantageous Effects of Invention

According to the webpage processing apparatus of the present invention, it is possible to manage a block, which is partial content in a webpage, and execute processing on the block.

BRIEF DESCRIPTION OF DRAWINGS

FIG. 9 is a diagram showing a user information management table in the embodiment.

FIG. 10 is a diagram showing a dynamic processing information management table in the embodiment.

FIG. 11 is a diagram showing an operation information management table in the embodiment.

FIG. 34 is a diagram showing an example of a setting instruction in the embodiment.

DESCRIPTION OF EMBODIMENT

Figure 1:
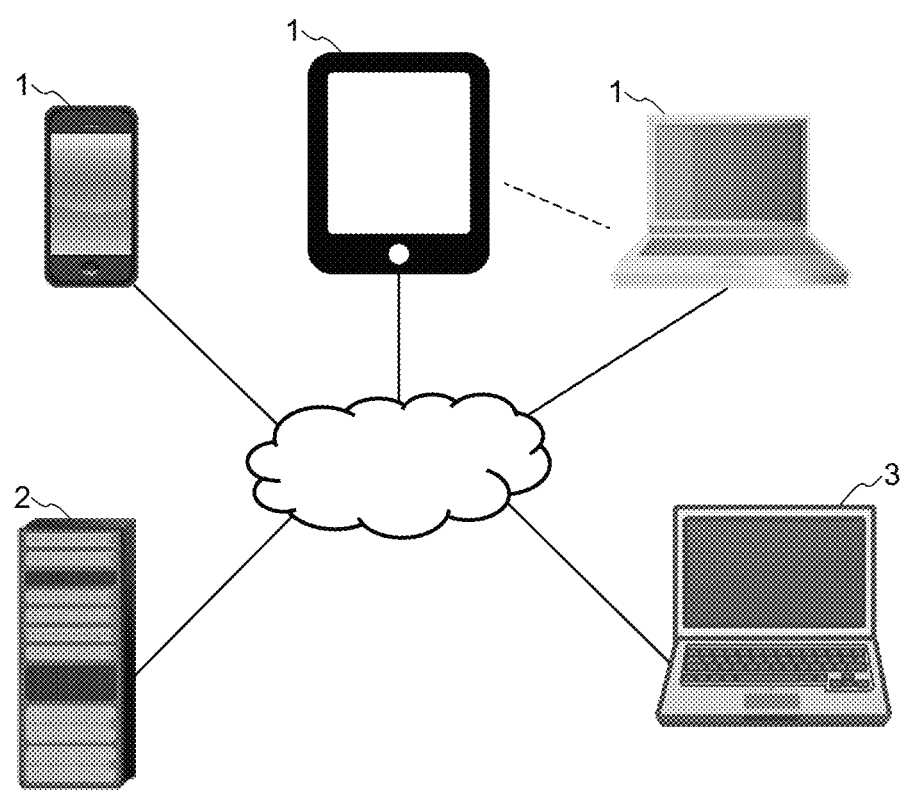
FIG. 1 is a conceptual diagram of an information system A in Embodiment 1.

Hereinafter, embodiments of the webpage processing apparatus and the like will be described with reference to the drawings. It should be noted that constituent elements denoted by the same reference numerals in the embodiments perform similar operations, and thus a description thereof may not be repeated.

Embodiment 1

In this embodiment, an information system including a server apparatus that detects and outputs an attribute value of a visitor to a website (hereinafter referred to as a "user" as appropriate) in real-time will be described.

Furthermore, in this embodiment, an information system including a server apparatus that automatically performs an action on a user whose attribute value satisfies a condition will be described.

Furthermore, in this embodiment, an information system including a server apparatus that performs an action on a specific user selected by an administrator will be described.

Furthermore, in this embodiment, an information system including a server apparatus that associates a non-logged-in user using his or her cookie ID with a logged-in user and acquires a user's attribute value using both pre-login operation information and post-login operation information will be described.

FIG. 1 is a conceptual diagram of an information system A in this embodiment. The information system A includes one or at least two user terminals 1, a server apparatus 2, and a management terminal 3. The user terminals 1 and the management terminal 3 are so-called personal computers, tablet devices, smartphones, or the like, for example, and there is no limitation on the type thereof. The server apparatus 2 is an ASP server, a cloud server, or the like, for example. Note that there is no limitation on the type of the server apparatus 2. The user terminals 1 and the server apparatus 2 can communicate with each other via a network such as the Internet. The server apparatus 2 and the management terminal 3 can communicate with each other via a network such as the Internet or a LAN.

Figure 2:
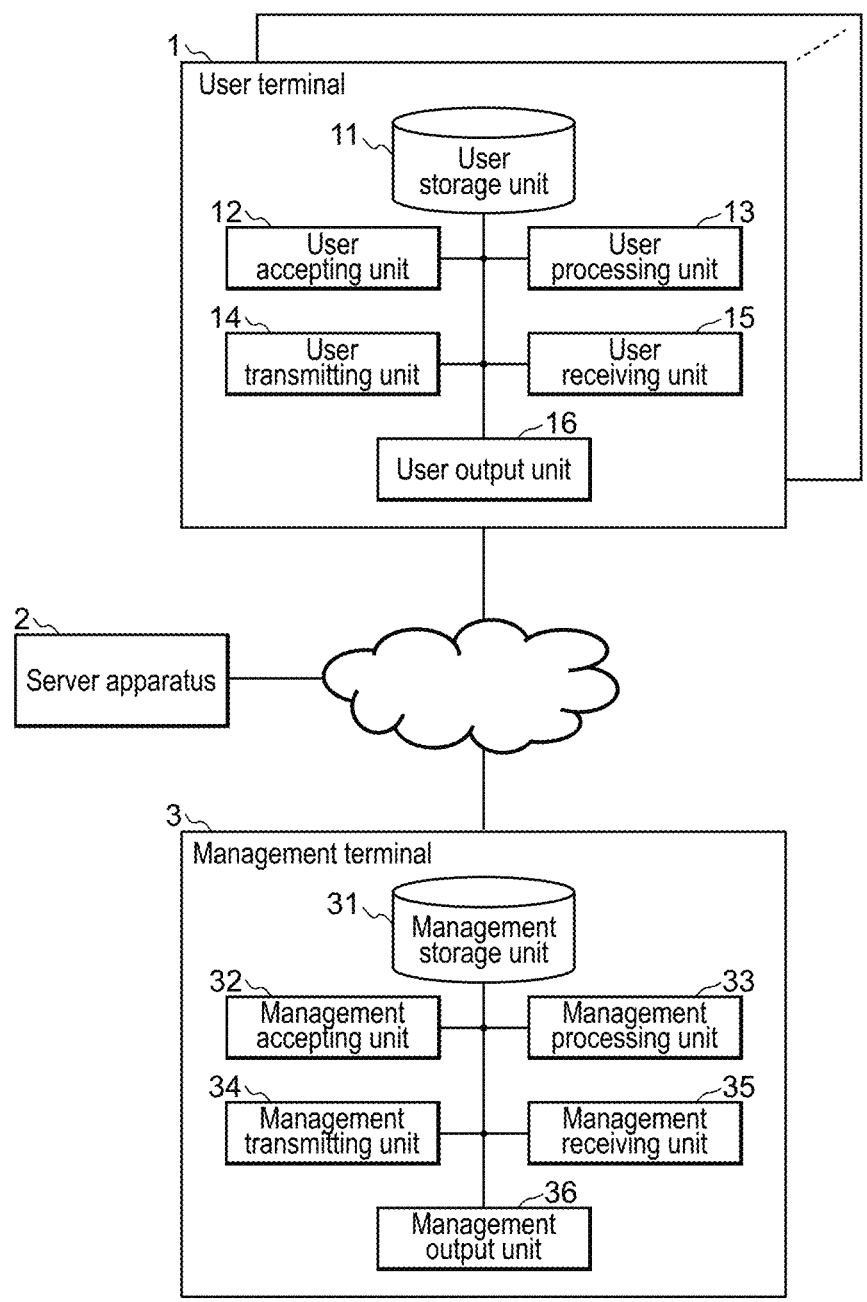
FIG. 2 is a block diagram of the information system A in the embodiment.
Figure 3:
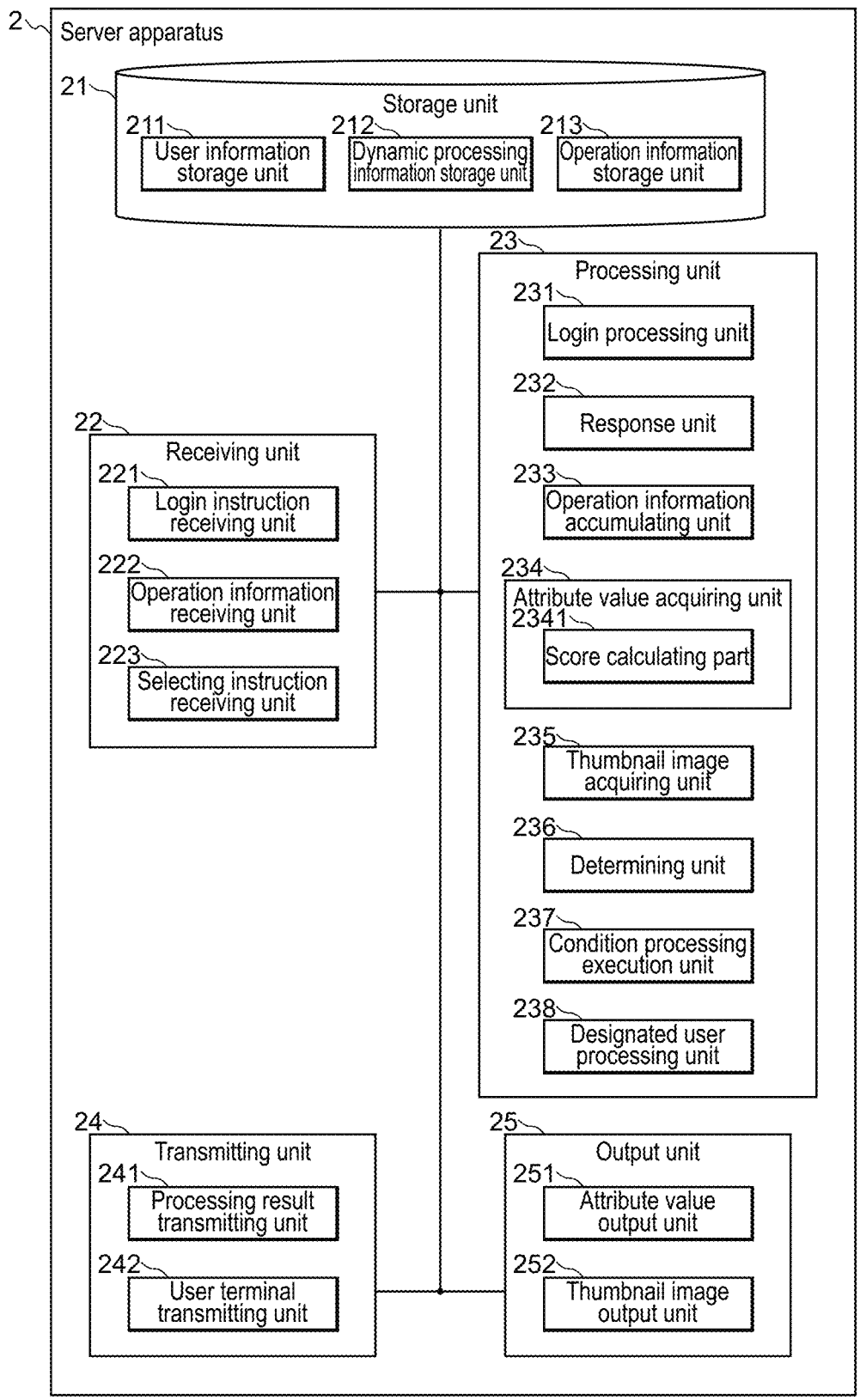
FIG. 3 is a block diagram of a server apparatus 2 in the embodiment.

FIG. 2 is a block diagram of the information system A in this embodiment. FIG. 3 is a block diagram of the server apparatus 2.

Each user terminal 1 includes a user storage unit 11, a user accepting unit 12, a user processing unit 13, a user transmitting unit 14, a user receiving unit 15, and a user output unit 16.

The server apparatus 2 includes a storage unit 21, a receiving unit 22, a processing unit 23, a transmitting unit 24, and an output unit 25. The storage unit 21 includes a user information storage unit 211, a dynamic processing information storage unit 212, and an operation information storage unit 213. The receiving unit 22 includes a login instruction receiving unit 221, an operation information receiving unit 222, and a selecting instruction receiving unit 223. The processing unit 23 includes a login processing unit 231, a response unit 232, an operation information accumulating unit 233, an attribute value acquiring unit 234, a thumbnail image acquiring unit 235, a determining unit 236, a condition processing execution unit 237, and a designated user processing unit 238. The attribute value acquiring unit 234 includes a score calculating part 2341. The transmitting unit 24 includes a processing result transmitting unit 241 and a user terminal transmitting unit 242. The output unit 25 includes an attribute value output unit 251 and a thumbnail image output unit 252.

The management terminal 3 includes a management storage unit 31, a management accepting unit 32, a management processing unit 33, a management transmitting unit 34, a management receiving unit 35, and a management output unit 36.

Various types of information are stored in the user storage unit 11 constituting the user terminal 1. The various types of information are a user identifier, a user terminal identifier, a user's attribute value, and the like, for example. The user identifier is information for identifying a user, and is an ID, for example. The user identifier may be a telephone number, a credit card number, an e-mail address, or the like. The user terminal identifier is information for identifying a user terminal 1, and is a cookie ID, a session identifier, an IP address, a MAC address, or the like, for example. The user's attribute value is a static attribute value such as the user's gender, age, or the like, for example.

The user accepting unit 12 accepts input of instructions, information, and the like from a user. The instructions, information, and the like are operation information, a login instruction, or the like, for example. The operation information is information on a user's operation on a website. The operation information is information indicating that a button was pressed, information indicating that an anchor was given, information on an operation to jump to another page, information entered in a field, or the like, for example. The operation information is "rightButtonON" (indicating that a right mouse button was clicked), "drug object A" (indicating that an object A was dragged), "<purchase product ID>123<quantity>3" (indicating that three products identified with 123 were purchased), "jump http://www.xxx.co.jp" (indicating that a webpage specified with URL "http://www.xxx.co.jp" was accessed), or the like, for example. The operation information in this case is typically information on a primitive operation, but it is preferably information with which the meaning or implication of the operation can be determined by a later-described administrator. That is to say, there is no limitation on the data structure, the information granularity, and the like of the operation information. The operation information is typically information for specifying an operation executed by a user, but may include information on processing executed by the server apparatus 2 as a result of an operation by a user. The login instruction is an instruction to log in. The login instruction has a user identifier, for example. The login instruction has a user identifier and a password, for example. The website may also be said to be a webpage. The website is an e-commerce site, for example. Note that there is no limitation on the type of website.

The instructions, information, and the like may be input by any device such as a touch panel, a keyboard, a mouse, or a menu screen. The user accepting unit 12 may be realized by a device driver for an input device such as a touch panel or a keyboard, control software for a menu screen, or the like.

The user processing unit 13 executes various types of processing. The various types of processing are processing for changing the instructions, information, and the like accepted by the user accepting unit 12 into instructions, information, and the like with a structure for transmission, processing for changing information received by the user receiving unit 15 into information with a structure for output, or the like, for example.

The user transmitting unit 14 transmits various types of information, instructions, and the like. The various types of information, instructions, and the like are operation information, a login instruction, or the like, for example. The user transmitting unit 14 typically transmits information, instructions, and the like to the server apparatus 2. The user transmitting unit 14 may transmit a user's attribute value in addition to the operation information. The user's attribute is stored in the user storage unit 11, and is the user's gender, age, or the like, for example. The user's attribute that is transmitted in this case is a static attribute value, for example.

Note that the user transmitting unit 14 may transmit information, instructions, and the like to an unshown second server apparatus. In this case, the operation information and the like are transmitted from the second server apparatus to the server apparatus 2. The second server apparatus will be described later.

The user receiving unit 15 receives various types of information. The various types of information are a processing result or a login processing result, for example. The processing result is information on a result of processing in the response unit 232, which will be described later. The processing result is a destination webpage, a panel with a result of a product purchase instruction, an error message, or the like, for example. The login processing result is information indicating whether the login processing was successful or unsuccessful, information on a webpage after login, or the like.

The user output unit 16 outputs various types of information. The various types of information are information received by the user receiving unit 15 and changed by the user processing unit 13 into information with a structure for output, for example, and are a processing result or a login processing result, for example.

The output in this case is typically display on a display screen, but may be considered to be a concept that encompasses projection using a projector, printing by a printer, output of a sound, transmission to an external apparatus, accumulation in a recording medium, delivery of a processing result to another processing apparatus or another program, and the like.

Various types of information are stored in the storage unit 21 constituting the server apparatus 2. The various types of information are later-described user information, later-described dynamic processing information, operation information, or information on an operation expression for calculating a score, for example.

Two or more pieces of user information are stored in the user information storage unit 211. The user information is information on a user, and has one or at least two attribute values. The one or more attribute values are typically static attribute values, but may include dynamic attribute values. The static attribute values are typically attribute values that do not change, but may be considered as attribute values that do not change from time to time. The static attribute values are a name, an age, an address, a telephone number, a credit card number, an e-mail address, a user terminal identifier, a user identifier, a password, or the like, for example. The user terminal identifier is information for identifying a user terminal 1, and is a cookie ID, a session identifier, an IP address, a MAC address, or the like, for example. The user identifier is information for identifying a user, and is an ID, for example. The user identifier may be a telephone number, a credit card number, an e-mail address, or the like. The dynamic attribute values are attribute values that may dynamically change in accordance with a user's operation or the like. The dynamic attribute values are a real-time dynamic attribute value or a historical-information-using dynamic attribute value, for example. The real-time dynamic attribute value is an attribute value that changes in real-time from time to time. The real-time dynamic attribute value is the time spent on a webpage by a currently visiting user, the number of webpages viewed during the current visit, or the like, for example. The historical-information-using dynamic attribute value is a dynamic attribute value acquired also using a history of operation information during previous visits. The historical-information-using dynamic attribute value is the number of purchases, a purchase price, a purchase total, an average time spent, the average number of PVs, the number of visits, a later-described score, or the like, for example.

One or at least two pieces of dynamic processing information are stored in the dynamic processing information storage unit 212. The dynamic processing information has a condition and a processing identifier for identifying processing that is executed in the case in which the condition is satisfied. The dynamic processing information may further have information for specifying the time to execute processing. In this case, the condition is a condition for determining to execute processing corresponding to the processing identifier. The condition is a condition related to one or more attribute values of a user. The condition is preferably a condition using one or more dynamic attribute values. Furthermore, the condition is preferably a condition using one or more real-time dynamic attribute values or one or more historical-information-using dynamic attribute values. The condition is "<age>20s, <number of purchases>5 or more times, <score>70 or more", or the like, for example. The processing identifier is an ID, a function name, a method name, an address of a program corresponding to the processing, or the like. The processing identifier may be an executable program. The processing identifier may be any information for executing processing corresponding to the condition.

One or more pieces of operation information are stored for each user in the operation information storage unit 213. One or more pieces of operation information are stored in the operation information storage unit 213 in association with a user identifier. The received operation information and the operation information stored in the operation information storage unit 213 may be different from each other. The operation information received by the operation information receiving unit 222 and the operation information accumulated in the operation information storage unit 213 may be different from each other in data structure or the like, for example. For example, if the operation information received by the operation information receiving unit 222 is information on a primitive operation (e.g., "rightButtonON"), for example, the operation information accumulated in the operation information storage unit 213 may be information with which the meaning or implication of the operation can be determined (e.g., "Page OO is displayed").

In this case, the processing unit 23 configures operation information that is to be stored in the operation information storage unit 213, using the received operation information.

The receiving unit 22 receives various types of information, instructions, and the like. The various types of information, instructions, and the like are a login instruction, operation information, or a selecting instruction, for example.

The login instruction receiving unit 221 receives a login instruction from the user terminal 1. The login instruction is an instruction to log in.

The operation information receiving unit 222 receives one or at least two pieces of operation information from the user terminal 1 of a user who is a visitor to a website. The operation information receiving unit 222 does not have to directly receive operation information from the user terminal 1. The operation information receiving unit 222 may receive operation information based on information input from the user terminal 1, from a later-described second server apparatus.

The selecting instruction receiving unit 223 receives a selecting instruction from the management terminal 3. The selecting instruction is an instruction to select a user. The selecting instruction typically has a user identifier. The selecting instruction may have a user terminal identifier. The details of an operation of the management terminal 3 will be described later. The management terminal 3 receives one or more attribute values output by the attribute value output unit 251, and outputs them to each of the two or more users.

The processing unit 23 executes various types of processing. The various types of processing are processing that is executed by the login processing unit 231 and the like. The processing unit 23 constantly acquires information on browsing of a user who is visiting a website. The information on browsing is the time spent on the website or webpage, the number of pages viewed, or the like. That is to say, for example, the processing unit 23 constantly measures the time spent on a website or webpage by a user who is visiting the website or webpage. The processing unit 23 executes product purchase processing, payment processing, and the like, based on the received operation information. The processing unit 23 updates user's dynamic attribute values based on the received operation information.

The login processing unit 231 executes login processing for the user of the user terminal 1 in response to a received login instruction. The execution of login processing is a known technique, and thus a detailed description thereof has been omitted. It is assumed that the execution of login processing typically includes transmission of a login processing result to the user terminal 1. The login processing unit 231 typically permits login and enables communication with the user terminal 1, upon receiving a valid user identifier or the like. The login processing unit 231 typically does not permit login and transmits an error message to the user terminal 1, upon receiving an invalid user identifier or the like. The login processing unit 231 preferably executes processing for associating a user identifier contained in a login instruction and a user terminal identifier. The user terminal identifier may be contained in the login instruction or may be received together with the login instruction.

The response unit 232 executes processing according to the received operation information. The processing according to the operation information is transmission of a webpage corresponding to the operation information, product purchase processing corresponding to the operation information, payment processing corresponding to the operation information, or the like, for example. There is no limitation on the processing, as long as it corresponds to the operation information. The response unit 232 executes processing and acquires a processing result. The processing result is a destination webpage, a panel with a result of a product purchase instruction, an error message, or the like, for example. The processing by the response unit 232 is a known technique, and thus a detailed description thereof has been omitted.

The operation information accumulating unit 233 accumulates the operation information received by the operation information receiving unit 222, in the operation information storage unit 213, in a pair with the user terminal identifier. The operation information accumulating unit 233 accumulates the operation information received by the operation information receiving unit 222, in the operation information storage unit 213, in a pair with the user identifier contained in the login instruction. The pairing with the user terminal identifier may be pairing with a user identifier.

The operation information accumulating unit 233 accumulates the operation information received by the operation information receiving unit 222, in the operation information storage unit 213, in association with the user terminal identifier received in a pair with the operation information, before the execution of login processing by the login processing unit 231. Note that receiving in pairs does not necessarily mean that the information have to be received at the same time.

The operation information accumulating unit 233 accumulates the operation information received by the operation information receiving unit 222, in the operation information storage unit 213, in association with the user terminal identifier or the user identifier received in a pair with the login instruction or the operation information, after the execution of login processing by the login processing unit 231.

The attribute value acquiring unit 234 acquires one or more attribute values of a user who is visiting a website. In this case, the one or more attribute values may include the above-described static attribute values or dynamic attribute values. The attribute value acquiring unit 234 acquires one or more attribute values of a user who is visiting a website, using the received one or more pieces of operation information. The attribute value acquiring unit 234 typically acquires one or more static attribute values from the user information storage unit 211. The attribute value acquiring unit 234 typically acquires one or more dynamic attribute values, using the received one or at least two pieces of operation information.

Furthermore, the attribute value acquiring unit 234 acquires one or more dynamic attribute values, which are attribute values that change dynamically, using the one or at least two pieces of operation information received by the operation information receiving unit 222.

The attribute value acquiring unit 234 acquires one or more attribute values of a user who is visiting a website, the one or more attribute values being distinctive enough to satisfy a predetermined condition compared with one or more attribute values of another user who is not the above-described user. In this case, the state in which the predetermined condition is satisfied means that (1) the ratio of people who have the same attribute value as the user's attribute value is less than or equal to a threshold value, (2) no other people have the same attribute value, (3) the number of people who have the same attribute value as the user's attribute value is less than or equal to a threshold value, (4) the user has the same attribute value as the attribute value stored in advance, and the like.

The attribute value acquiring unit 234 acquires, for one user terminal 1, one or more pieces of operation information accumulated before login and one or more pieces of operation information accumulated after login from the operation information storage unit 213, and acquires one or more attribute values using the acquired two or more pieces of operation information.

The score calculating part 2341 calculates a score of one user using two or more pieces of information out of one or more attribute values of the user and one or more pieces of operation information received by the operation information receiving unit 222 from the user terminal 1 of the user.

The score calculating part 2341 calculates a score using an increasing function whose parameters are one or more of the time spent on a website or a webpage, the number of purchases, the purchase price, the purchase total, the number of PVs, the average time spent, and the number of visits acquired by the attribute value acquiring unit 234, for example. The score is information indicating the importance of the user from the administrator's point of view, for example. The number of PVs is the number of page views.

The thumbnail image acquiring unit 235 acquires a thumbnail image for each user, using the one or more attribute values acquired by the attribute value acquiring unit 234. The thumbnail image acquiring unit 235 acquires an image corresponding to the user's gender and age from the storage unit 21, for example.

The thumbnail image acquiring unit 235 preferably acquires a thumbnail image for each user, using the one or more dynamic attribute values.

The thumbnail image acquiring unit 235 acquires a thumbnail image, using an attribute value such as the user's gender, age, or score, for example. The thumbnail image acquiring unit 235 acquires an original image corresponding to the user's gender and age from the storage unit 21, generates a score image corresponding to the user's score, and pastes the score image onto the original image, thereby generating a thumbnail image, for example. In this case, the original image corresponding to the gender and age is stored in the storage unit 21.

The determining unit 236 determines whether or not the one or more attribute values acquired by the attribute value acquiring unit 234 satisfy the condition contained in the dynamic processing information. The determining unit 236 determines whether or not the one or more attribute values acquired by the attribute value acquiring unit 234 satisfy the condition contained in any one piece of dynamic processing information out of the one or more pieces of dynamic processing information in the dynamic processing information storage unit 212.

If a determination result of the determining unit 236 is that the condition is satisfied, the condition processing execution unit 237 executes processing identified with a processing identifier that is paired with the condition corresponding to the determination result.

The designated user processing unit 238 executes one set of processing on the user terminal 1 of a user corresponding to a selecting instruction. The one set of processing may be predetermined processing, or processing corresponding to a processing identifier contained in the selecting instruction. The one set of processing may include multiple sets of processing. The one set of processing is distributing advertisements, making recommendations to encourage purchases, sending discount coupons, or the like, for example.

The transmitting unit 24 may transmit various types of information. The various types of information are a processing result or a user terminal identifier, for example.

The processing result transmitting unit 241 transmits a processing result that is a result of processing by the response unit 232, to the user terminal 1.

The user terminal transmitting unit 242 transmits a user terminal identifier, which is an identifier corresponding to the user terminal 1, to the user terminal 1, in the case in which the operation information receiving unit 222 receives an operation information, at least before a login instruction is received from the user terminal 1.

The output unit 25 outputs various types of information. The output in this case is typically transmission to an external apparatus (the management terminal 3), but may be considered to be a concept that encompasses display on a display screen, projection using a projector, printing by a printer, output of a sound, accumulation in a recording medium, delivery of a processing result to another processing apparatus or another program, and the like. The output unit 25 may transmit various types of information to the management terminal 3 corresponding to a later-described second server apparatus.

The attribute value output unit 251 outputs the one or more attribute values acquired by the attribute value acquiring unit 234. The attribute value output unit 251 outputs the one or more dynamic attribute values acquired by the attribute value acquiring unit 234. The attribute value output unit 251 preferably outputs one or more attribute values including a score.

The thumbnail image output unit 252 outputs the thumbnail image acquired by the thumbnail image acquiring unit 235.

Various types of information are stored in the management storage unit 31 constituting the management terminal 3. The various types of information are an administrator identifier for identifying an administrator, for example.

The management accepting unit 32 accepts various types of instructions, information, and the like. The various types of instructions, information, and the like are a selecting instruction or dynamic processing information, for example.

The various types of instructions, information, and the like may be input by any device such as a touch panel, a keyboard, a mouse, or a menu screen. The management accepting unit 32 may be realized by a device driver for an input device such as a touch panel or a keyboard, control software for a menu screen, or the like.

The management processing unit 33 executes various types of processing. The various types of processing are processing for changing the instructions, information, and the like accepted by the management accepting unit 32 into those with a data structure for transmission, processing for changing information received by the management receiving unit 35 into those with a data structure for output, or the like.

The management transmitting unit 34 transmits various types of instructions, information, and the like. The management transmitting unit 34 typically transmits various types of instructions, information, and the like to the server apparatus 2. The various types of instructions, information, and the like are a selecting instruction or dynamic processing information, for example.

The management receiving unit 35 receives various types of information. The management receiving unit 35 typically receives various types of information from the server apparatus 2. The various types of information are one or more attribute values or a thumbnail image of each user, for example.

The management output unit 36 outputs various types of information. The various types of information are one or more attribute values or a thumbnail image of each user, for example.

The user storage unit 11, the storage unit 21, the user information storage unit 211, the dynamic processing information storage unit 212, the operation information storage unit 213, and the management storage unit 31 are preferably non-volatile recording media, but can also be realized by volatile recording media.

There is no limitation on the procedure in which information is stored in the user storage unit 11 and the like. For example, information may be stored in the user storage unit 11 and the like via a recording medium, information transmitted via a communication line or the like may be stored in the user storage unit 11 and the like, or information input via an input device may be stored in the user storage unit 11 and the like.

The user processing unit 13, the processing unit 23, the login processing unit 231, the response unit 232, the operation information accumulating unit 233, the attribute value acquiring unit 234, the thumbnail image acquiring unit 235, the determining unit 236, the condition processing execution unit 237, the designated user processing unit 238, and the management processing unit 33 may be typically realized by MPUs, memories, or the like. Typically, the processing procedure of the user processing unit 13 and the like is realized by software, and the software is stored in a recording medium such as a ROM. Note that the processing procedure may be realized by hardware (dedicated circuits).

The user transmitting unit 14, the transmitting unit 24, the processing result transmitting unit 241, the user terminal transmitting unit 242, the output unit 25, the attribute value output unit 251, the thumbnail image output unit 252, and the management transmitting unit 34 are typically realized by wireless or wired communication parts.

The user receiving unit 15, the receiving unit 22, the login instruction receiving unit 221, the operation information receiving unit 222, the selecting instruction receiving unit 223, and the management receiving unit 35 are typically realized by wireless or wired communication parts.

The user output unit 16 and the management output unit 36 may be considered to include or to not include an output device such as a display screen or a speaker. The user output unit 16 and the like may be realized by driver software for an output device, a combination of driver software for an output device and the output device, or the like.

Next, an operation of the information system A will be described. First, an operation of the user terminal 1 will be described with reference to the flowchart in FIG. 4.

(Step S401) The user accepting unit 12 determines whether or not it has accepted a login instruction. If it has accepted a login instruction, the procedure advances to step S402, or otherwise the procedure advances to step S405.

(Step S402) The user processing unit 13 configures a login instruction that is to be transmitted, from the login instruction accepted in step S401. The user transmitting unit 14 transmits the login instruction to the server apparatus 2.

(Step S403) The user receiving unit 15 determines whether or not it has received a login processing result. If it has received a login processing result, the procedure advances to step S404, or otherwise the procedure returns to step S403.

(Step S404) The user output unit 16 outputs the login processing result received in step S403. The procedure returns to step S401.

(Step S405) The user accepting unit 12 determines whether or not it has accepted an operation from a user. If it has accepted an operation, the procedure advances to step S406, or otherwise the procedure advances to step S410.

(Step S406) The user processing unit 13 configures operation information, based on the operation accepted in step S405.

(Step S407) The user transmitting unit 14 transmits the operation information configured in step S406 to the server apparatus 2.

(Step S408) The user receiving unit 15 determines whether or not it has received a processing result according to the operation information, from the server apparatus 2. If it has received a processing result, the procedure advances to step S409, or otherwise the procedure returns to step S408.

(Step S409) The user output unit 16 outputs the processing result received in step S408. The procedure returns to step S401.

(Step S410) The user receiving unit 15 determines whether or not it has received information from the server apparatus 2. If it has received information, the procedure advances to step S411, or otherwise the procedure returns to step S401. This information is typically a result of processing by the server apparatus 2, and is a coupon, an advertisement, a message, or the like, for example.

(Step S411) The user processing unit 13 configures information that is to be output, using the information received in step S410. The user output unit 16 outputs the information. The procedure returns to step S401.

Figure 4:
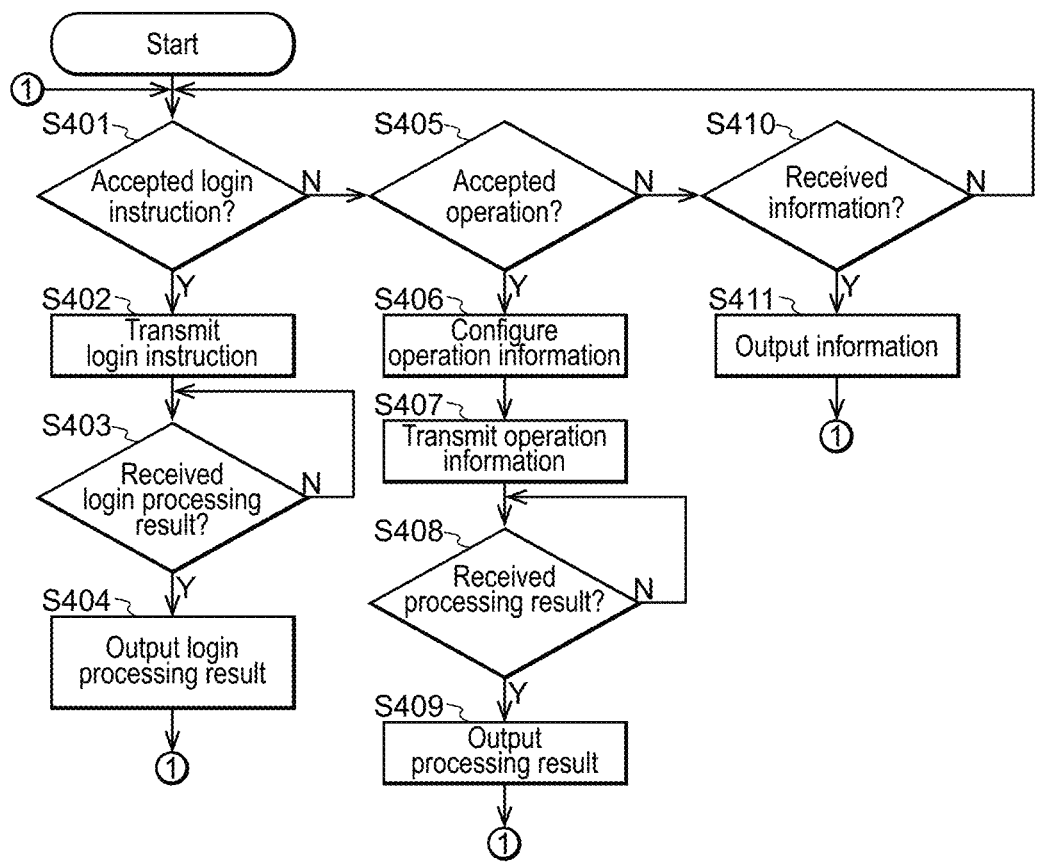
FIG. 4 is a flowchart illustrating an operation of a user terminal 1 in the embodiment.

In the flowchart in FIG. 4, the processing ends at power off or at an interruption of termination processing.

Next, an operation of the server apparatus 2 will be described with reference to the flowchart in FIG. 5.

(Step S501) The login instruction receiving unit 221 determines whether or not it has received a login instruction from the user terminal 1. If it has received a login instruction, the procedure advances to step S502, or otherwise the procedure advances to step S504.

(Step S502) The login processing unit 231 executes login processing for the user of the user terminal 1 in response to a received login instruction. The execution of login processing typically includes transmission of a login processing result to the user terminal 1.

(Step S503) The processing unit 23 associates the user terminal identifier with the user identifier. For example, the processing unit 23 accumulates the user terminal identifier and the user identifier contained in the login instruction in a pair with each other in the storage unit 21. The procedure returns to step S501.

(Step S504) The operation information receiving unit 222 determines whether or not it has received operation information and the like from the user terminal 1 of a user who is a visitor to a website. If it has received operation information and the like, the procedure advances to step S505, or otherwise the procedure advances to step S511. The operation information and the like are operation information and a user terminal identifier, for example. The operation information and the like are operation information and a user identifier, for example. The operation information and the like include one or more attribute values of a user, for example.

(Step S505) The response unit 232 executes processing according to the operation information received in step S504. In this case, the user terminal transmitting unit 242 may confirm that it is before a login instruction is received from the user terminal 1, and transmit a user terminal identifier, which is an identifier corresponding to the user terminal 1, to the user terminal 1, in the case in which the operation information receiving unit 222 receives an operation information.

(Step S506) The processing result transmitting unit 241 transmits a processing result that is a result of processing by the response unit 232, to the user terminal 1.

(Step S507) The operation information accumulating unit 233 accumulates the operation information received in step S504, in the operation information storage unit 213, in association with the user terminal identifier or the user identifier received in a pair with the login instruction or the operation information.

(Step S508) It is determined whether or not the user terminal identifier corresponding to the user terminal 1 that transmitted the operation information is new (whether the user is visiting the website for the first time). If the user terminal identifier is new, the procedure advances to step S509, or otherwise the procedure returns to step S501.

(Step S509) The processing unit 23 accumulates the user terminal identifier in the storage unit 21 in a pair with the received operation information.

(Step S510) The user terminal transmitting unit 242 transmits the user terminal identifier to the user terminal 1 that transmitted the operation information and the like. The procedure returns to step S501.

(Step S511) The selecting instruction receiving unit 223 determines whether or not it has received a selecting instruction from the management terminal 3. If it has received a selecting instruction, the procedure advances to step S512, or otherwise the procedure advances to step S514.

(Step S512) The designated user processing unit 238 acquires a user identifier or a user terminal identifier corresponding to the selecting instruction. The procedure returns to step S501. The user identifier or the user terminal identifier corresponding to the selecting instruction may be the user identifier or the user terminal identifier contained in the selecting instruction, or the user identifier or the user terminal identifier that is paired with the ID contained in the selecting instruction. The user identifier or the user terminal identifier that is paired with the ID is managed in the storage unit 21, for example.

(Step S513) The designated user processing unit 238 executes one set of processing on the user terminal 1 identified with the user identifier or the user terminal identifier. The procedure returns to step S501.

(Step S514) The processing unit 23 executes administrator notification processing. The administrator notification processing is processing for outputting information on a currently visiting user to the management terminal 3. A specific example of the administrator notification processing will be described with reference to the flowchart in FIG. 6.

(Step S515) The condition processing execution unit 237 executes automatic processing. The procedure returns to step S501. The automatic processing is processing in which processing corresponding to a condition is automatically executed on the user terminal 1 of a currently visiting user who matches the condition. A specific example of the automatic processing will be described with reference to the flowchart in FIG. 7.

Figure 5:
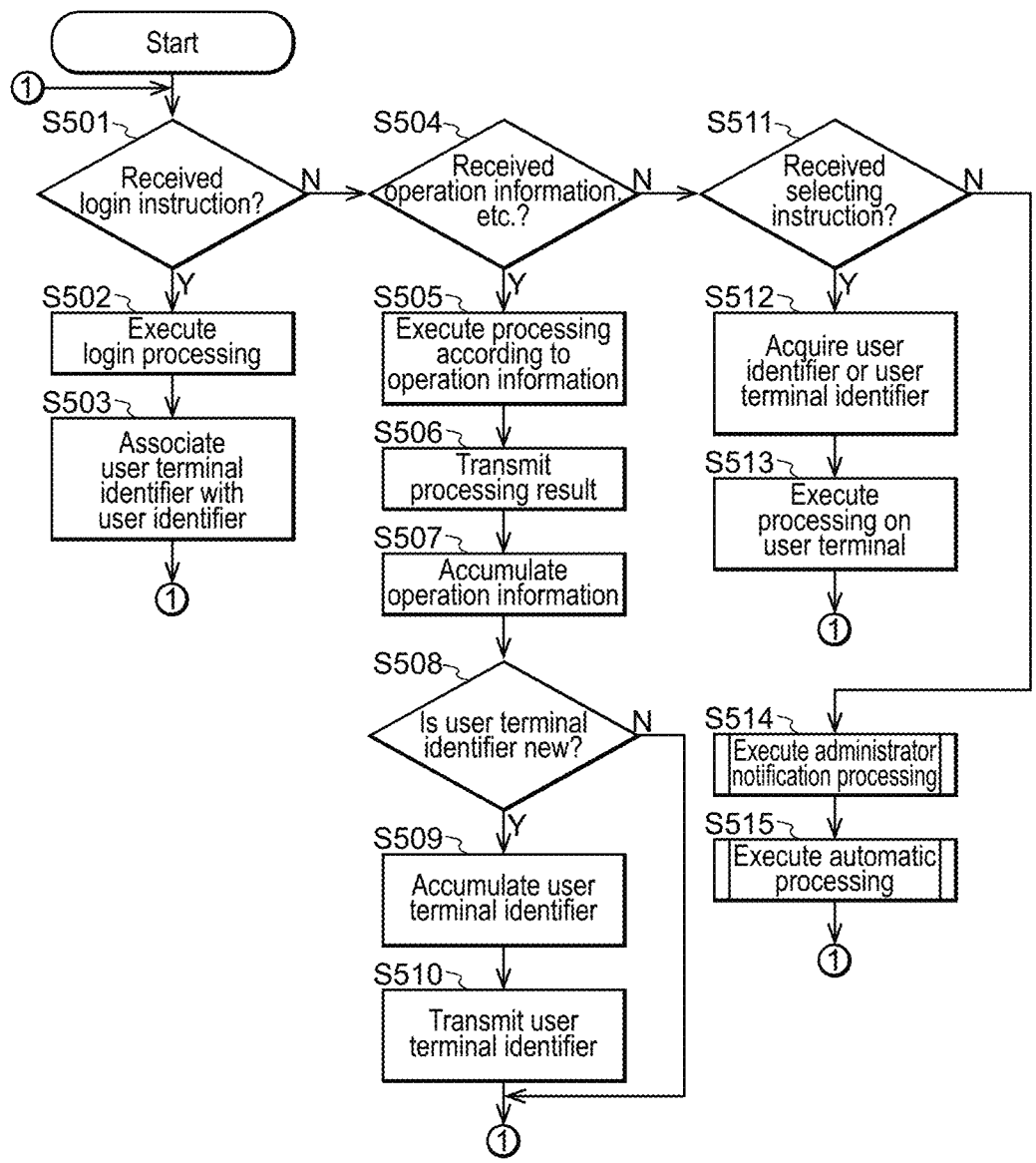
FIG. 5 is a flowchart illustrating an operation of the server apparatus 2 in the embodiment.

In the flowchart in FIG. 5, the processing ends at power off or at an interruption of termination processing.

Figure 6:
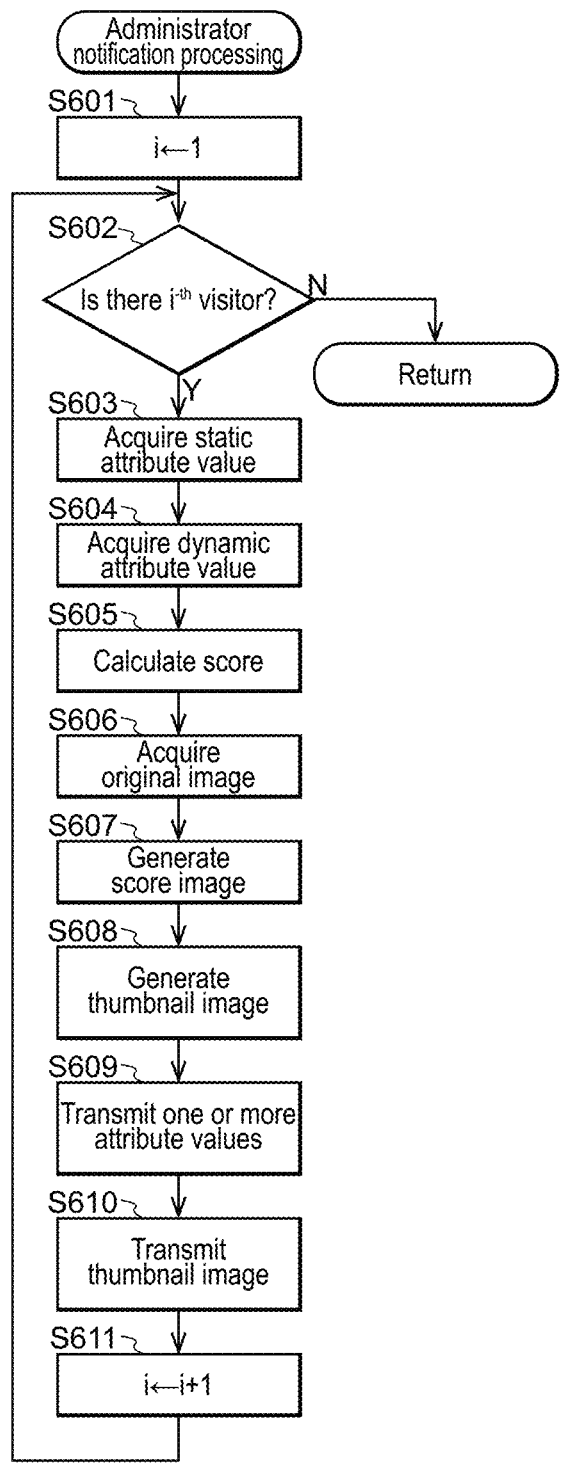
FIG. 6 is a flowchart illustrating a specific example of administrator notification processing in the embodiment.

Next, a specific example of the administrator notification processing in step S514 will be described with reference to the flowchart in FIG. 6.

(Step S601) The processing unit 23 substitutes 1 for a counter i.

(Step S602) The processing unit 23 determines whether or not there is an $i^{-th}$ visitor to the webpage. If there is an $i^{-th}$ visitor, the procedure advances to step S603, or otherwise the procedure returns to the upper-level processing.

(Step S603) The attribute value acquiring unit 234 acquires a user identifier of the $i^{-th}$ visitor. Then, the attribute value acquiring unit 234 acquires one or more static attribute values that are paired with the user identifier, from the user information storage unit 211.

(Step S604) The attribute value acquiring unit 234 acquires one or more pieces of operation information that are paired with the user identifier of the $i^{-th}$ visitor, from the operation information storage unit 213. Then, the attribute value acquiring unit 234 acquires one or more dynamic attribute values, using the one or more pieces of operation information. The attribute value acquiring unit 234 may acquire one or more dynamic attribute values, using the one or more attribute values of the user accumulated in the storage unit 21. The attribute value acquiring unit 234 preferably accumulates the newly acquired one or more dynamic attribute values in the user information storage unit 211 in association with the user identifier.

(Step S605) The score calculating part 2341 calculates a score using two or more attribute values out of the one or more static attribute values acquired in step S603 and the one or more dynamic attribute values acquired in step S604. This score may also be considered as a type of dynamic attribute value.

(Step S606) The thumbnail image acquiring unit 235 acquires an original image corresponding to the one or more static attribute values acquired in step S603, from the storage unit 21.

(Step S607) The thumbnail image acquiring unit 235 generates a score image using the score calculated in step S605.

(Step S608) The thumbnail image acquiring unit 235 generates a thumbnail image using the original image acquired in step S606 and the score image generated in step S607.

(Step S609) The attribute value output unit 251 transmits the one or more attribute values (static attribute values and dynamic attribute values) acquired by the attribute value acquiring unit 234, to the management terminal 3.

(Step S610) The thumbnail image generated in step S608 is transmitted to the management terminal 3.

(Step S611) The processing unit 23 increments the counter i by 1. The procedure returns to step S602.

Figure 7:
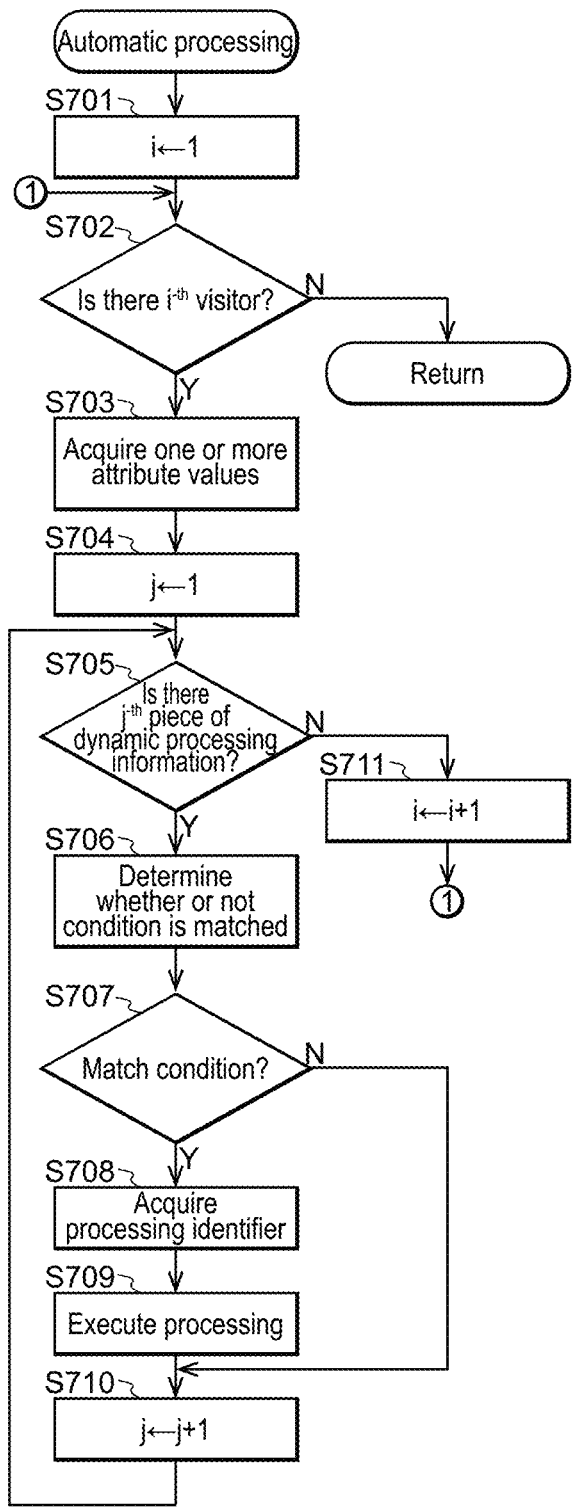
FIG. 7 is a flowchart illustrating a specific example of automatic processing in the embodiment.

Next, a specific example of the automatic processing in step S515 will be described with reference to the flowchart in FIG. 7.

(Step S701) The processing unit 23 substitutes 1 for a counter i.

(Step S702) The processing unit 23 determines whether or not there is an $i^{-th}$ visitor to the webpage. If there is an $i^{-th}$ visitor, the procedure advances to step S703, or otherwise the procedure returns to the upper-level processing. It is possible to determine whether or not there is an $i^{-th}$ visitor, by checking the information in the storage unit 21. That is to say, operation information and a user identifier or a user terminal identifier of a user who is a visitor are constantly updated and stored in the storage unit 21.

(Step S703) The attribute value acquiring unit 234 acquires a user identifier of the $i^{-th}$ visitor. Then, the attribute value acquiring unit 234 acquires one or more static attribute values or/and one or more dynamic attribute values that are paired with the user identifier. In this case, it is preferable to use the attribute values acquired in the administrator notification processing in FIG. 6.

(Step S704) The processing unit 23 substitutes 1 for a counter j.

(Step S705) The determining unit 236 determines whether or not there is a $j^{-th}$ piece of dynamic processing information in the dynamic processing information storage unit 212. If there is a $j^{-th}$ piece of dynamic processing information, the procedure advances to step S706, or otherwise the procedure advances to step S711.

(Step S706) The determining unit 236 determines whether or not the one or more attribute values acquired in step S703 match the condition contained in the $j^{-th}$ dynamic processing information.

(Step S707) If a determination result of the determining unit 236 is that the condition is matched, the procedure advances to step S707, or otherwise the procedure advances to step S710.

(Step S708) The condition processing execution unit 237 acquires a processing identifier contained in the $j^{-th}$ piece of dynamic processing information.

(Step S709) The condition processing execution unit 237 executes processing identified with the processing identifier acquired in step S707.

(Step S710) The processing unit 23 increments the counter j by 1. The procedure returns to step S605.

(Step S711) The processing unit 23 increments the counter i by 1. The procedure returns to step S602.

Next, an operation of the management terminal 3 will be described with reference to the flowchart in FIG. 8.

(Step S801) The management receiving unit 35 determines whether or not it has received information on a user from the server apparatus 2. If it has received information, the procedure advances to step S802, or otherwise the procedure advances to step S803. The information on a user contains one or more attribute values. The information on a user preferably contains a thumbnail image.

(Step S802) The management output unit 36 outputs the information received in step S801. The procedure returns to step S801.

(Step S803) The management accepting unit 32 determines whether or not it has accepted a selecting instruction. If it has accepted a selecting instruction, the procedure advances to step S804, or otherwise the procedure advances to step S805.

(Step S804) The management processing unit 33 changes the selecting instruction accepted in step S803 into information with a data structure for transmission. The management processing unit 33 configures a selecting instruction containing a user identifier of a selected user, for example. Then, the management transmitting unit 34 transmits the selecting instruction to the server apparatus 2. The procedure returns to step S801.

(Step S805) The management accepting unit 32 determines whether or not it has accepted dynamic processing information. If it has accepted dynamic processing information, the procedure advances to step S806, or otherwise the procedure returns to step S801.

(Step S806) The management processing unit 33 changes the dynamic processing information accepted in step S805 into information with a structure for transmission. Then, the management transmitting unit 34 transmits the dynamic processing information to the server apparatus 2. The procedure returns to step S801. In this case, the transmitted dynamic processing information is accumulated in the server apparatus 2.

Figure 8:
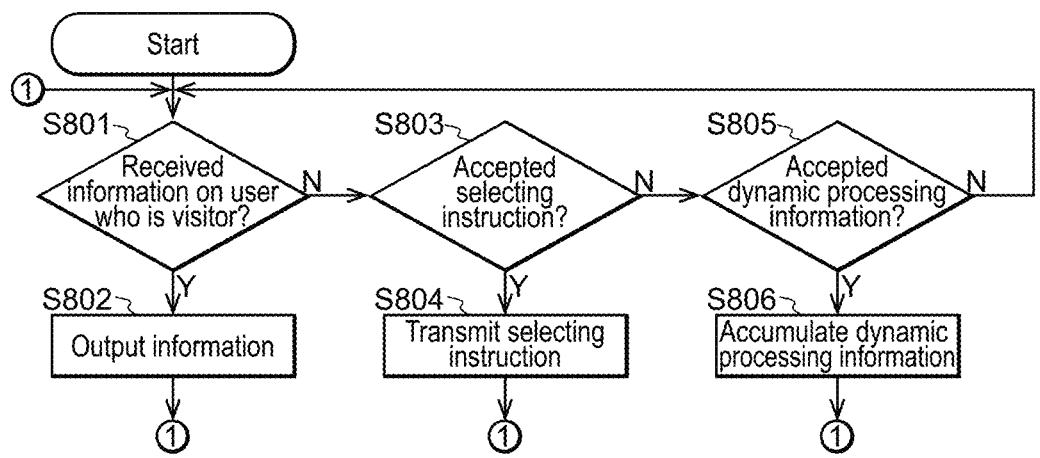
FIG. 8 is a flowchart illustrating an operation of a management terminal 3 in the embodiment.

In the flowchart in FIG. 8, the processing ends at power off or at an interruption of termination processing.

Hereinafter, a specific operation of the information system A in this embodiment will be described. FIG. 1 is a conceptual diagram of the information system A.

It is assumed that the server apparatus 2 is a server in which a webpage of an e-commerce site is stored, for example. Then, it is assumed that a user visits the e-commerce site and executes operations such as browsing a product and purchasing the product.

Then, the user information management table having the structure shown in FIG. 9 is stored in the user information storage unit 211 of the server apparatus 2. Records each having "user identifier", "name", "e-mail address", "static attribute value", and "dynamic attribute value" are stored in the user information management table. "Static attribute value" in this example has "gender", "age", "unmarried/married", "place of birth", "member", and the like. "Unmarried/married" is information indicating whether the user is unmarried or married. "Member" indicates whether or not the user is registered as a member in the system (whether or not the user is a member). In this example, a user corresponding to the member value "1" is a member, and a user corresponding to the member value "0" is not a member. "Dynamic attribute value" has "real-time dynamic attribute value" and "historical-information-using dynamic attribute value". "Real-time dynamic attribute value" in this example has "time spent" and "number of pages viewed". "Time spent" is the time spent on the site during the current visit. "Number of pages viewed" is the number of pages viewed on the site during the current visit. "Historical-information-using dynamic attribute value" in this example has "number of visits", "number of purchases", "purchase total", "average number of PVs", "score", and the like. "Number of visits" is the number of times the user visited this e-commerce site so far. "Number of purchases" is the number of times the user purchased products on the e-commerce site so far. "Purchase total" is the total amount of money the user spent on products on the e-commerce site so far. "Average number of PVs" is an average number of pages viewed per visit of the user. "Score" is a score of the user. In this example, it is assumed that an operation expression for calculating a score using an increasing function whose parameters are one or more of the attribute values "number of visits", "number of purchases", "purchase total", and "average number of PVs" is stored in the storage unit 21. This operation expression is preferably an operation expression for calculating a score using one or more pieces of information of the static attribute values. The operation expression may be an operation expression for performing calculation so as to increase the score value for a member "1", for example. For example, the operation expression preferably multiplies the score value by 1.1 for a member "1", and does not change the score value for a member "0".

Furthermore, the dynamic processing information management table having the structure shown in FIG. 10 is stored in the dynamic processing information storage unit 212. Records each having "ID", "condition", "processing execution time", and "processing identifier" are stored in the dynamic processing information management table. "ID" is information for identifying a record. "Condition" is a condition for executing processing. "Processing execution time" is information for specifying the time to execute processing. The processing execution time "-" means that the processing is executed in the case in which the condition is satisfied. "Processing execution time" may be only once a day, once per access, or the like. "Processing identifier" is information for executing processing corresponding to the condition, and is information for specifying processing in this case.

In the dynamic processing information management table, the record with "ID=1" indicates that, when a user is in his/her 30s, has made five or more purchases, and has a score of 70 or more logs in, a message "We will send you a coupon to support you" is sent to the user, and a coupon "coupon 1" is sent to the user terminal 1 after login. It is assumed that "coupon 1" is stored in the storage unit 21. The record with "ID=2" indicates that a message "May I help you? Please contact AA if you have any problems" is sent to a user who has stayed for 180 seconds or more, is a member, and has a score of 50 or more, in the case in which the conditions are satisfied.

Furthermore, it is assumed that an original image corresponding to the conditions of the user's attribute values is stored in the storage unit 21. Also, it is assumed that an original score image that is the source of a score image is stored in the storage unit 21.

Furthermore, the operation information management table having the structure shown in FIG. 11 is stored in the operation information storage unit 213. One or more pieces of operation information are stored for each user in the operation information management table. In this example, records each having "ID", "user identifier", "date/time", "operation type identifier", and "operation information" are stored in the operation information management table. "ID" is information for identifying a record. "Date/time" indicates the time and date substantially at which the operation was executed or the time and date at which the operation information was received. "Operation type identifier" is information indicating the type of operation information. The operation type identifier "a" indicates that the operation information is information for specifying a user's operation. The operation type identifier "b" indicates that the operation information is information for specifying processing executed by the server apparatus 2.

In this situation, it is assumed that 11 users are currently visiting this e-commerce site, and are browsing product information on the e-commerce site or going to purchase a product.

Then, when a user executes an operation on the user terminal 1, the user accepting unit 12 of the user terminal 1 accepts a login instruction or operation information. Then, the user processing unit 13 configures information that is to be transmitted. Next, the user transmitting unit 14 transmits the configured information to the server apparatus 2.

Then, the receiving unit 22 of the server apparatus 2 receives the login instruction or the operation information. Then, the login processing unit 231 or the response unit 232 executes processing according to the received login instruction or operation information. Then, the processing result transmitting unit 241 transmits a processing result that is a result of processing by the response unit 232, to the user terminal 1.

With the above-described processing, users can log in to this e-commerce site, browse product information on this e-commerce site, and purchase a product.

Then, the operation information accumulating unit 233 of the server apparatus 2 accumulates the received operation information in the operation information management table. Before the user logs in, the operation information accumulating unit 233 accumulates operation information in the operation information management table in association with a user terminal identifier (a cookie ID, in this example). After login, the operation information is accumulated in the operation information management table in association with a user identifier associated with a user terminal identifier. Accordingly, the server apparatus 2 can seamlessly use the pre-login operation information and the post-login operation information, even when a visitor to this e-commerce site logs in during the visit.

Then, the processing unit 23 executes administrator notification processing as follows. That is to say, the processing unit 23 acquires attribute values of each of the 11 visitors from the user information management table (FIG. 9). Then, the score calculating part 2341 calculates a score using one or more attribute values that are used to calculate the score, out of the one or more attribute values, and updates each user's score in the user information management table.

Next, the thumbnail image acquiring unit 235 acquires an original image corresponding to the acquired one or more static attribute values, from the storage unit 21. The thumbnail image acquiring unit 235 generates a score image using the calculated score. Next, the thumbnail image acquiring unit 235 generates a thumbnail image using the original image and the score image.

Then, the output unit 25 transmits, for each user, the thumbnail image acquired by the thumbnail image acquiring unit 235 and the one or more attribute values acquired by the attribute value acquiring unit 234, to the management terminal 3.

Figure 12:
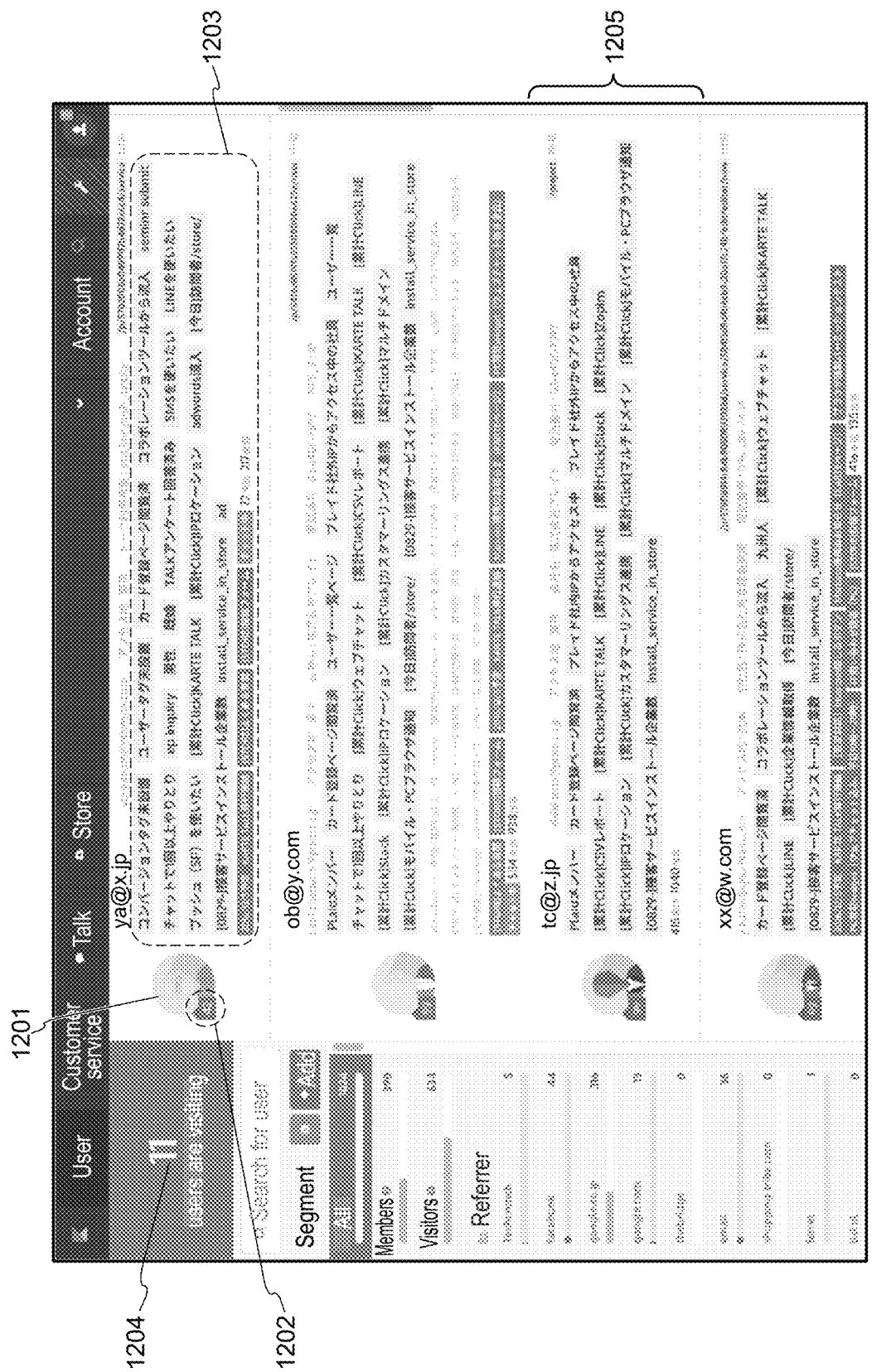
FIG. 12 is a diagram showing an output example in the embodiment.

Next, the management receiving unit 35 of the management terminal 3 receives the thumbnail image and the one or more attribute values of each visitor, from the server apparatus 2. Then, the management output unit 36 outputs the received information. FIG. 12 shows an output example thereof. In the drawing, 1201 denotes a thumbnail image, 1202 denotes a score image in the thumbnail image, and 1203 denotes user's attribute values. In FIG. 12, attribute values and the like of four currently visiting users are output, but the number of current visitors is 11 as indicated by 1204. The administrator can view the attribute values of the other visitors and the like by scrolling the screen.

Next, the condition processing execution unit 237 executes automatic processing as follows. That is to say, the determining unit 236 determines whether or not, for each of the 11 visitors, a condition that is paired with the matching processing execution time out of the conditions of the dynamic processing information in FIG. 10 is matched. If a determination result of the determining unit 236 is that the condition is matched, the condition processing execution unit 237 acquires a processing identifier that is paired with the condition. Then, the condition processing execution unit 237 executes processing identified with the acquired processing identifier.

In this case, for example, if the determining unit 236 determines when a user "B-o Ota" logs in that one or more attribute values of B-o Ota match the condition with "ID=1", the condition processing execution unit 237 executes processing corresponding to the processing identifier with "ID=1" in FIG. 10.

Then, the user receiving unit 15 of the user terminal 1 of B-o Ota receives a message "We will send you a coupon to support you" from the server apparatus 2. The user receiving unit 15 receives the coupon "coupon 1". Then, the user output unit 16 of the user terminal 1 of B-o Ota outputs the message "We will send you a coupon to support you" and "coupon 1". Then, B-o Ota can enjoy shopping at a discount using the coupon 1. The message and the coupon are preferably output in the webpage that the user is browsing.

Furthermore, it is assumed that the administrator of the management terminal 3 views the screen shown in FIG. 12 and selects the user "C-suke Tanaka" denoted by 1205.

Then, the management accepting unit 32 accepts a selecting instruction on C-suke Tanaka. Then, it is assumed that the administrator inputs or selects an action "send (coupon 2);" that is to be executed on C-suke Tanaka. Then, the management processing unit 33 changes the accepted selecting instruction into information "send (coupon 2,3);" with a data structure for transmission. The second argument of send is the user identifier "3" of C-suke Tanaka. Next, the management transmitting unit 34 transmits the selecting instruction "send (coupon 2,3);" to the server apparatus 2.

Next, the selecting instruction receiving unit 223 of the server apparatus 2 receives the selecting instruction "send (coupon 2,3);" from the management terminal 3. Next, the designated user processing unit 238 acquires a user identifier "3" corresponding to the selecting instruction. Then, the designated user processing unit 238 transmits the coupon 2 to the user terminal 1 of C-suke Tanaka identified with the user identifier "3". It is assumed that the coupon 2 is stored in the storage unit 21, for example. Note that the coupon 2 may be contained in the selecting instruction.

Next, the user receiving unit 15 of the user terminal 1 of C-suke Tanaka receives the coupon 2 from the server apparatus 2. Then, the user processing unit 13 configures a coupon 2 that is to be output, using the received coupon 2. The user output unit 16 outputs the coupon 2.

Figure 13:
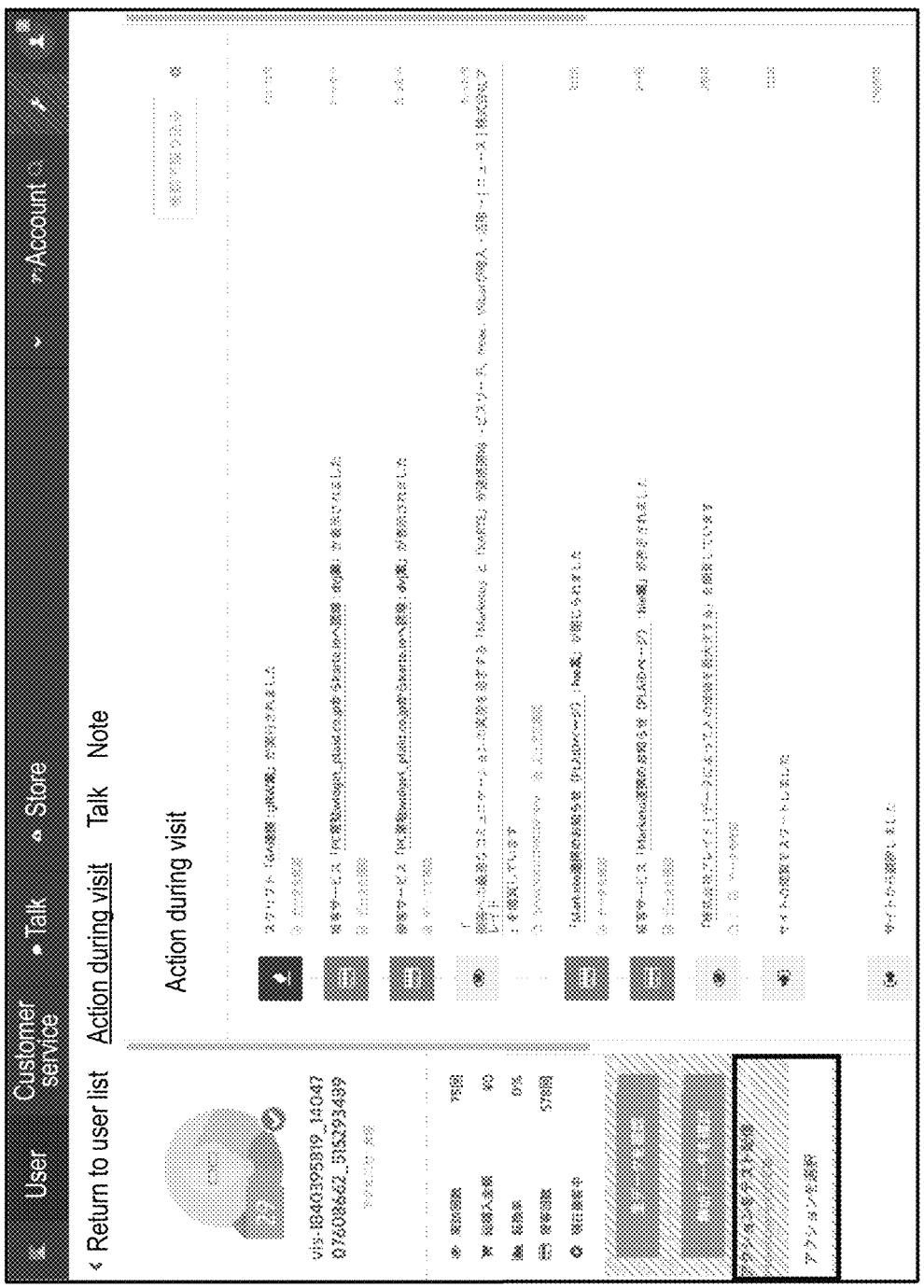
FIG. 13 is a diagram showing an example of an operation information display screen in the embodiment.

Furthermore, it is assumed that the administrator of the management terminal 3 wants to view the details of the operation information of the user 1201 in the screen of FIG. 12, and designates the user 1201 in FIG. 12. Then, the management accepting unit 32 accepts this instruction. Next, the management processing unit 33 acquires a user identifier "1" of a user "A-o Yamada". Next, the management processing unit 33 acquires operation information that is paired with the user identifier "1", from the operation information management table in FIG. 11. Then, the management processing unit 33 configures an operation information display screen, using the acquired one or more pieces of operation information. Next, the management output unit 36 outputs the operation information display screen. FIG. 13 shows an example of the operation information display screen. In FIG. 13, the operation information according to the type of operation information (operation information identifier) is output, making it easier for the administrator to determine the action to be executed on the user.

As described above, according to this embodiment, the status of a visitor to a website can be monitored in real time. As a result, for example, it is possible for the administrator of the website operation to perform a more appropriate action on a user.

Furthermore, according to this embodiment, if an attribute value of a visitor to a website satisfies a specific condition, a specific action can be automatically performed. As a result, it is possible to automatically perform an appropriate action on a user.

Furthermore, according to this embodiment, it is possible for the administrator of the website operation to perform an appropriate action on a specific user.

Furthermore, according to this embodiment, it is possible to properly acquire a user's attribute value using both pre-login operation information and post-login operation information.

Furthermore, according to this embodiment, it is possible to output a user's score. As a result, for example, it is possible for the administrator of the website operation to perform an action on an appropriate user.

Furthermore, according to this embodiment, it is possible to output a thumbnail image acquired using a user's attribute value. As a result, for example, it is easy for the administrator of the website operation to perform an action on an appropriate user.

In this embodiment, the server apparatus 2 and the management terminal 3 may be integrated with each other. In this case, the output unit 25 of the server apparatus 2 typically displays various types of information.

Furthermore, in this embodiment, the information system may be configured to include one or at least two user terminals 1, one or at least two second server apparatuses 4, a server apparatus 5, and one or at least two management terminals 3. It is assumed that the information system in this case is an information system B. The second server apparatuses 4 are apparatuses that communicate with the user terminals 1 and transmit operation information to the server apparatus 5. The second server apparatuses 4 are servers of an existing e-commerce site, for example. Then, information such as operation information and the like transmitted from the second server apparatuses 4 is received by the server apparatus 5, and the server apparatus 5 acquires one or more dynamic attribute values of a user using the operation information. The server apparatus 5 transmits one or more attribute values and a thumbnail image of a user to the management terminals 3 corresponding to the second server apparatuses 4. The second server apparatuses 4 performs an action on the user terminals 1 based on instructions from the server apparatus 5, or the server apparatus 5 directly performs an action on the user terminals 1. The action is sending a coupon as described above, sending an advertisement, sending a message, or the like, for example.

Figure 14:
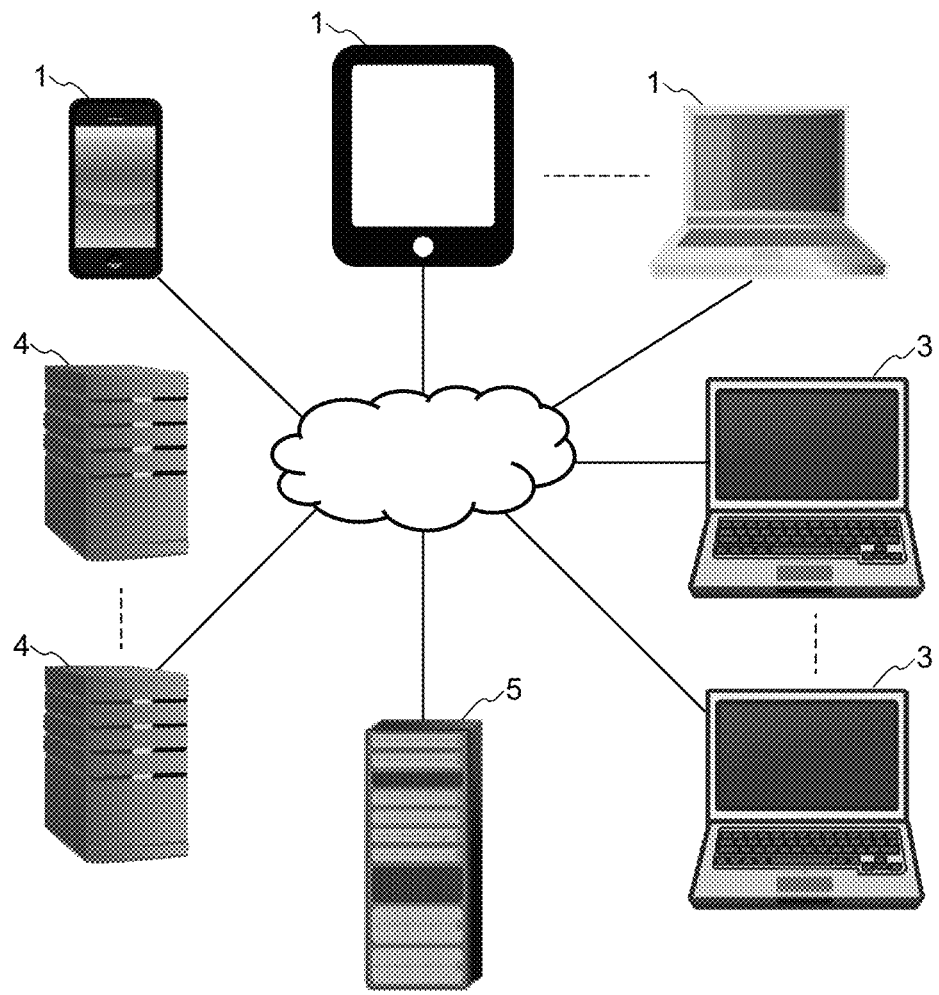
FIG. 14 is a conceptual diagram of an information system B in the embodiment.

FIG. 14 shows a conceptual diagram of the information system B in this case. The information system B includes one or at least two user terminals 1, one or at least two second server apparatuses 4, a server apparatus 5, and one or at least two management terminals 3. The second server apparatuses 4 and the server apparatus 5 are ASP servers, cloud servers, or the like, for example. Note that there is no limitation on the type of the second server apparatuses 4 and the server apparatus 5.

Figure 15:
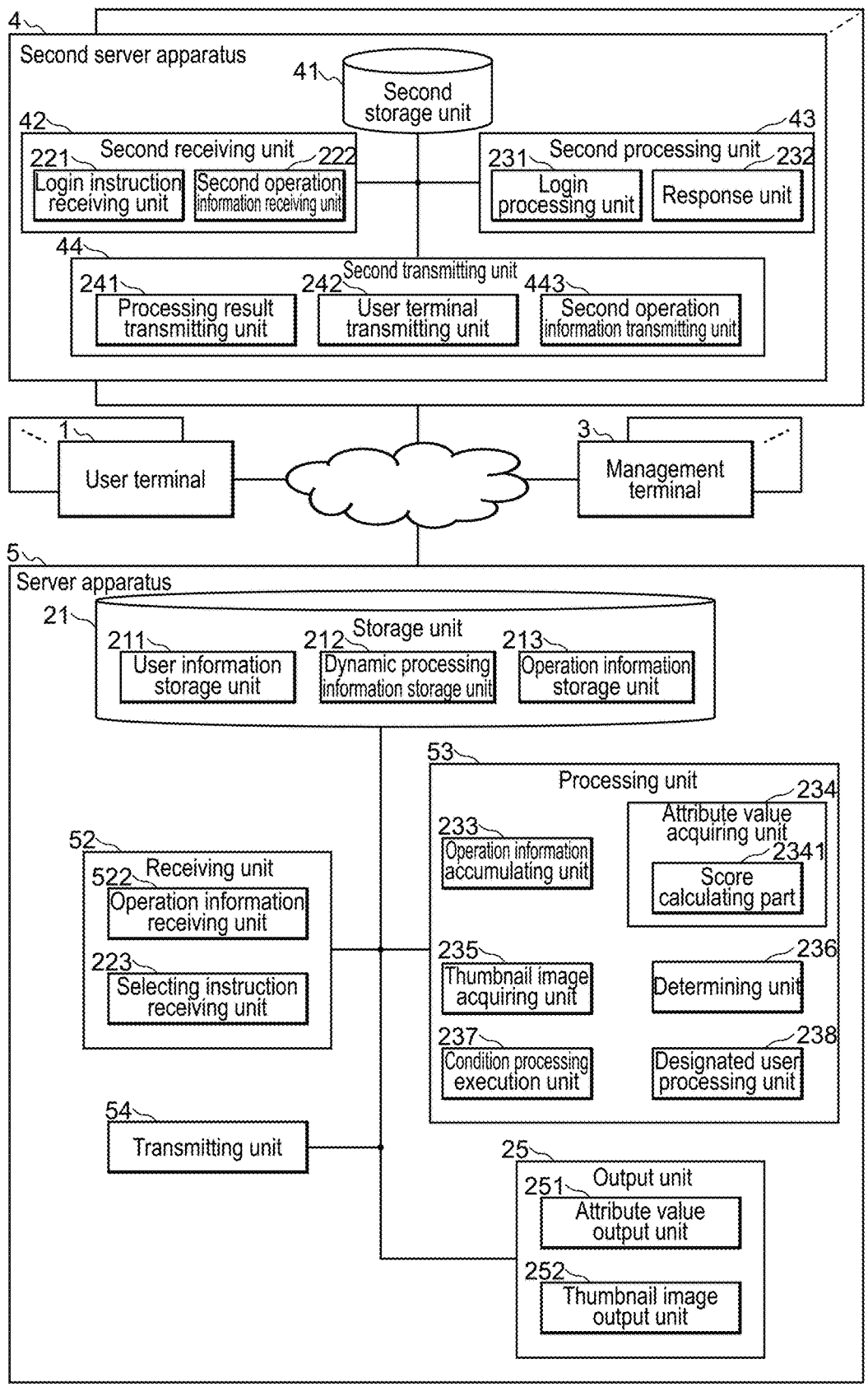
FIG. 15 is a block diagram of the information system B in the embodiment.

FIG. 15 shows a block diagram of the information system B in this case. Each second server apparatus 4 includes a second storage unit 41, a second receiving unit 42, a second processing unit 43, and a second transmitting unit 44. One or more static attribute values of each user are stored in the second storage unit 41. The second receiving unit 42 includes the login instruction receiving unit 221 and a second operation information receiving unit 422. The second operation information receiving unit 422 receives operation information from the user terminal 1. The second processing unit 43 includes the login processing unit 231 and the response unit 232. The second transmitting unit 44 includes the processing result transmitting unit 241, the user terminal transmitting unit 242, and a second operation information transmitting unit 443. The second operation information transmitting unit 443 transmits operation information to the server apparatus 5.

The server apparatus 5 includes the storage unit 21, a receiving unit 52, a processing unit 53, a transmitting unit 54, and the output unit 25. The receiving unit 52 includes an operation information receiving unit 222 that receives operation information from the second server apparatus 4, and the selecting instruction receiving unit 223. The processing unit 53 includes the operation information accumulating unit 233, the attribute value acquiring unit 234, the thumbnail image acquiring unit 235, the determining unit 236, the condition processing execution unit 237, and the designated user processing unit 238. The attribute value acquiring unit 234 includes the score calculating part 2341. The transmitting unit 54 includes the user terminal transmitting unit 242.

The second storage unit 41 is preferably a non-volatile recording medium, but can also be realized by a volatile recording medium. There is no limitation on the procedure in which information is stored in the second storage unit 41. For example, information may be stored in the second storage unit 41 via a recording medium, information transmitted via a communication line or the like may be stored in the second storage unit 41, or information input via an input device may be stored in the second storage unit 41.

The second receiving unit 42 and the receiving unit 52 are typically realized by wireless or wired communication parts.

The second processing unit 43 and the processing unit 53 may be typically realized by MPUs, memories, or the like. Typically, the processing procedure of the second receiving unit 42 and the like is realized by software, and the software is stored in a recording medium such as a ROM. Note that the processing procedure may be realized by hardware (dedicated circuits).

The second transmitting unit 44 and the transmitting unit 54 are typically realized by wireless or wired communication parts.

The processing in this embodiment may be realized by software. The software may be distributed by software downloads or the like. Furthermore, the software may be distributed in a form where the software is stored in a recording medium such as a CD-ROM. The same applies to other embodiments in this specification. The software that realizes the server apparatus in this embodiment is the following sort of program. Specifically, for example, this program is a program for causing a computer capable of accessing a recording medium including a user information storage unit in which two or more pieces of user information, each of which is information on a user and is information having one or more attribute values, are stored, to function as: an operation information receiving unit that receives operation information regarding a user's operation on a website, from a user terminal of a user who is a visitor to the website; an attribute value acquiring unit that acquires one or more attribute values of the user who is visiting the website, using the operation information; and an attribute value output unit that outputs the one or more attribute values acquired by the attribute value acquiring unit.

Furthermore, it is preferable that the program causes the computer to further function as: a response unit that executes processing according to the operation information; and a processing result transmitting unit transmits a processing result that is a result of processing by the response unit, to the user terminal.

Furthermore, the software that realizes the management terminal in this embodiment is the following sort of program. Specifically, for example, this program is a program for causing a computer to function as: a management receiving unit that receives one or more attribute values of each user from a server apparatus; a management output unit 36 that outputs the one or more attribute values of each user; a management accepting unit that accepts a selecting instruction on one user out of the one or more users; and a management transmitting unit that transmits the selecting instruction on the one user to the server apparatus.

Embodiment 2

In this embodiment, an information system including a webpage processing apparatus that executes various types of processing on each of one or more blocks using one or more pieces of block information for managing blocks will be described. The blocks are partial content in a webpage. The processing is partial content selecting/output processing, user operation analysis processing, or editing processing, for example. The partial content selecting/output processing is processing for selecting one piece of partial content out of two or more pieces of partial content corresponding to a block, and outputting a webpage containing the selected one piece of partial content. The user operation analysis processing is processing for analyzing a user's operation on a block-by-block basis. The editing processing is processing for editing partial content corresponding to a block.

Figure 16:
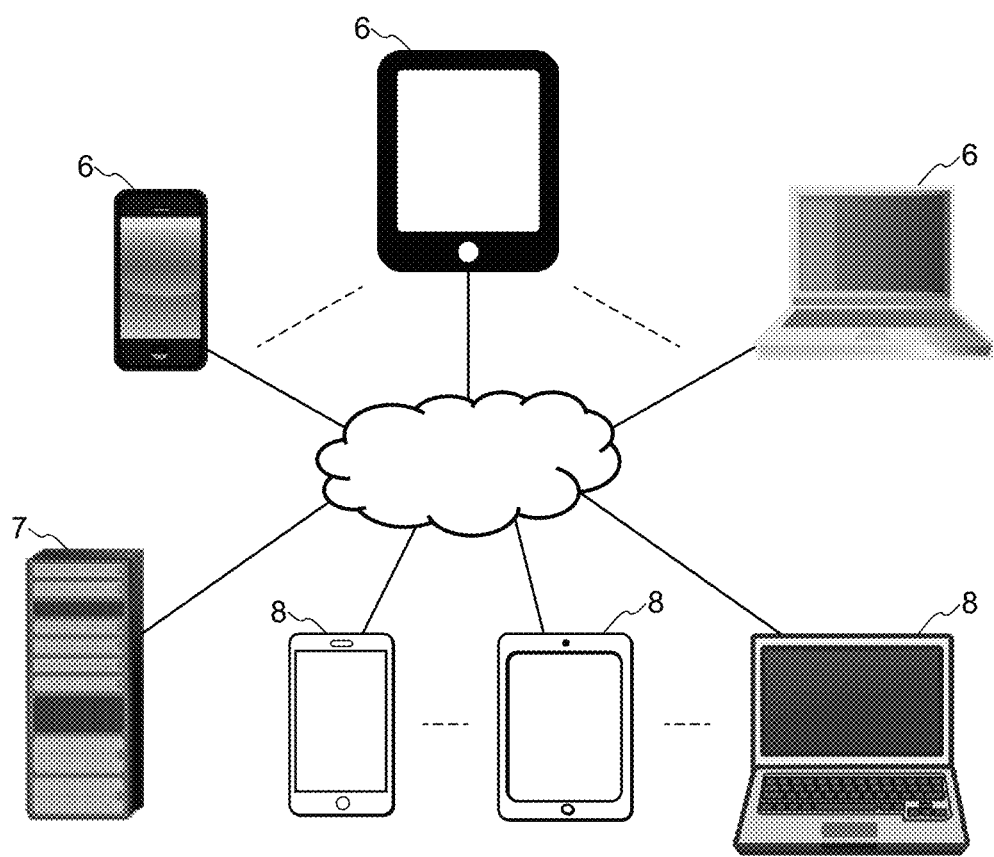
FIG. 16 is a conceptual diagram of an information system C in Embodiment 2.

FIG. 16 is a conceptual diagram of an information system C in this embodiment. The information system C includes one or at least two user terminals 6, a webpage processing apparatus 7, and one or at least two management terminals 8. A management terminal 8 may be provided for each webpage, for example.

The user terminals 6 and the management terminals 8 are so-called personal computers, tablet devices, smartphones, or the like, for example, and there is no limitation on the type thereof.

The webpage processing apparatus 7 is an ASP server, a cloud server, or the like, for example. Note that there is no limitation on the type of the webpage processing apparatus 7. The webpage processing apparatus 7 has some of the functions of the server apparatus 2 as will be described later, but may have all functions of the server apparatus 2.

The user terminals 6 and the webpage processing apparatus 7 can communicate with each other via a network such as the Internet. The webpage processing apparatus 7 and the management terminals 8 can communicate with each other via a network such as the Internet or a LAN.

Figure 17:
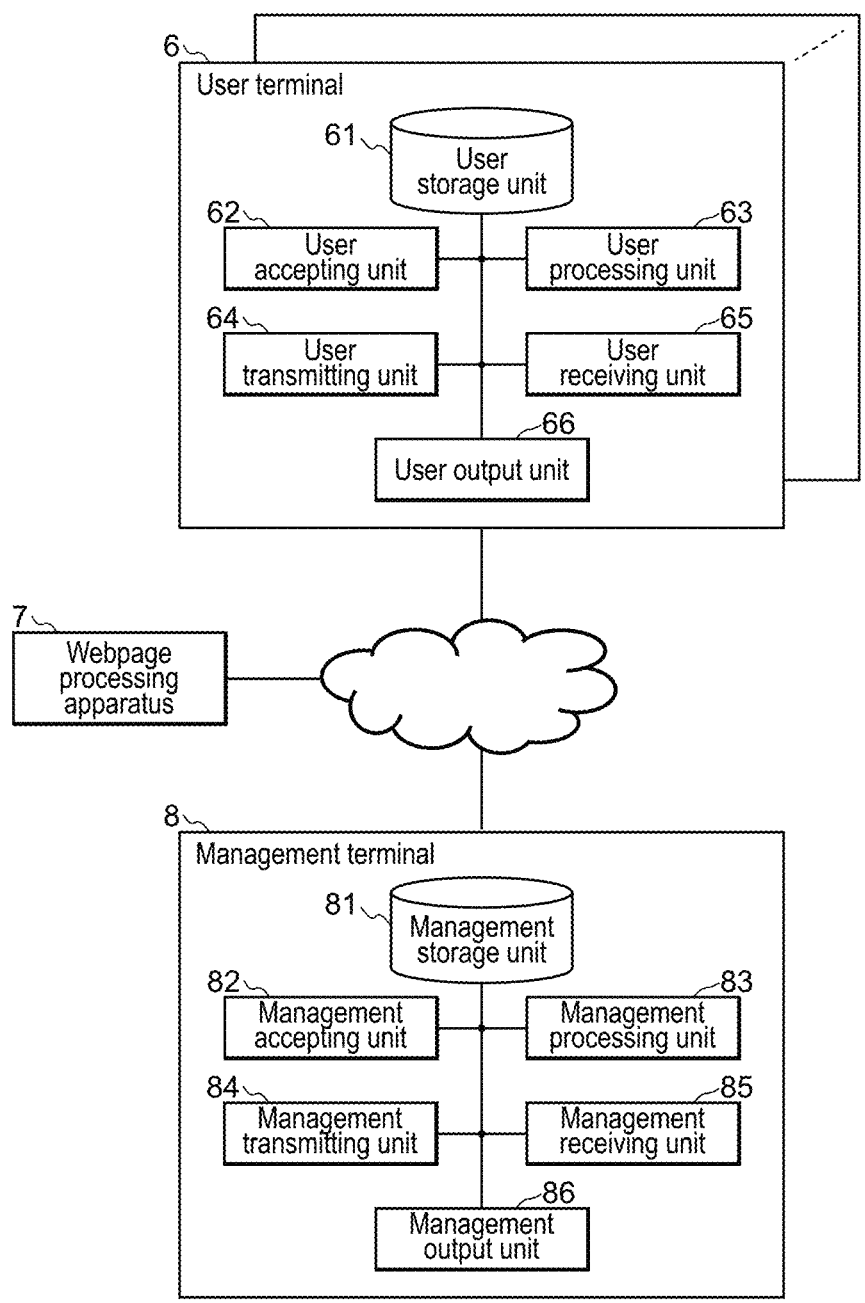
FIG. 17 is a block diagram of the information system C in the embodiment.
Figure 18:
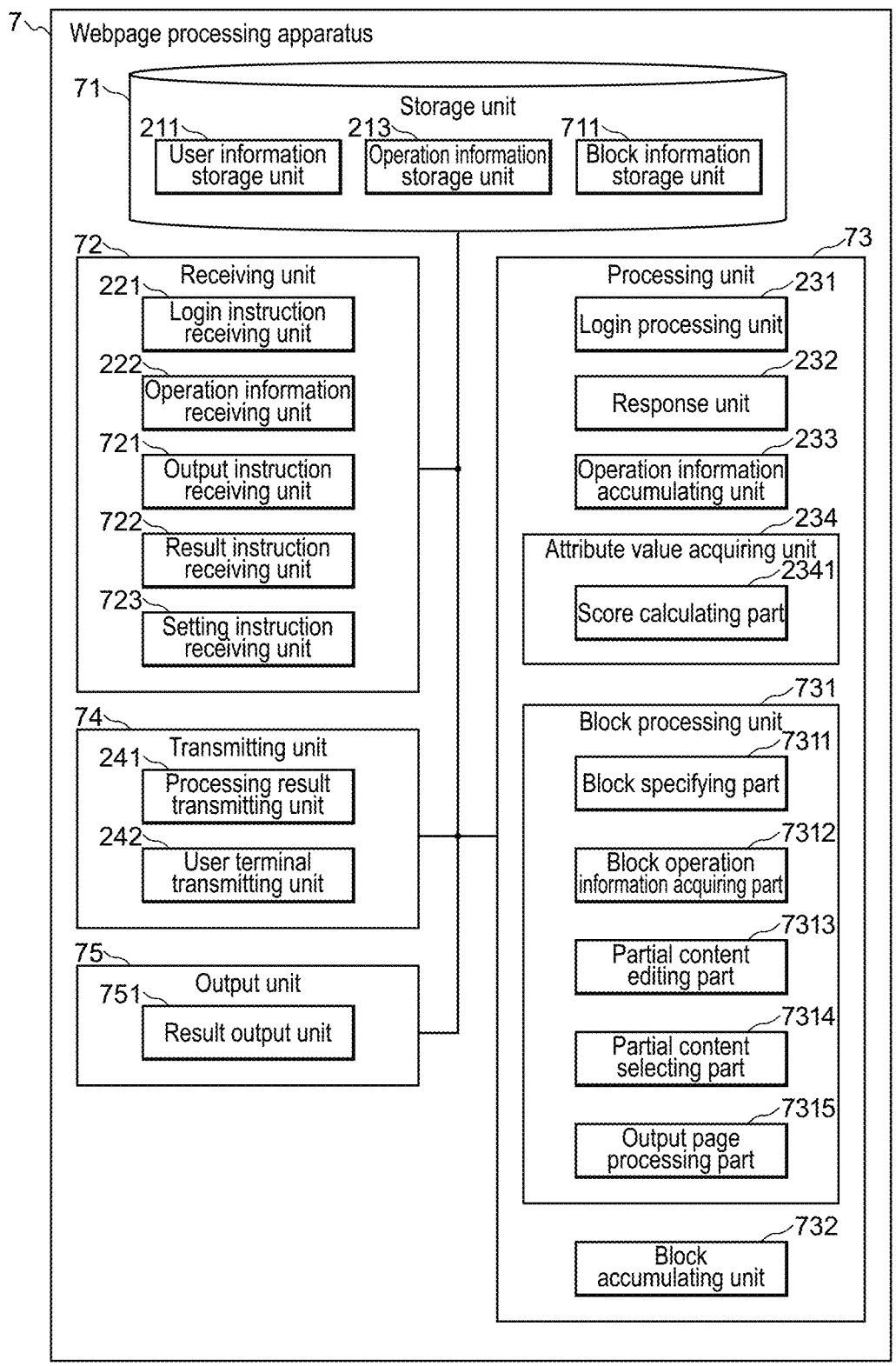
FIG. 18 is a block diagram of a webpage processing apparatus 5 in the embodiment.

FIG. 17 is a block diagram of the information system C in this embodiment. FIG. 18 is a block diagram of the webpage processing apparatus 7.

Each user terminal 6 constituting the information system C includes a user storage unit 61, a user accepting unit 62, a user processing unit 63, a user transmitting unit 64, a user receiving unit 65, and a user output unit 66.

The webpage processing apparatus 7 includes a storage unit 71, a receiving unit 72, a processing unit 73, a transmitting unit 74, and an output unit 75. The storage unit 71 includes the user information storage unit 211, the operation information storage unit 213, and a block information storage unit 711. The receiving unit 72 includes the login instruction receiving unit 221, the operation information receiving unit 222, an output instruction receiving unit 721, an editing instruction receiving unit 722, and a setting instruction receiving unit 723. The processing unit 73 includes the login processing unit 231, the response unit 232, the operation information accumulating unit 233, the attribute value acquiring unit 234, a block processing unit 731, and a block accumulating unit 732. The attribute value acquiring unit 234 includes the score calculating part 2341. The block processing unit 731 includes a block specifying part 7311, a block operation information acquiring part 7312, a partial content editing part 7313, a partial content selecting part 7314, and an output page processing part 7315. The transmitting unit 74 includes the processing result transmitting unit 241 and the user terminal transmitting unit 242. The output unit 75 includes a result output unit 751.

Each management terminal 8 includes a management storage unit 81, a management accepting unit 82, a management processing unit 83, a management transmitting unit 84, a management receiving unit 85, and a management output unit 86.

Various types of information are stored in the user storage unit 61 constituting the user terminal 6. The various types of information are a user identifier, a user terminal identifier, a user's attribute value, or the like, for example. The user identifier is information for identifying a user, and is an ID, for example. The user identifier may be a telephone number, a credit card number, an e-mail address, or the like. The user terminal identifier is information for identifying a user terminal 1, and is a cookie ID, a session identifier, an IP address, a MAC address, or the like, for example. The user's attribute value is a static attribute value such as the user's gender, age, or the like, for example.

The user accepting unit 62 accepts input of instructions, information, and the like from a user. The instructions, information, and the like are operation information, a login instruction, an output instruction, or the like, for example. The operation information is information on a user's operation on a website. The operation information has operation specifying information. The operation specifying information is information for specifying operation content. The operation specifying information may be a primitive command (e.g., "rightButtonON", or "drug"), or information (e.g., "a right mouse button was clicked", "an object was dragged") with which the meaning or implication of the operation can be determined by an administrator or the like. The partial content may be an object. The operation information typically has target specifying information. The target specifying information is information for specifying an operation target. The target specifying information is an object identifier for identifying an object serving as an operation target, later-described location identifying information, coordinate information in the user terminal 6, or the like, for example. The target specifying information may be a page identifier for identifying a webpage. The page identifier is a URI, a URL, a webpage ID, or a webpage name, for example. The object identifier may be a partial content identifier.

The operation information is information indicating that a button was pressed, information indicating that an anchor was given, information on an operation to jump to another page, information entered in a field, or the like, for example. The operation information is "rightButtonON object X" (indicating that a right mouse button was clicked (designation was made) on an object X), "drug object A" (indicating that an object A was dragged), "<purchase product ID>123 <quantity>3" (indicating that three products identified with 123 were purchased), "jump http://www.xxx.co.jp" (indicating that a webpage specified with URL "http://www.xxx.co.jp" was accessed), or the like, for example.

There is no limitation on the data structure, the information granularity, and the like of the operation information. The operation information is typically information for specifying an operation executed by a user, but may include information on processing executed by the webpage processing apparatus 7 as a result of an operation by a user.

The login instruction is an instruction to log in. The login instruction has a user identifier, for example. The login instruction has a user identifier and a password, for example. The webpage also be said to be a website. The website is an e-commerce site, for example. Note that there is no limitation on the type of webpage.

The output instruction is an instruction to output a webpage. The output instruction has a page identifier for specifying a webpage. The page identifier is a URI, a URL, part of a URI, or part of a URL, for example.

The editing instruction is an instruction to edit partial content. The editing instruction has partial content, for example. The editing instruction has an editing command (e.g., "delete"), for example.

The setting instruction is an instruction to add block information, which will be described later. The setting instruction has block information. The setting instruction typically has a page identifier. The setting instruction may have one or more pieces of partial content.

The instructions, information, and the like may be input by any device such as a touch panel, a keyboard, a mouse, or a menu screen.

The user processing unit 63 executes various types of processing. The various types of processing are processing for changing the instructions, information, and the like accepted by the user accepting unit 62 into instructions, information, and the like with a structure for transmission, processing for changing information received by the user receiving unit 65 into information with a structure for output, or the like, for example.

The user transmitting unit 64 transmits various types of information, instructions, and the like. The various types of information, instructions, and the like are operation information, a login instruction, an output instruction, or the like, for example. The user transmitting unit 64 typically transmits the information, instructions, and the like to the webpage processing apparatus 7. The user transmitting unit 64 may transmit a user's attribute value in addition to the operation information. The user's attribute is stored in the user storage unit 61, and is the user's gender, age, or the like, for example. The user's attribute that is transmitted in this case is a static attribute value, for example.

Note that the user transmitting unit 64 may transmit information, instructions, and the like to unshown one or at least two web servers. In this case, the operation information and the like are transmitted from the web servers to the webpage processing apparatus 7. The web servers are servers in which webpages are stored.

The user receiving unit 65 receives various types of information. The various types of information are a processing result, a login processing result, or a block processing result, for example. The block processing result is block operation information, a webpage that is to be output, or partial content constituting a webpage that is to be output, for example. The block operation information is information on an operation on a block.

The user output unit 66 outputs various types of information. The various types of information are information received by the user receiving unit 65 and changed by the user processing unit 63 into information with a structure for output, for example, and are a processing result, a login processing result, or a block processing result, for example.

The output in this case is a concept that encompasses display on a display screen, projection using a projector, printing by a printer, output of a sound, transmission to an external apparatus, accumulation in a recording medium, delivery of a processing result to another processing apparatus or another program, and the like.

Various types of information are stored in the storage unit 71 constituting the webpage processing apparatus 7. The various types of information are user information, operation information, information on an operation expression for calculating a score, or later-described block information, for example. The various types of information are one or at least two webpages corresponding to block information, for example. The webpages may be stored in an unshown web server.

One or at least two pieces of block information are stored in the block information storage unit 711. The block information is preferably associated with a webpage. The block information is associated with a page identifier, for example.

The block information is information on a block. The block information is information for managing a block. The block information has a block identifier and location identifying information. The block identifier is information for identifying a block, which is partial content in a webpage. The block identifier is an ID, or a block name (which may also be said to be an area name), for example. The block identifier may be location identifying information. In this case, the block information may be only location identifying information. The location identifying information is information for specifying the location of a block in the webpage. The location identifying information is a CSS selector, an offset in a webpage file (e.g., "start offset and end offset" or "start offset only"), a line number in a webpage file, a start line number and an end line number in a webpage file, or one or at least two tag groups, for example. The CSS selector may be considered as a type of tag group. The location identifying information may be any information with which the location of a block in a webpage can be specified, and there is no limitation on the structure and content thereof. The CSS stands for Cascading Style Sheets.

The block information may have one or at least two pieces of block-related information. The block-related information is information regarding a block. The block-related information may be an attribute value of a block. The block-related information is block operation information or partial content, for example.

The block operation information is information regarding a user's operation on a block. The block operation information may be operation information for specifying a user's operation on a block. The block operation information may be a statistical processing result of two or more pieces of operation information. The statistical processing result is the number of times a block was designated (clicked), the number of times a block was displayed, the total time for which a block was displayed, the number of times a mouse cursor was positioned, or the total time for which a mouse cursor was positioned, for example. The statistical processing result may be any information that is obtained from one or at least two pieces of operation information. The block operation information that is a statistical processing result may also be said to be statistical block operation information.

The partial content is content from which a webpage can be configured. The partial content is content that is arranged at a location specified with the location identifying information contained in the block information. There is no limitation on the data type of partial content, and examples thereof include text strings, still images, video, audio, and the like. The partial content may have a tag.

The block information may have two or more different pieces of partial content associated with one piece of location identifying information. If the block information has two or more different pieces of partial content and this webpage is output, typically, one piece of partial content is selected out of the two or more different pieces of partial content, and a webpage in which the selected one piece of partial content is arranged at a location specified with the one piece of location identifying information is output.

The receiving unit 72 receives various types of information, instructions, and the like. The various types of information, instructions, and the like are a login instruction, operation information, an output instruction, an editing instruction, a setting instruction, or a block information output instruction, for example.

The output instruction receiving unit 721 receives an output instruction on a webpage. The output instruction receiving unit 721 receives an output instruction from the user terminal 6 or the management terminal 8, for example. The output instruction typically has a page identifier (e.g., a URL). The output instruction preferably has a user identifier.

The editing instruction receiving unit 722 receives an editing instruction on the partial content. The editing instruction receiving unit 722 receives an editing instruction from the management terminal 8, for example. The editing instruction has a page identifier, information for specifying partial content, or partial content, for example. The information for specifying partial content is a partial content identifier or a block identifier, for example.

The setting instruction receiving unit 723 receives a setting instruction, which is an instruction to add block information. The setting instruction receiving unit 723 receives a setting instruction from the management terminal 8, for example. The setting instruction has a page identifier, location identifying information, or partial content, for example. The setting instruction has an area name, a later-described segment condition, or a later-described probability condition, for example.

The processing unit 73 executes various types of processing. The various types of processing are processing that is executed by the login processing unit 231, the response unit 232, the operation information accumulating unit 233, the attribute value acquiring unit 234, the thumbnail image acquiring unit 235, the determining unit 236, the condition processing execution unit 237, the designated user processing unit 238, the block processing unit 731, and the block accumulating unit 732, for example.

The processing unit 73 constantly acquires information on browsing of a user who is visiting a website. The information on browsing is the time spent on the website or webpage, the number of pages viewed, or the like. That is to say, for example, the processing unit 73 constantly measures the time spent on a website or webpage by a user who is visiting the website or webpage. The processing unit 73 executes product purchase processing, payment processing, and the like, based on the received operation information. The processing unit 73 updates user's dynamic attribute values based on the received operation information. The processing unit 73 acquires the number of times specific partial content was designated, based on the received operation information. The processing unit 73 acquires the time for which specific partial content was displayed.

The block processing unit 731 executes block processing, using location identifying information. The block processing unit 731 executes block processing, using location identifying information contained in each of one or more pieces of block information out of the block information stored in the block information storage unit 711. The block processing is processing regarding a block specified with the block information. The block processing is partial content selecting/output processing, user operation analysis processing, or editing processing, for example. There is no limitation on how to use location identifying information in the case of executing block processing using the location identifying information.

The block specifying part 7311 specifies a block corresponding to the target specifying information contained in the block operation information. The block specifying part 7311 specifies partial content corresponding to the target specifying information contained in the block operation information. The specifying partial content is specifying a block, for example.

The block specifying part 7311 specifies a block corresponding to the target specifying information contained in the operation information received by the operation information receiving unit 222, for example. The specifying a block is acquiring a block identifier, acquiring location identifying information, acquiring block information, acquiring link information to block information, a block identifier, or location identifying information, or the like, for example. The processing for specifying a block may be any processing with which a block can be specified, and there is no limitation on the processing content thereof.

The block specifying part 7311 specifies partial content corresponding to the target specifying information contained in the operation information received by the operation information receiving unit 222, for example. The specifying partial content is acquiring a partial content identifier or partial content, for example. If the number of pieces of partial content corresponding to a block is one, the specifying partial content may be acquiring a block identifier, acquiring location identifying information, acquiring block information, acquiring link information to block information, a block identifier, or location identifying information, or the like, for example.

The block operation information acquiring part 7312 acquires block operation information on an operation on the block corresponding to the target specifying information that is paired with the operation specifying information, using the operation specifying information contained in the received operation information. The block operation information is an example of a block processing result.

The block operation information acquiring part 7312 acquires block operation information on an operation on partial content corresponding to the target specifying information that is paired with the operation specifying information, using the operation specifying information contained in the received operation information.

The block operation information may be operation information itself, which is primitive information acquired as a result of an operation on a block, or information that can be acquired from one or at least two pieces of operation information. The information that can be acquired from one or at least two pieces of operation information is a statistical processing result of one or more pieces of operation information, for example.

The partial content editing part 7313 changes the partial content corresponding to the received editing instruction, according to the editing instruction.

The partial content selecting part 5314 selects, in a block corresponding to block information having two or more pieces of partial content out of block information corresponding to the webpage corresponding to the output instruction, one piece of partial content out of out of the two or more pieces of partial content.

There is no limitation on the algorithm for selecting one piece of partial content out of the two or more pieces of partial content contained in the block information.

The partial content selecting part 5314 acquires one or more attribute values contained in the user information of the user of the user terminal 6 that transmitted the output instruction, from the user information storage unit 211, and selects partial content that is paired with a segment condition satisfied by the one or more attribute values, for example.

The partial content selecting part 5314 selects one piece of partial content out of the two or more pieces of partial content contained in the block information, based on a probability indicated by a probability condition contained in the block information, for example.

The partial content selecting part 5314 selects one piece of partial content at random out of the two or more pieces of partial content contained in the block information, for example. In this case, it is possible to conduct so-called A/B testing. The random selection is selection based on a probability. The random selection is a lottery-like selection. The random selection typically means that multiple pieces of partial content serving as selection candidates can be selected with the same probability, but may mean that the respective pieces of partial contents are selected with different probabilities, according to the probabilities indicated by the probability conditions defined for the selection candidates. The partial content selecting part 5314 selecting one piece of partial content at random is that "different integers of 0 or more" are respectively associated with the pieces of partial content serving as selection candidates, and the partial content selecting part 5314 generates a random number and selects one piece of partial content corresponding to the remainder obtained by dividing the random number by "1/probability", for example.

The output page processing part 7315 executes processing for outputting the webpage containing the partial content selected by the partial content selecting part 5314, thereby acquiring a block processing result.

In this case, the processing for outputting is processing for configuring a webpage containing the one piece of partial content selected by the partial content selecting part 5314, processing for changing the one piece of partial content into information with a structure for output to a web server in which the webpage is stored, or processing for configuring and outputting a webpage containing the one piece of partial content, for example.

The block accumulating unit 732 configures block information according to the received setting instruction, and accumulates the block information in the block information storage unit 711. The block accumulating unit 732 preferably accumulates the configured block information in the block information storage unit 711 in association with a webpage corresponding to the received setting instruction.

The block accumulating unit 732 configures block information having the location specifying information and the partial content contained in the received setting instruction, and accumulates the block information in the block information storage unit 711, for example.

The block accumulating unit 732 configures block information having one or more pieces of information out of the area name, the segment condition, and the probability condition contained in the setting instruction, in addition to the location specifying information, the partial content, and the area name contained in the received setting instruction, and accumulates the block information in the block information storage unit 711, for example.

The block accumulating unit 732 preferably generates a unique block identifier or a unique partial content identifier, configures block information having such an identifier, and accumulates the block information in the block information storage unit 711.

The transmitting unit 74 may transmit various types of information. The various types of information are a processing result, a user terminal identifier, a webpage, or a block processing result, for example. The transmitting unit 74 transmits the various types of information to the user terminal 6 or the management terminal 8, for example.

The output unit 75 outputs various types of information. The output in this case is typically transmission to an external apparatus (the user terminal 6 or the management terminal 8), but may be considered to be a concept that encompasses display on a display screen, projection using a projector, printing by a printer, output of a sound, accumulation in a recording medium, delivery of a processing result to another processing apparatus or another program, and the like. The output unit 75 may transmit the various types of information to the management terminal 8 corresponding to the web server.

The result output unit 751 outputs the block processing result. The block processing result is a result of block processing by the block processing unit 731. The block processing result is block operation information, a webpage, or partial content constituting a webpage, for example.

The result output unit 751 accumulates the block operation information acquired by the block processing unit 731, in the block information storage unit 711, in a pair with a block identifier for identifying the block specified by the block specifying part 7311, for example.

The result output unit 751 accumulates the block operation information acquired by the block processing unit 731, in the block information storage unit 711, in a pair with the partial content specified by the block specifying part 7311, for example.

The result output unit 751 executes partial content output processing, for example. The partial content output processing is processing for outputting the webpage containing the partial content acquired by the partial content editing part 7313. The partial content output processing is processing for accumulating the partial content acquired by the partial content editing part 7313, in the block information storage unit 711, for example. The partial content output processing is processing for arranging the partial content acquired by the partial content editing part 7313, at a location that is in the corresponding webpage and specified with the corresponding location identifying information, for example. The partial content acquired by the partial content editing part 7313 is partial content changed based on the editing instruction.

The output in this case is typically transmission to the user terminal 6, transmission to the management terminal 8, display, or accumulation in a recording medium. The output may be transmission to a web server, for example.

Furthermore, as a result of output of a block processing result in this case, a webpage containing the partial content selected by the partial content selecting part 5314 is output to the user terminal 6 or the management terminal 8.

Various types of information are stored in the management storage unit 81 constituting the management terminal 8. The various types of information are an administrator identifier for identifying an administrator, for example.

The management accepting unit 82 accepts various types of instructions, information, and the like. The various types of instructions, information, and the like are an output instruction, an editing instruction, a setting instruction, or a block information output instruction, for example.

The block information output instruction is an instruction to output the block information. The block information output instruction typically has a page identifier. The block information output instruction has a block identifier, for example.

The various types of instruction and information may be input by any device such as a touch panel, a keyboard, a mouse, or a menu screen.

The management processing unit 83 executes various types of processing. The various types of processing are processing for changing the instructions, information, and the like accepted by the management accepting unit 82 into those with a data structure for transmission, processing for changing information received by the management receiving unit 85 into information with a data structure for output, or the like.

The management transmitting unit 84 transmits various types of instructions, information, and the like. The management transmitting unit 84 typically transmits various types of instructions, information, and the like to the webpage processing apparatus 7. The various types of instructions, information, and the like are an editing instruction or a setting instruction, for example.

The management receiving unit 85 receives various types of information. The management receiving unit 85 typically receives various types of information from the webpage processing apparatus 7. The various types of information are a webpage or block information, for example.

The management output unit 86 outputs various types of information. The various types of information are a webpage.

The user storage unit 61, the storage unit 71, the block information storage unit 711, and the management storage unit 81 are preferably non-volatile recording media, but can also be realized by volatile recording media.

There is no limitation on the procedure in which information is stored in the user storage unit 61 and the like. For example, information may be stored in the user storage unit 61 and the like via a recording medium, information transmitted via a communication line or the like may be stored in the user storage unit 61 and the like, or information input via an input device may be stored in the user storage unit 61 and the like.

The user accepting unit 62 and the management accepting unit 82 may be realized by a device driver for an input device such as a touch panel or a keyboard, control software for a menu screen, or the like.

The user processing unit 63, the processing unit 73, the block processing unit 731, the block accumulating unit 732, the block specifying part 7311, the block operation information acquiring part 7312, the partial content editing part 7313, the partial content selecting part 5314, the output page processing part 7315, and the management processing unit 83 may be typically realized by processors, memories, or the like. Typically, the processing procedure of the user processing unit 63 is realized by software, and the software is stored in a recording medium such as a ROM. Note that the processing procedure may be realized by hardware (dedicated circuits). It will be appreciated that the processors are CPUs, MPUs, or GPUs, for example, but there is no limitation on the type thereof.

The user transmitting unit 64, the transmitting unit 74, the output unit 75, the result output unit 751, and the management transmitting unit 84 are realized by wireless or wired communication parts, for example, but may also be realized by broadcasting parts.

The user receiving unit 65, the receiving unit 72, the output instruction receiving unit 721, the editing instruction receiving unit 722, the setting instruction receiving unit 723, and the management receiving unit 85 are typically realized by wireless or wired communication parts, but may also be realized by broadcast receiving parts.

The user output unit 66 and the management output unit 86 may be considered to include or to not include an output device such as a display screen or a speaker. The user output unit 66 may be realized by driver software for an output device, a combination of driver software for an output device and the output device, or the like.

Next, an operation example of the information system C will be described. First, an operation example of the user terminal 6 will be described with reference to the flowchart in FIG. 19. In the flowchart in FIG. 19, a description of steps similar to those in FIG. 4 has been omitted.

(Step S1901) The user accepting unit 62 determines whether or not it has accepted an output instruction. If it has accepted an output instruction, the procedure advances to step S1902, or otherwise the procedure returns to step S401. The output instruction has a page identifier. The output instruction is preferably associated with a user identifier or a user terminal identifier.

(Step S1902) The user processing unit 63 configures an output instruction that is to be transmitted. The user transmitting unit 64 transmits the output instruction to the webpage processing apparatus 7. The output instruction that is to be transmitted has a page identifier and a user identifier, for example.

(Step S1903) The user receiving unit 65 determines whether or not it has received a webpage corresponding to the output instruction. If it has received a webpage, the procedure advances to step S1904, or otherwise the procedure returns to step S1903. The webpage that is received is typically a file realized by an HTML, an XML, or the like.

(Step S1904) The user processing unit 63 configures a webpage that is to be output, from the received webpage. The user output unit 66 outputs the webpage. The procedure returns to step S401.

Figure 19:
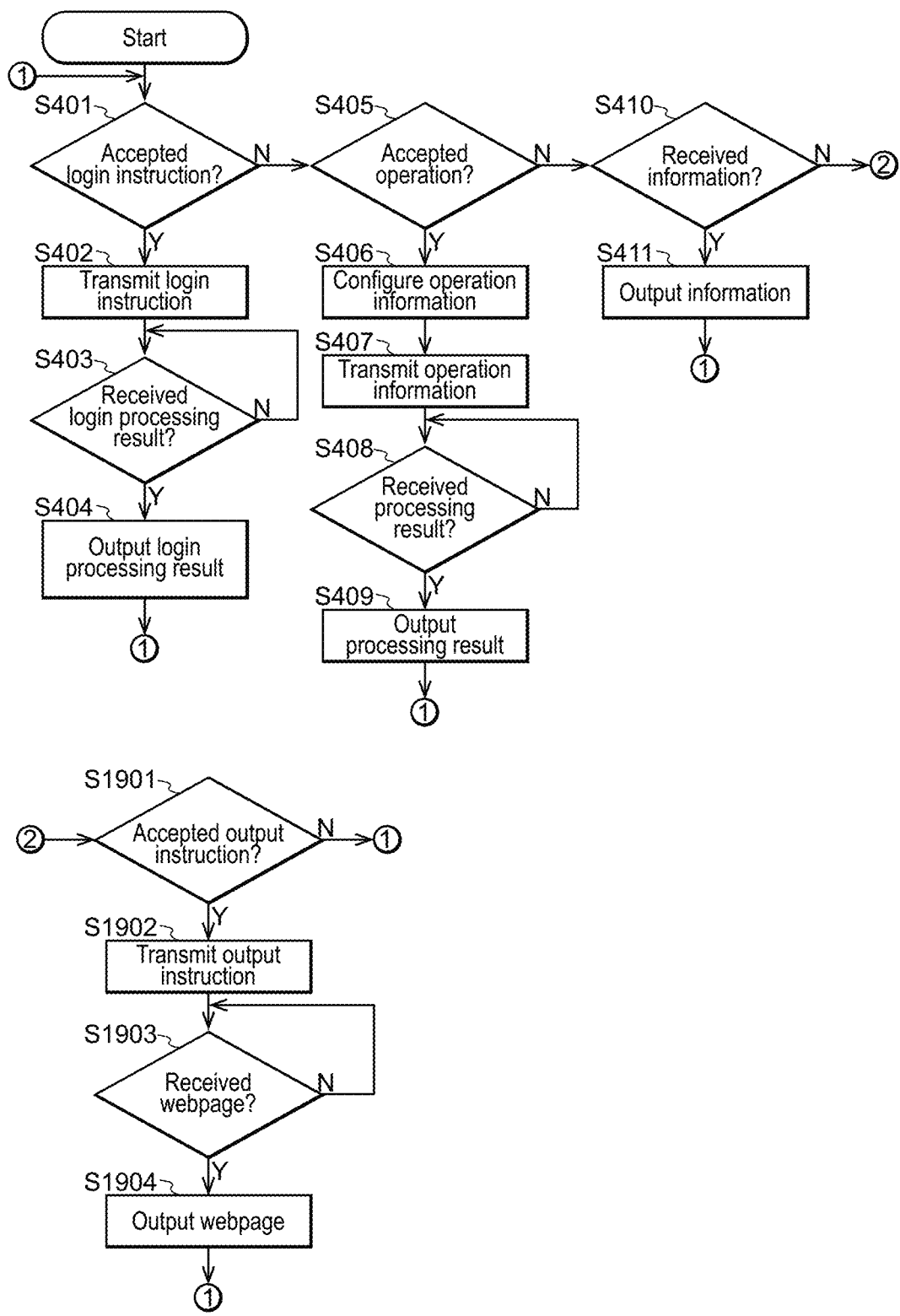
FIG. 19 is a flowchart illustrating an operation example of a user terminal 4 in the embodiment.

In the flowchart in FIG. 19, the processing ends at power off or at an interruption of termination processing.

Next, an operation example of the webpage processing apparatus 7 will be described with reference to the flowchart in FIGS. 20 and 21. In the flowchart in FIGS. 20 and 21, a description of steps similar to those in FIG. 5 has been omitted.

(Step S2001) The processing unit 73 executes operation information accumulating processing. An example of the operation information accumulating processing will be described with reference to the flowchart in FIG. 22.

(Step S2002) The output instruction receiving unit 721 determines whether or not it has received an output instruction. If it has received an output instruction, the procedure advances to step S2003, or otherwise the procedure advances to step S2005.

(Step S2003) The block processing unit 731 executes webpage configuring processing. An example of the webpage configuring processing will be described with reference to the flowchart in FIG. 23.

(Step S2004) The transmitting unit 74 transmits the webpage configured in step S2003, to the terminal that transmitted the output instruction. The procedure returns to step S501. The terminal that transmitted the output instruction is the user terminal 6 or the management terminal 8.

(Step S2005) The editing instruction receiving unit 722 determines whether or not it has received an editing instruction. If it has received an editing instruction, the procedure advances to step S2006, or otherwise the procedure advances to step S2010.

(Step S2006) The partial content editing part 7313 acquires a page identifier contained in the editing instruction.

(Step S2007) The partial content editing part 7313 acquires partial content contained in the editing instruction.

(Step S2008) The partial content editing part 7313 acquires a partial content identifier or location specifying information contained in the editing instruction.

(Step S2009) The partial content editing part 7313 accumulates the acquired partial content in a region corresponding to the page identifier and the partial content identifier or location specifying information and located within the block information storage unit 711. The procedure returns to step S501.

The partial content editing part 7313 typically overwrites the original partial content before editing with the acquired partial content.

(Step S2010) The setting instruction receiving unit 723 determines whether or not it has received a setting instruction. If it has received a setting instruction, the procedure advances to step S2011, or otherwise the procedure advances to step S2017.

(Step S2011) The block accumulating unit 732 acquires a page identifier contained in the setting instruction.

(Step S2012) The block accumulating unit 732 acquires partial content and the like contained in the setting instruction. The partial content and the like are only partial content, partial content and a segment condition, partial content and a probability condition, or partial content, a segment condition, and a probability condition, for example.

(Step S2013) The block accumulating unit 732 generates a unique partial content identifier.

(Step S2014) The block accumulating unit 732 acquires location specifying information contained in the setting instruction.

(Step S2015) The block accumulating unit 732 configures block information that is to be accumulated. The block information has partial content, a partial content identifier, and location specifying information. The block information may have one or more conditions out of the segment condition and the probability condition.

(Step S2016) The block accumulating unit 732 accumulates the configured block information in the block information storage unit 711 in association with a page identifier. The procedure returns to step S501.

(Step S2017) The processing unit 73 determines whether or not to execute statistical processing. If statistical processing is to be executed, the procedure advances to step S2018, or otherwise the procedure advances to step S2022. The processing unit 73 determines to execute statistical processing, in response to an instruction from a user, for example. The processing unit 73 determines to execute statistical processing each time operation information is received, for example.

(Step S2018) The block processing unit 731 substitutes 1 for a counter i.

(Step S2019) The block processing unit 731 determines whether or not there is an $i^{-th}$ piece of partial content that is a statistical processing target. If there is an $i^{-th}$ piece of partial content, the procedure advances to step S2020, or otherwise the procedure returns to step S501. The partial content that is a statistical processing target may be all pieces of block information in the block information storage unit 711, or block information corresponding to a page identifier contained in a received instruction, for example.

(Step S2020) The block processing unit 731 executes statistical processing on the $i^{-th}$ piece of partial content. An example of the statistical processing on partial content will be described with reference to the flowchart in FIG. 24.

(Step S2021) The block processing unit 731 increments the counter i by 1. The procedure returns to step S2019.

(Step S2022) The receiving unit 72 determines whether or not it has received a block information output instruction from the management terminal 8. If it has received a block information output instruction, the procedure advances to step S2023, or otherwise the procedure returns to step S501.

(Step S2023) The block processing unit 731 acquires one or more pieces of block information corresponding to the block information output instruction, from the block information storage unit 711.

(Step S2024) The transmitting unit 74 transmits the one or more pieces of block information acquired in step S2023, to the management terminal 8 that transmitted the block information output instruction. The procedure returns to step S501.

Figure 20:
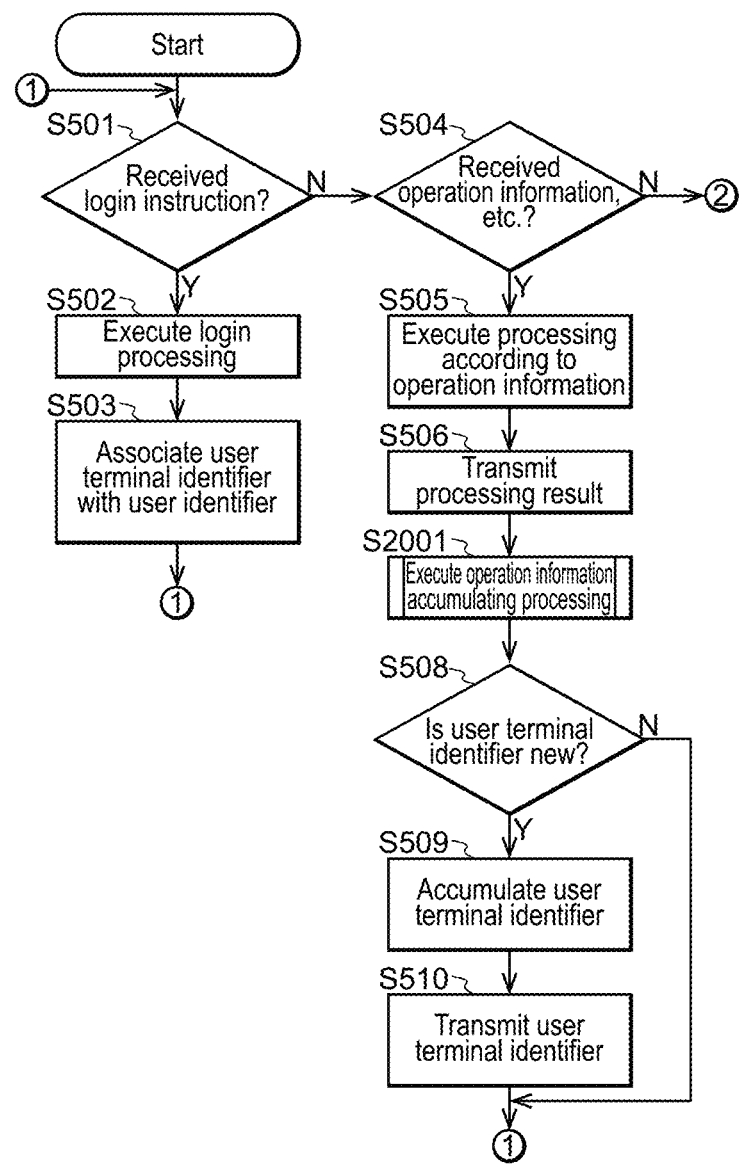
FIG. 20 is a flowchart illustrating an operation example of the webpage processing apparatus 5 in the embodiment.
Figure 21:
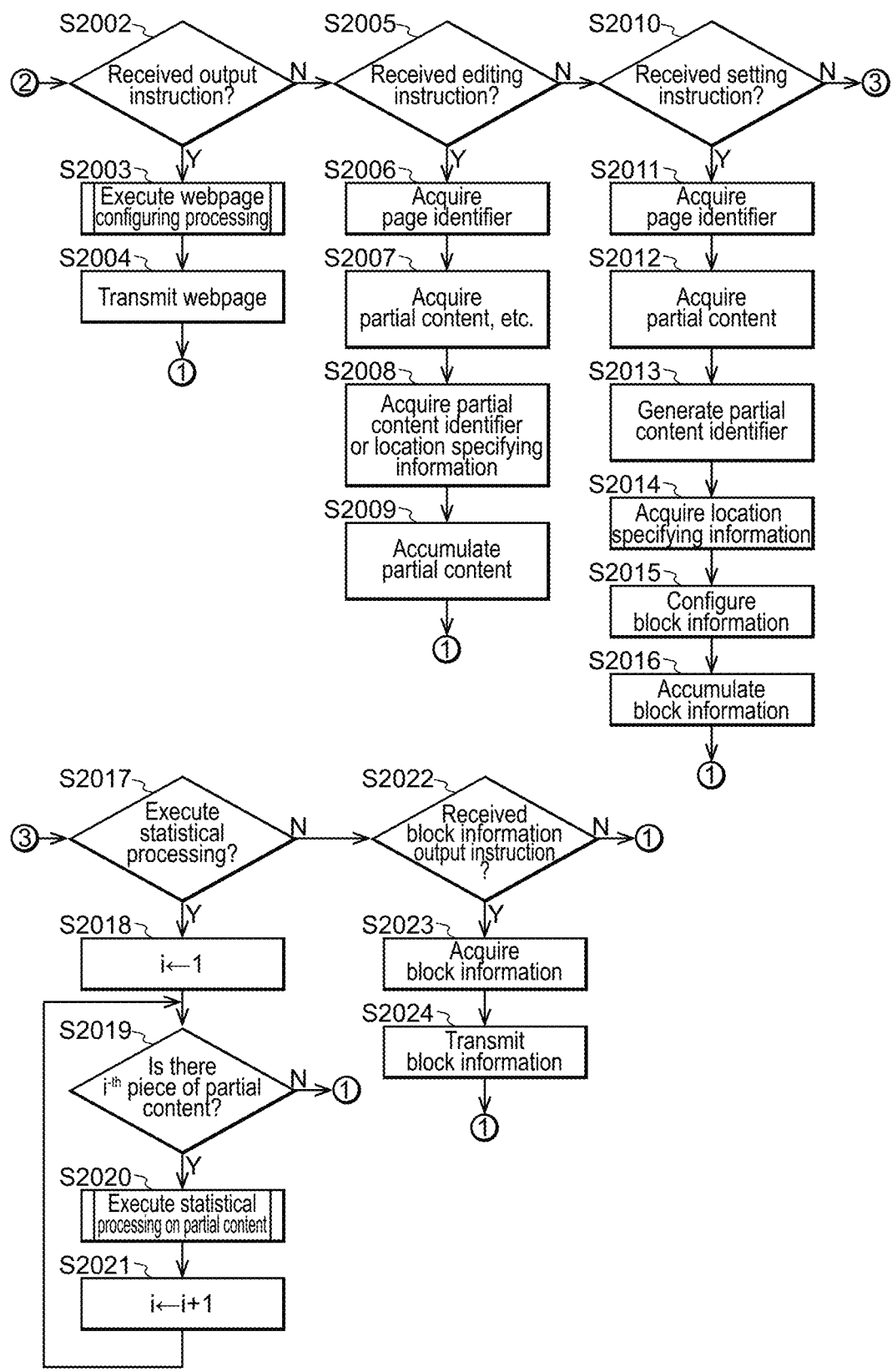
FIG. 21 is a flowchart illustrating an operation example of the webpage processing apparatus 5 in the embodiment.

In the flowchart in FIGS. 20 and 21, the processing ends at power off or at an interruption of termination processing.

Figure 22:
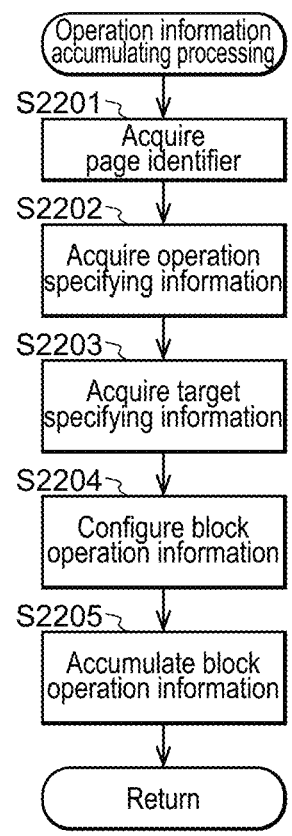
FIG. 22 is a flowchart illustrating an example of operation information accumulating processing in the embodiment.

Next, an example of the operation information accumulating processing in step S2001 will be described with reference to the flowchart in FIG. 22.

(Step S2201) The block operation information acquiring part 7312 acquires a page identifier of a webpage corresponding to the received operation information and the like.

(Step S2202) The block specifying part 7311 acquires operation specifying information from the received operation information and the like.

(Step S2203) The block operation information acquiring part 7312 acquires target specifying information from the received operation information and the like. In this case, the target specifying information may not be acquired.

(Step S2204) The block operation information acquiring part 7312 configures block operation information using the page identifier, the operation specifying information, and the target specifying information.

(Step S2205) The result output unit 751 accumulates the block operation information configured in step S2204, in the operation information storage unit 213 or/and the block information storage unit 711. The procedure returns to the upper-level processing.

Figure 23:
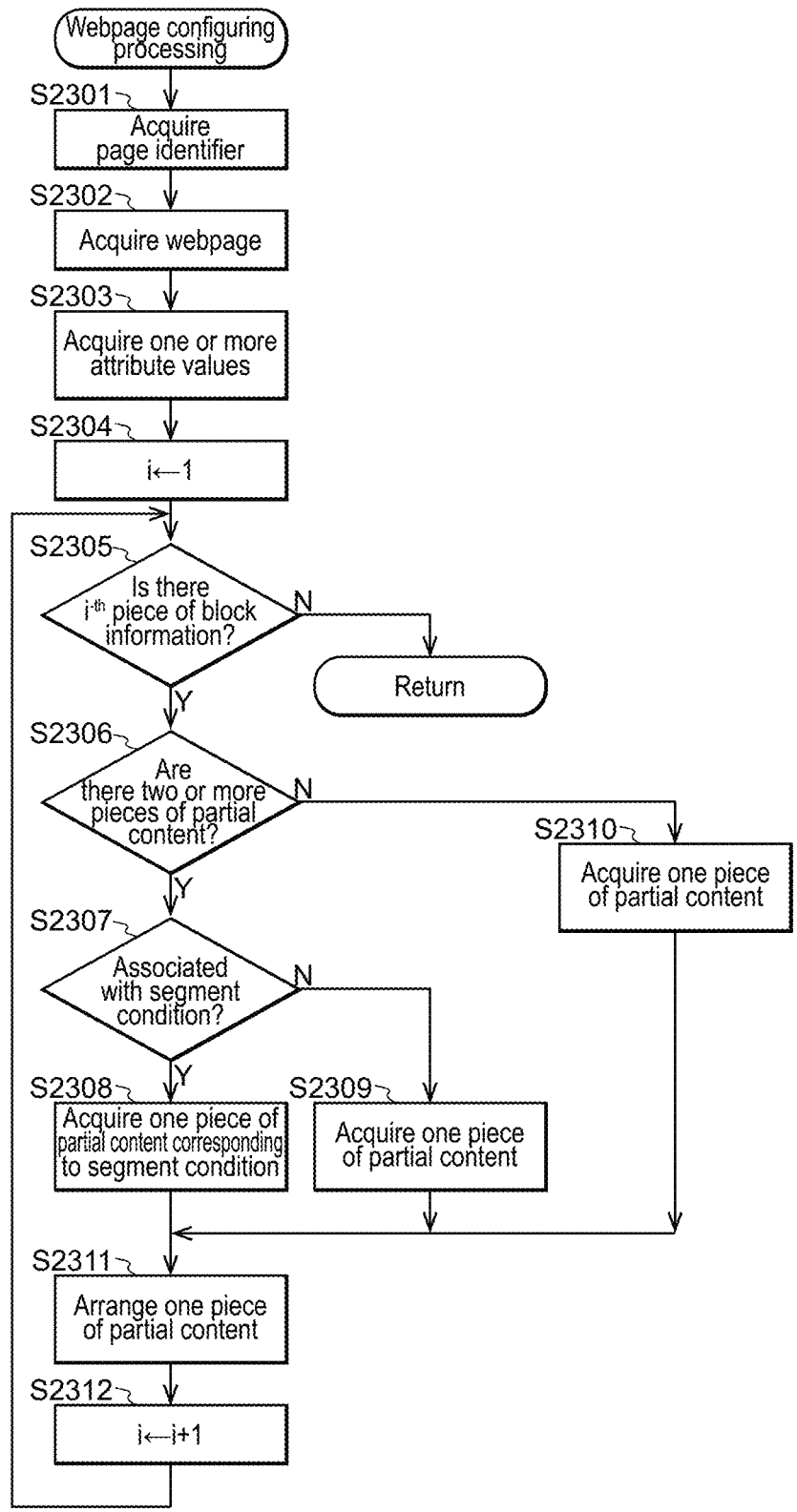
FIG. 23 is a flowchart illustrating an example of webpage configuring processing in the embodiment.

Next, an example of the webpage configuring processing in step S2003 will be described with reference to the flowchart in FIG. 23.

(Step S2301) The block processing unit 731 acquires a page identifier.

(Step S2302) The block processing unit 731 acquires a webpage identified with the page identifier. The block processing unit 731 may acquire a webpage from the storage unit 71 or an unshown external web server.

(Step S2303) The block processing unit 731 acquires a user identifier corresponding to the received operation information and the like. Then, the block processing unit 731 acquires one or more attribute values corresponding to the user identifier, from the user information storage unit 211.

(Step S2304) The block processing unit 731 substitutes 1 for a counter i.

(Step S2305) The block processing unit 731 determines whether or not there is an $i^{-th}$ piece of block information corresponding to the page identifier, in the block information storage unit 711. If there is an $i^{-th}$ piece of block information, the procedure advances to step S2306, or otherwise the procedure returns to the upper-level processing.

(Step S2306) The block processing unit 731 determines whether or not the $i^{-th}$ piece of block information has two or more pieces of partial content. If the block information has two or more pieces of partial content, the procedure advances to step S2307, or otherwise the procedure advances to step S2310.

(Step S2307) The block processing unit 731 determines whether or not partial content contained in the $i^{-th}$ piece of block information is associated with the segment condition. If it is associated with the segment condition, the procedure advances to step S2308, or otherwise the procedure advances to step S2309.

(Step S2308) The partial content selecting part 5314 acquires partial content that is paired with the segment condition that is matched by the one or more attribute values acquired in step S2303. The procedure advances to step S2311.

(Step S2309) The partial content selecting part 5314 selects one piece of partial content that matches a probability indicated by a probability condition, out of the two or more pieces of partial content contained in the $i^{-th}$ piece of block information. The procedure advances to step S2311.

(Step S2310) The block processing unit 731 acquires one piece of partial content contained in the $i^{-th}$ piece of block information.

(Step S2311) The output page processing part 7315 arranges the acquired one piece of partial content, at a location specified with the location specifying information contained in the $i^{-th}$ piece of block information.

(Step S2312) The block processing unit 731 increments the counter i by 1. The procedure returns to step S2305.

Figure 24:
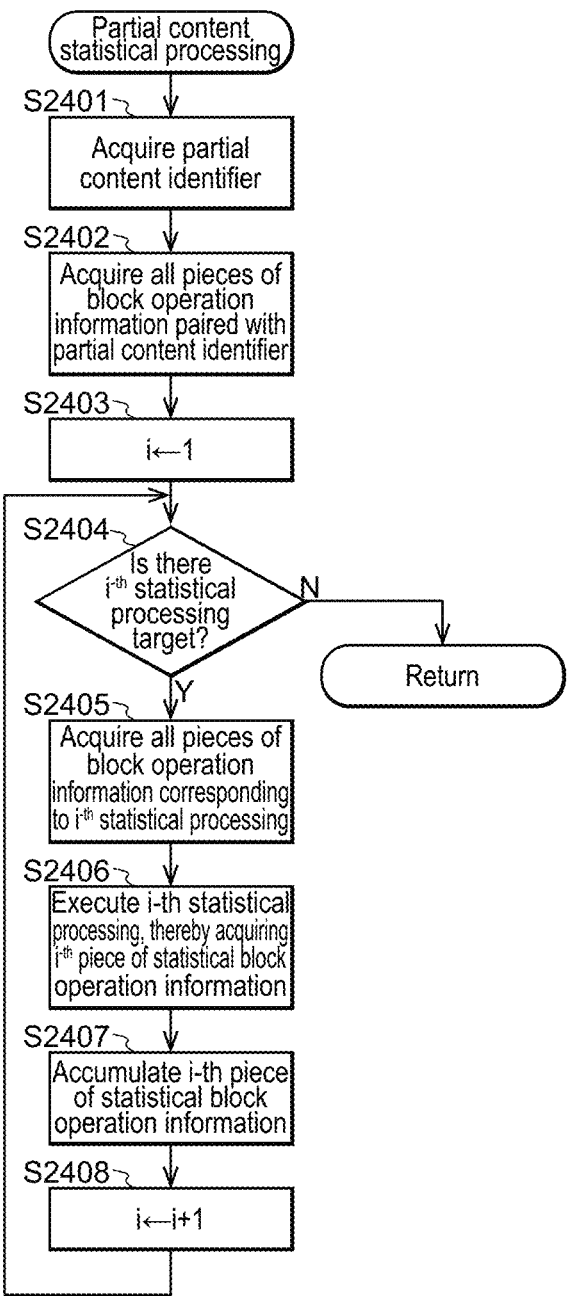
FIG. 24 is a flowchart illustrating an example of statistical processing on partial content in the embodiment.

Next, an example of the partial content statistical processing in step S2020 will be described with reference to the flowchart in FIG. 24.

(Step S2401) The block operation information acquiring part 7312 acquires a partial content identifier of a statistical processing target. The partial content identifier may be an object identifier or an object name.

(Step S2402) The block operation information acquiring part 7312 acquires all pieces of block operation information that are paired with the partial content identifier acquired in step S2401, from the operation information storage unit 213 or the block information storage unit 711. The block operation information that is paired with a partial content identifier may be block operation information having the partial content identifier.

(Step S2403) The block operation information acquiring part 7312 substitutes 1 for a counter i.

(Step S2404) The block operation information acquiring part 7312 determines whether or not there is an $i^{-th}$ statistical processing target. If there is an $i^{-th}$ statistical processing target, the procedure advances to step S2405, or otherwise the procedure returns to the upper-level processing.

(Step S2405) The block operation information acquiring part 7312 acquires all pieces of block operation information corresponding to the $i^{-th}$ statistical processing, from the block operation information acquired in step S2402.

(Step S2406) The block operation information acquiring part 7312 executes the $i^{-th}$ statistical processing on all pieces of block operation information acquired in step S2405, thereby acquiring an $i^{-th}$ piece of statistical block operation information.

(Step S2407) The block operation information acquiring part 7312 accumulates the $i^{-th}$ piece of statistical block operation information acquired in step S2406, in the block information storage unit 711, in association with the partial content identifier acquired in step S2401.

(Step S2408) The block operation information acquiring part 7312 increments the counter i by 1. The procedure returns to step S2404.

Next, an operation example of the management terminal 8 will be described with reference to the flowchart in FIG. 25.

(Step S2501) The management accepting unit 82 determines whether or not it has accepted an output instruction. If it has accepted an output instruction, the procedure advances to step S2502, or otherwise the procedure advances to step S2505.

(Step S2502) The management processing unit 83 configures an output instruction that is to be transmitted. Next, the management transmitting unit 84 transmits the configured output instruction to the webpage processing apparatus 7. The output instruction may have a page identifier. The output instruction may have a segment condition.

(Step S2503) The management receiving unit 85 determines whether or not it has received a webpage corresponding to the output instruction. If it has received a webpage, the procedure advances to step S2504, or otherwise the procedure returns to step S2503.

(Step S2504) The management processing unit 83 configures a webpage that is to be output, from the received webpage. The management output unit 86 outputs the webpage. The procedure returns to step S2501.

(Step S2505) The management accepting unit 82 determines whether or not it has accepted a setting instruction. If it has accepted a setting instruction, the procedure advances to step S2506, or otherwise the procedure advances to step S2508.

(Step S2506) The management processing unit 83 configures a setting instruction that is to be transmitted. The setting instruction has location specifying information and partial content, for example. The setting instruction may further have an area name, a segment condition, a probability condition, and the like.

(Step S2507) The management transmitting unit 84 transmits the setting instruction configured in step S2506, to the webpage processing apparatus 7. The procedure returns to step S2501.

(Step S2508) The management accepting unit 82 determines whether or not it has accepted a block information output instruction. If it has accepted a block information output instruction, the procedure advances to step S2509, or otherwise the procedure returns to step S2501. The block information output instruction has a page identifier, for example.

(Step S2509) The management processing unit 83 configures a block information output instruction that is to be transmitted. The management transmitting unit 84 transmits the block information output instruction to the webpage processing apparatus 7.

(Step S2510) The management receiving unit 85 determines whether or not it has received block information from the webpage processing apparatus 7. If it has received block information, the procedure advances to step S2511, or otherwise the procedure returns to step S2510.

(Step S2511) The management processing unit 83 configures block information that is to be output, using the received block information. The management output unit 86 outputs the block information.

(Step S2512) The management accepting unit 82 determines whether or not it has accepted an editing instruction on the output block information. If it has accepted an editing instruction, the procedure advances to step S2513, or otherwise the procedure returns to step S2512.

(Step S2513) The management processing unit 83 configures an editing instruction that is to be transmitted.

(Step S2514) The management transmitting unit 84 transmits the editing instruction configured in step S2513, to the webpage processing apparatus 7. The procedure returns to step S2501.

Figure 25:
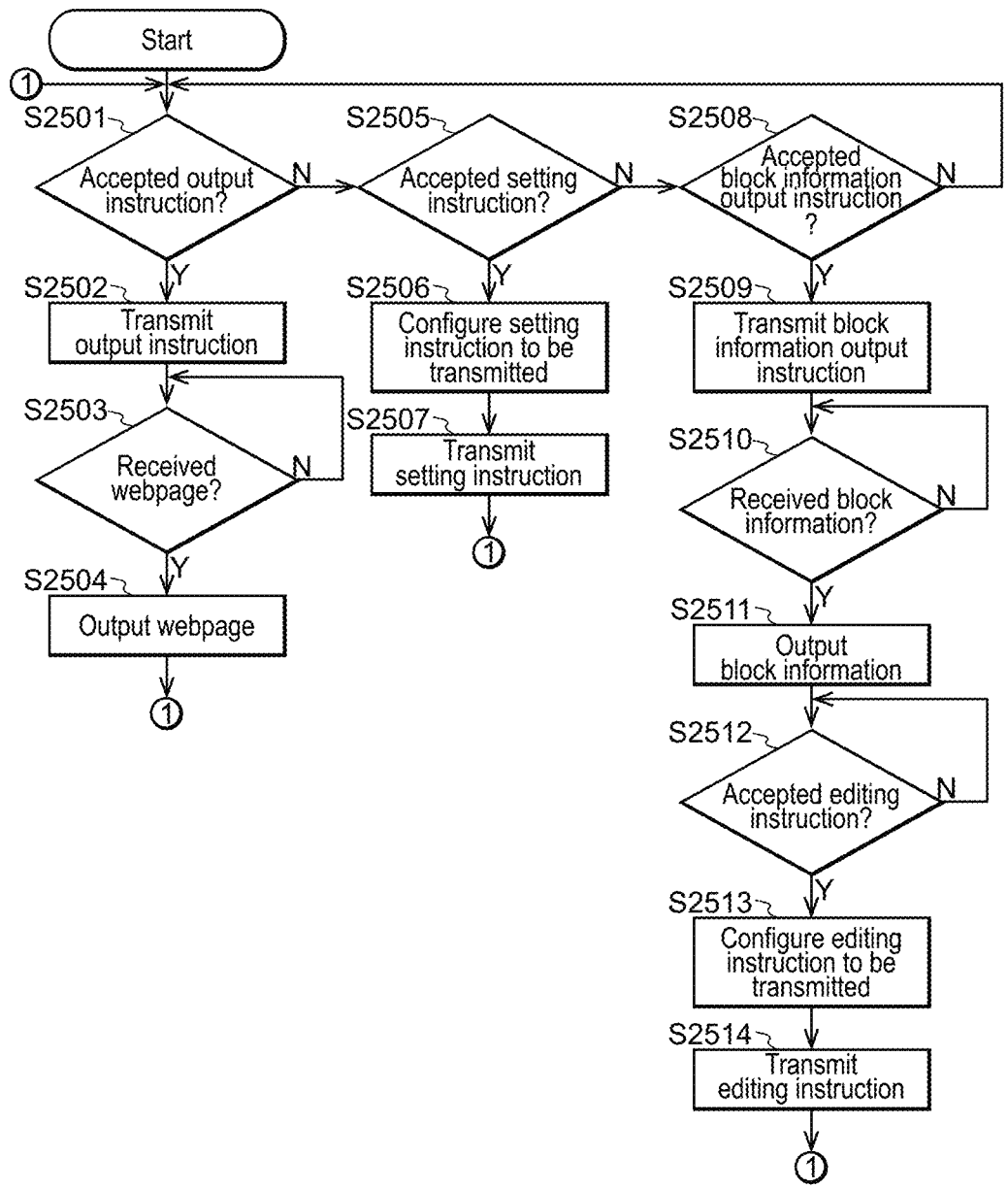
FIG. 25 is a flowchart illustrating an operation example of a management terminal 6 in the embodiment.

In the flowchart in FIG. 25, after block information is output in step S2511, the procedure may return to step S2501.

Furthermore, in the flowchart in FIG. 25, the processing ends at power off or at an interruption of termination processing.

Hereinafter, a specific operation of the information system C in this embodiment will be described. FIG. 16 is a conceptual diagram of the information system C.

It is assumed that the user information management table shown in FIG. 9 is stored in the user information storage unit 211 of the webpage processing apparatus 7.

Furthermore, it is assumed that the operation information management table having the structure shown in FIG. 11 is stored in the operation information storage unit 213. It is assumed that user's operation information on each piece of partial content of a webpage identified with a later-described page identifier "karte.io" is accumulated in the operation information management table.

Figure 26:
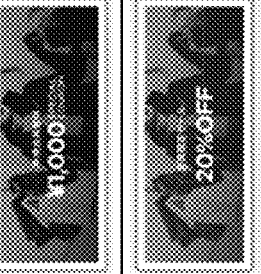
FIG. 26 is a diagram showing a block information management table in the embodiment.

Furthermore, it is assumed that the block information management table having the structure shown in FIG. 26 is stored in the block information storage unit 711. The block information management table is a table for managing defined block information, and is a table provided for each webpage (which may also be said to be a website).

Records each having "block identifier", "area name", "location specifying information", "segment condition", "probability condition", "partial content", and "block operation information" are stored in the block information management table.

"Area name" is a name of a block. "Location specifying information" in this example is a CSS selector. "Segment condition" in this example is a condition using a user's attribute value, or a condition based on the operation information received from the user terminal 6. "Probability condition" is information for designating a probability with which each piece of partial content is output in the case in which two or more pieces of partial content are associated with one block. The probability condition is that two or more pieces of partial content have the same probability, for example, but may be that they have different probabilities. "Block operation information" in this example is statistical block operation information, and means "time spent" and "number of times of designation" in this case. "Time spent" may be the time for which partial content is displayed or the time for which a mouse cursor is positioned on partial content. "Number of times of designation" is the number of times partial content was designated. "Segment condition" is preferably a condition using one or at least two types of attribute values out of the user's static attribute values and dynamic attribute values.

The record with "block identifier=1" in FIG. 26 indicates that a webpage in which the partial content "CX platform KARTE" is arranged in the area "key message" is output to a user who visited a webpage identified with the page identifier "karte.io" three or more times. The record with "block identifier=1" indicates that a webpage in which the original partial content "To improve the customer experience value of all services" described in the webpage is arranged in the area "key message" is output to a user who visited the webpage two or less times.

The record with "block identifier=2" in FIG. 26 indicates that a webpage in which each piece of partial content is selected with the probability of 50% out of the two pieces of partial content corresponding to the area name "key visual" and is arranged in the area "key visual" is output when a user who satisfies the segment condition "search-access user"

visits the webpage. Note that a webpage in which the original partial content is arranged in the area "key visual" is output when a user who does not satisfy the segment condition "search-access user" visits the webpage. The original partial content may be either one of the two pieces of partial content corresponding to the area name "key visual" in FIG. 26, or partial content that is different from the two pieces of partial content. The search-access user is a user who accessed the webpage via a search engine. The operation information received from the user terminal 6 of the user includes "google.com".

The record with "block identifier=3" in FIG. 26 indicates that a webpage in which any one of the three pieces of partial content contained in the record with "block identifier=3" is selected at random with the same probability and arranged in the area "XXX" when any user visits the webpage, because there is no segment condition.

In this situation, the following four specific examples will be described. In Specific Example 1, an operation example of block information defining processing will be described. In Specific Example 2, an example of partial content selecting/output processing using managed block information will be described. In Specific Example 3, an example of user operation analysis processing using managed block information and editing processing will be described. In Specific Example 4, the case will be described in which an administrator checks two or more webpages corresponding to a webpage corresponding to one page identifier by switching segment conditions using block information.

Specific Example 1

In Specific Example 1, an operation example of processing for defining block information corresponding to a webpage identified with the page identifier "karte.io" (see FIG. 27) will be described.

Figure 27:
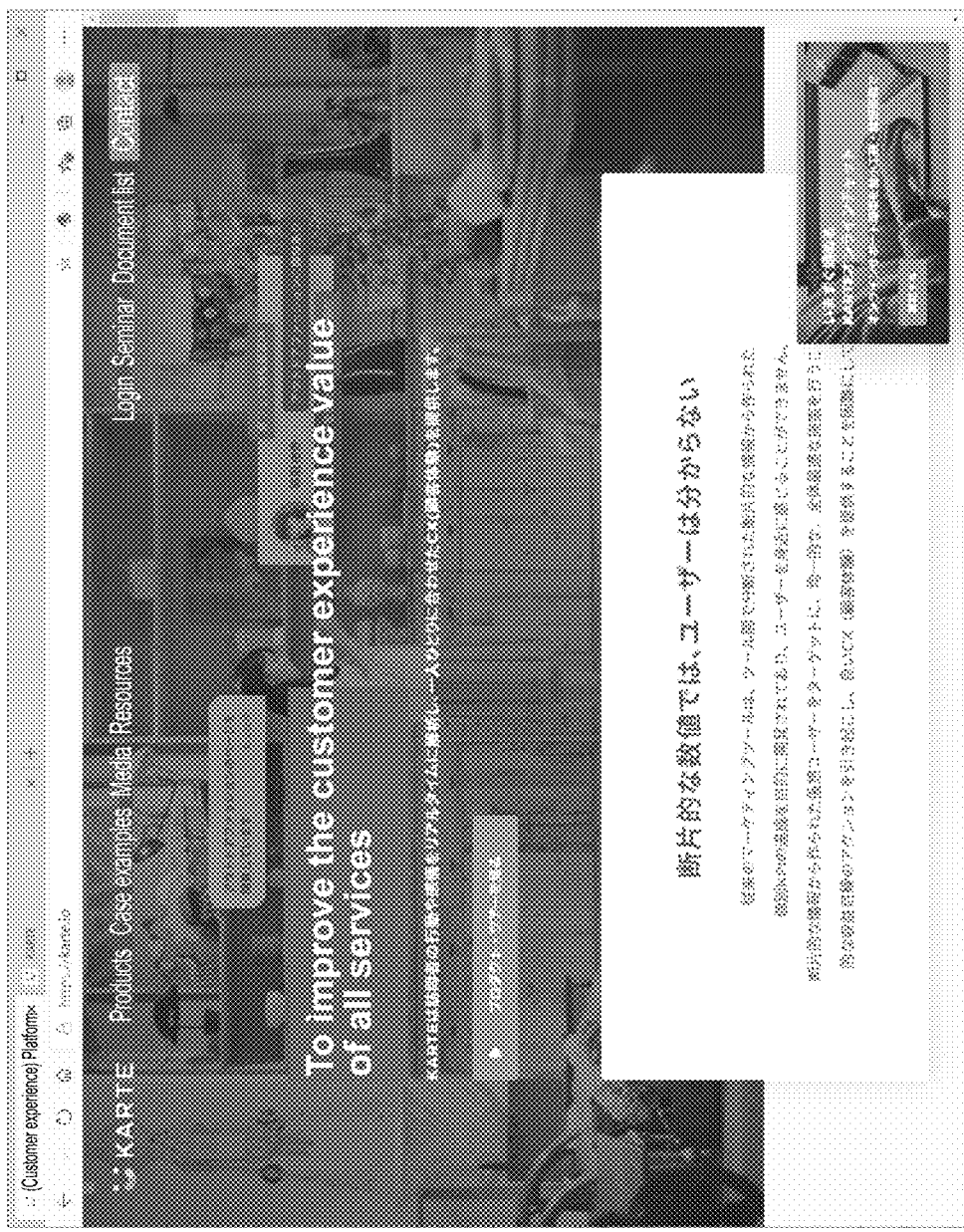
FIG. 27 is a diagram showing an output example in the embodiment.

It is assumed that the administrator of the webpage inputs a webpage output instruction to the management terminal 8, and the webpage in FIG. 27 is output to the management terminal 8. Next, it is assumed that the user designates a button for setting the mode to the block information defining mode, in the webpage on the management terminal 8, and the mode is set to the block information defining mode. It is assumed that, in the defining mode, partial content at the position on which the cursor is located is selected, and a CSS selector (an example of the location identifying information) corresponding to the partial content is displayed.

Figure 28:
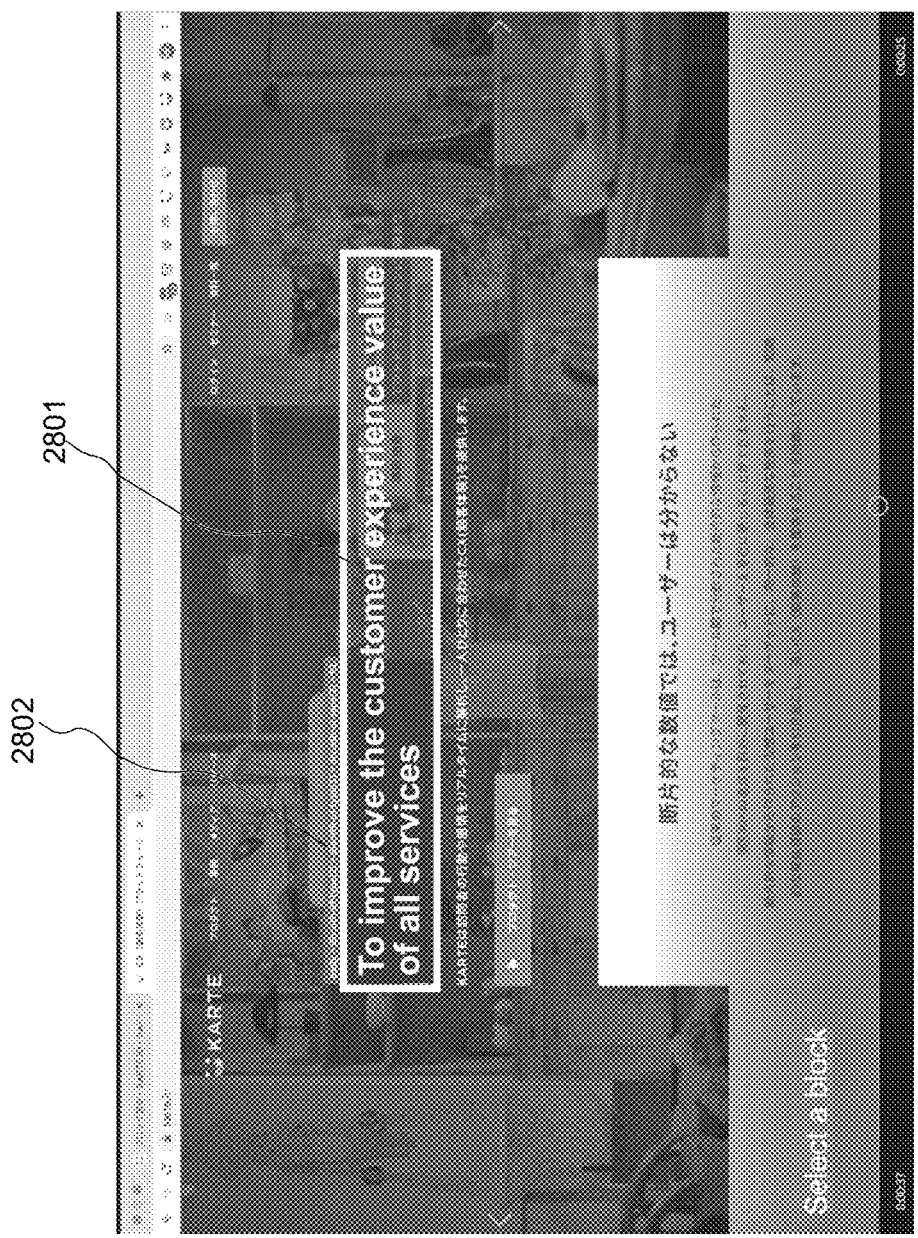
FIG. 28 is a diagram showing an output example in the embodiment.

Then, it is assumed that the administrator selects partial content 2801 in FIG. 28. A CSS selector 2802 of the partial content 2801 is displayed near (next to and above, in this example) the partial content 2801.

Figure 29:
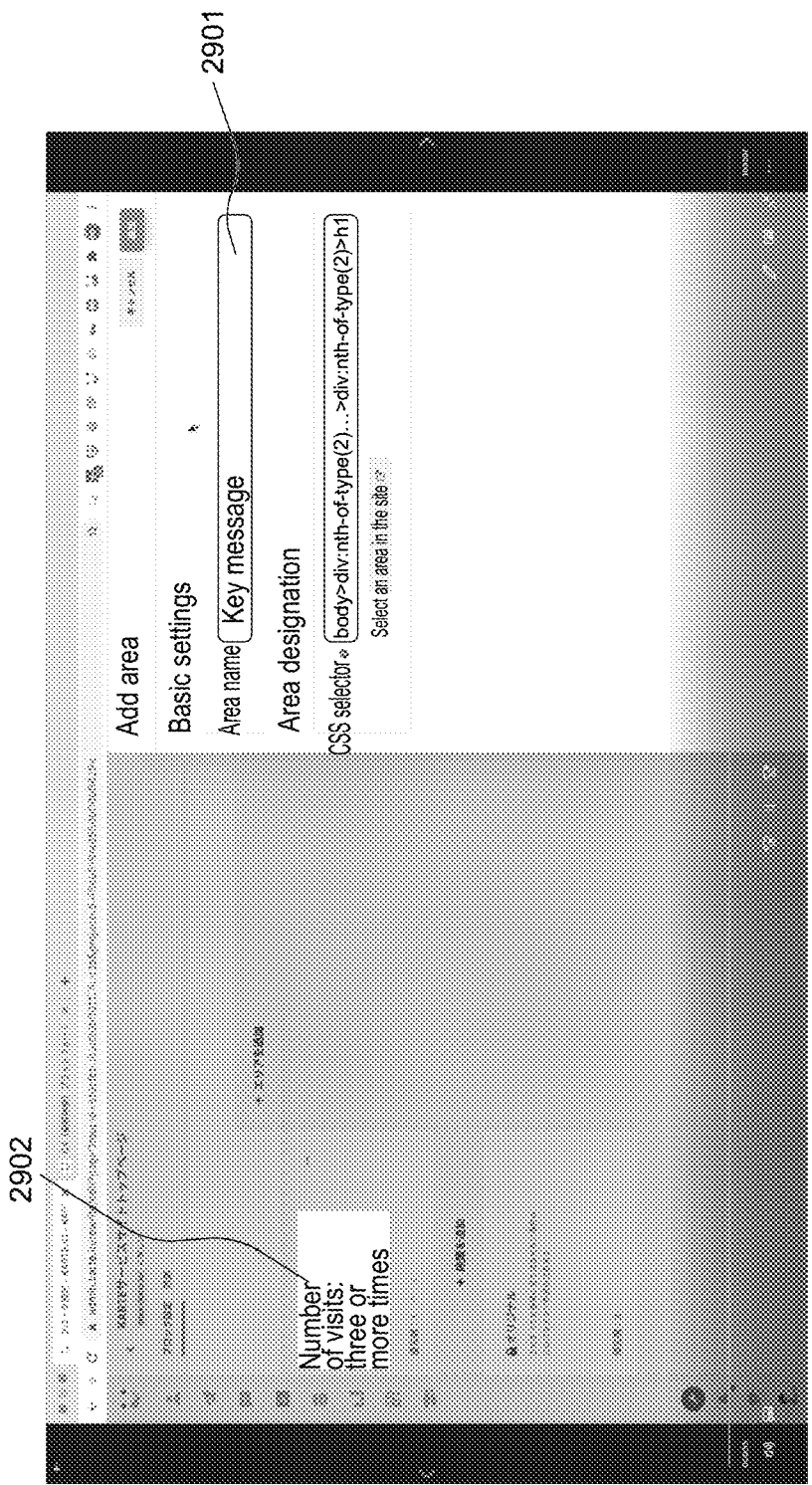
FIG. 29 is a diagram showing an output example in the embodiment.

Next, it is assumed that the display of the management terminal 8 switches to the screen shown in FIG. 29. It is assumed that the administrator inputs the area name "key message" to a field 2901 in FIG. 29, and inputs a segment condition 2902 "number of visits: three or more times".

Figure 30:
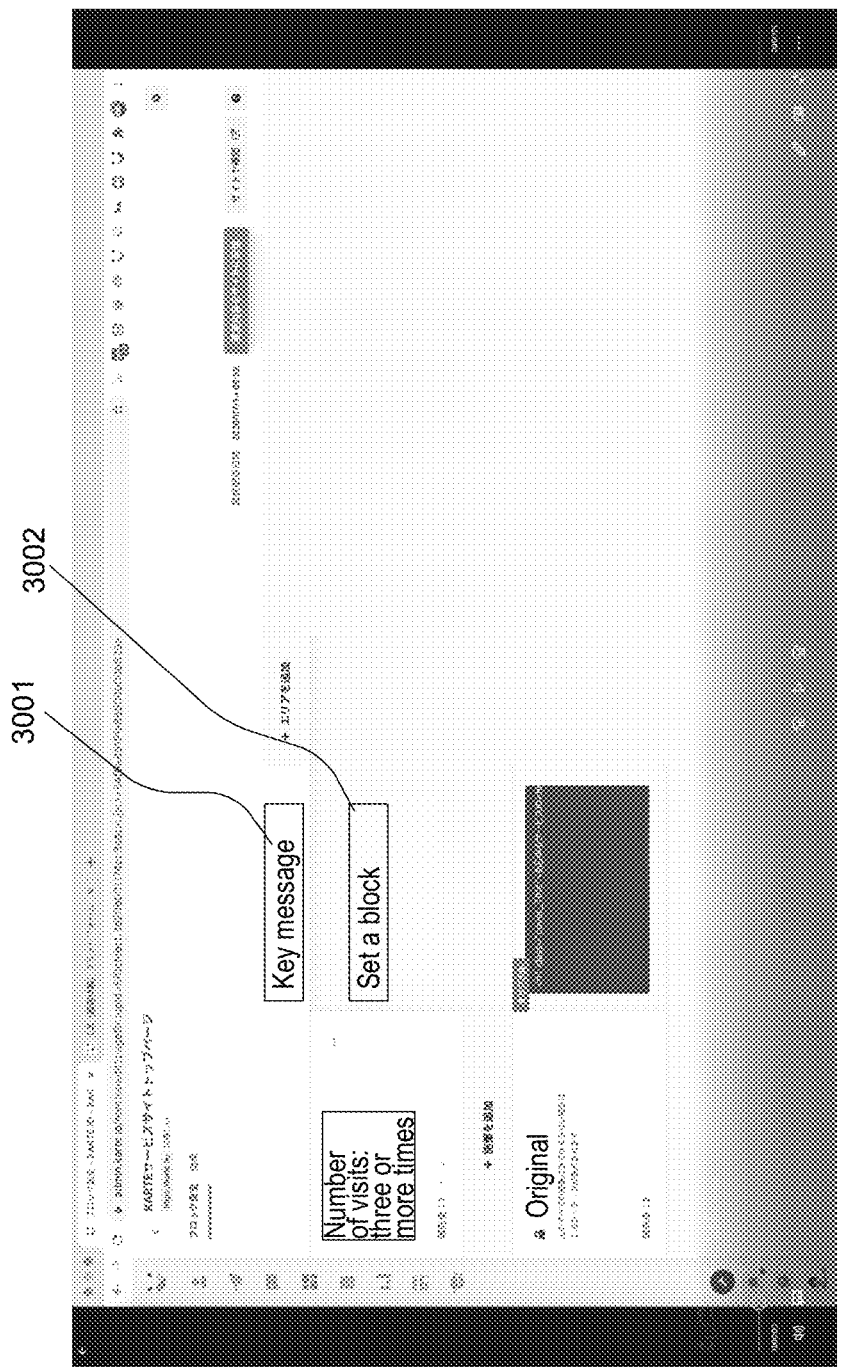
FIG. 30 is a diagram showing an output example in the embodiment.

Next, it is assumed that the display of the management terminal 8 switches to the screen shown in FIG. 30. That is to say, the display of the management terminal 8 is changed to a display 3001 indicating that the area name "key message" input to the field 2901 is used as a new area name of the block.

Figure 31:
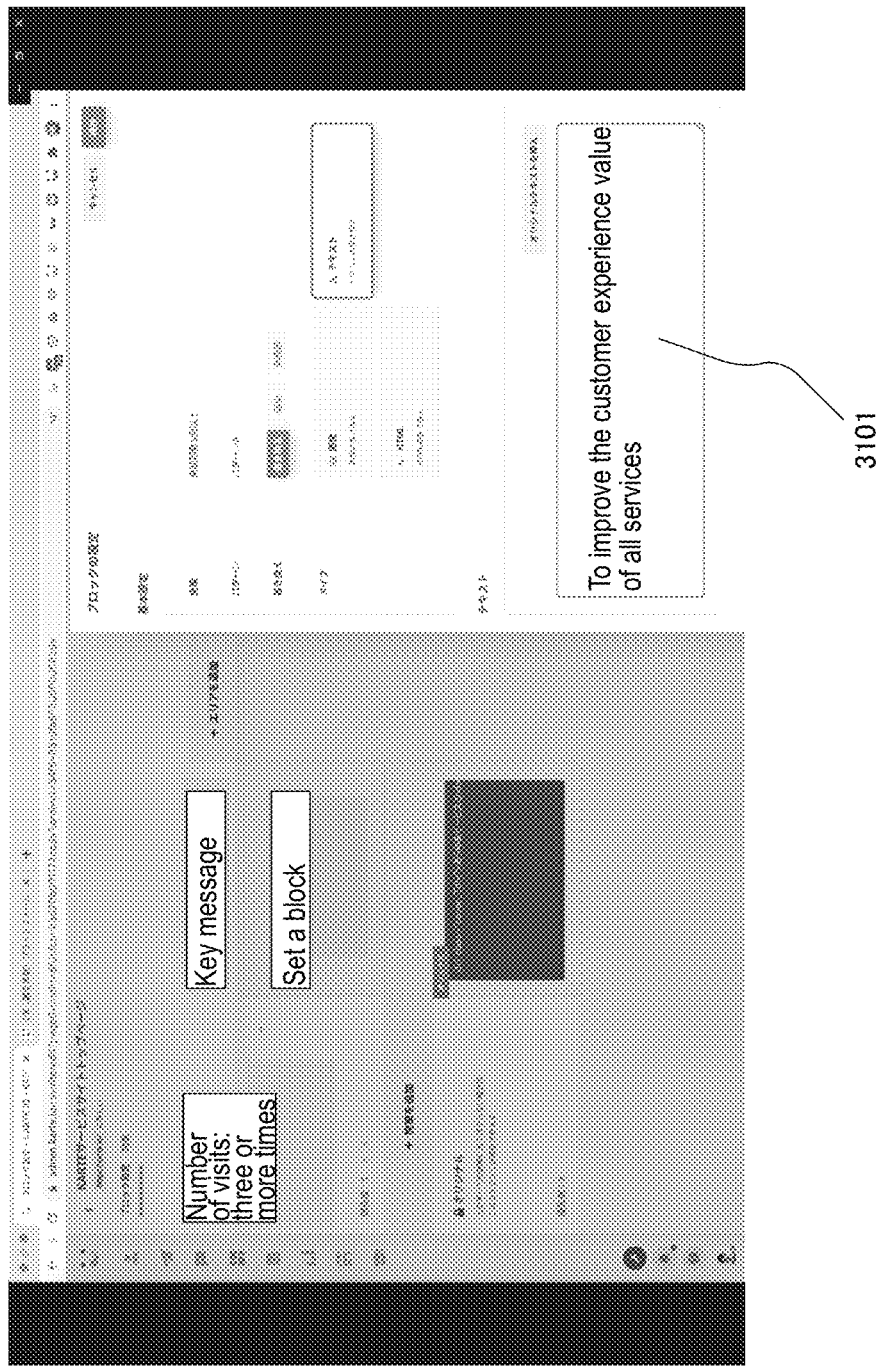
FIG. 31 is a diagram showing an output example in the embodiment.

Next, it is assumed that the administrator designates a button 3002 "set a block". Then, the original partial content "To improve the customer experience value of all services" corresponding to the CSS selector "body>div:nth-of-type(2) >div:nth-of-type(1)>div:nth-of-type(2)>>h1" of the block is acquired from the original webpage, and is arranged in a field 3101 that is editable (see FIG. 31).

Figure 32:
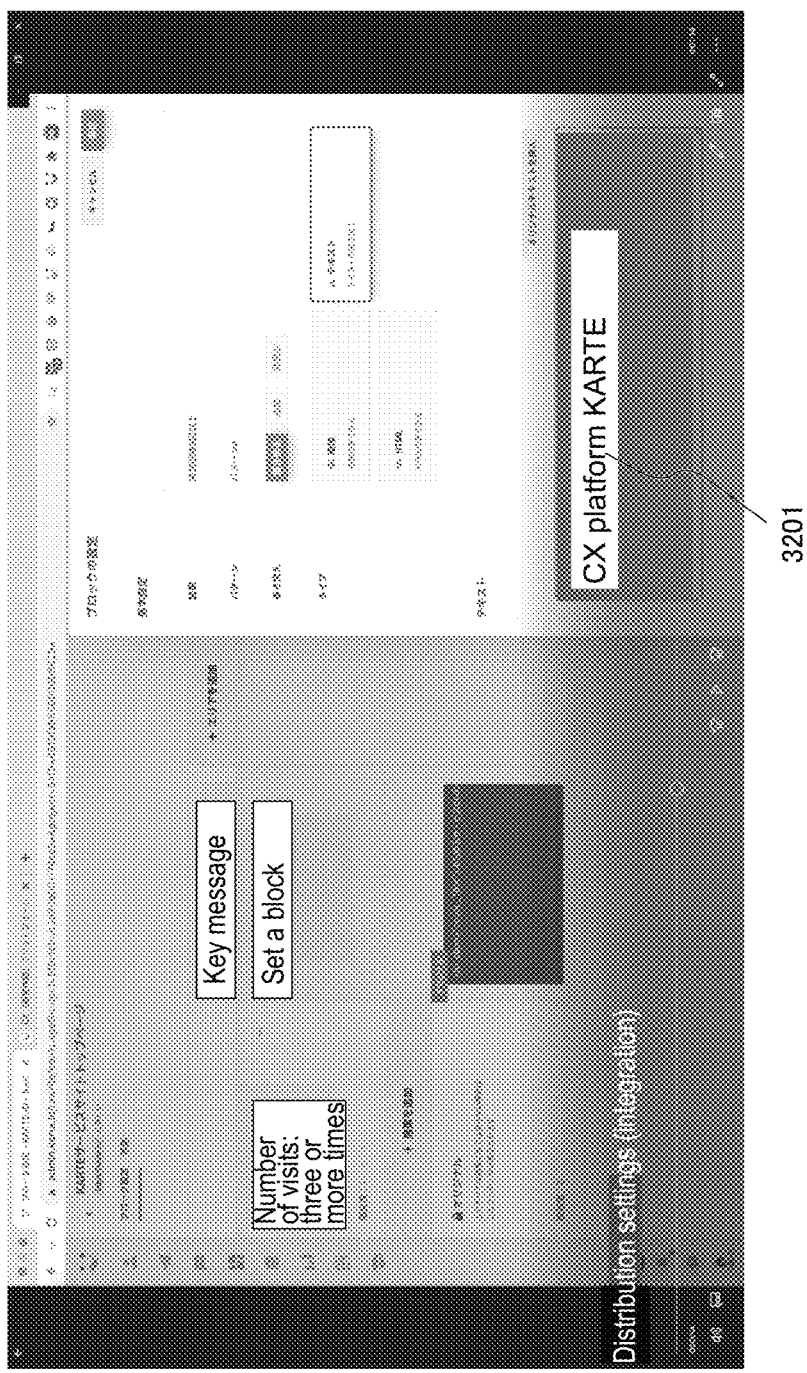
FIG. 32 is a diagram showing an output example in the embodiment.

Next, the administrator changes the field 3101 to "CX platform KARTE" that the administrator wants a user who visited this webpage three or more times to see (see 3201 of FIG. 32).

Next, it is assumed that, in order to conduct A/B testing on a user who accessed the webpage in FIG. 27 via the Google search engine, the administrator defines two pieces of partial content for the block identified with the area name "key visual" and defines block information such that it is used with the same probability for the two pieces of partial content.

Figure 33:
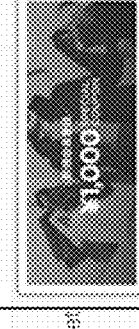
FIG. 33 is a diagram showing an output example in the embodiment.

It is assumed that the screen shown in FIG. 33 is displayed on the management terminal 8 with the above-described block information defining processing by the administrator. In FIG. 33, the condition (the segment condition or/and the probability condition), the area name, and one or at least two pieces of partial content corresponding to the area defined by the administrator are displayed.

It is assumed that, in this state, the administrator inputs a block information setting instruction to the management terminal 8. Then, the management processing unit 83 of the management terminal 8 configures a setting instruction containing the information shown in FIG. 33 and a page identifier. Next, the management transmitting unit 84 transmits the setting instruction to the webpage processing apparatus 7. FIG. 34 shows an example of the setting instruction.

Next, the setting instruction receiving unit 723 of the webpage processing apparatus 7 receives the setting instruction. Then, the block accumulating unit 732 acquires a page identifier "karte.io" contained in the setting instruction in FIG. 34. Next, the block accumulating unit 732 acquires two or more pieces of block information contained in the setting instruction in FIG. 34. The block accumulating unit 732 generates a unique partial content identifier, for each piece of partial content. Next, the block accumulating unit 732 configures block information that is to be accumulated. Next, the block accumulating unit 732 accumulates the configured block information in the block information management table (FIG. 26) in association with a page identifier. In this case, the accumulated record is the records with "block identifier=1" and "block identifier=2" in FIG. 26.

With the above-described processing, the block information corresponding to the webpage is accumulated in the webpage processing apparatus 7 through the operation of the management terminal 8 of the administrator.

Specific Example 2

In this situation, it is assumed that a user X searches for a webpage identified with the page identifier "karte.io" using the Google (registered trademark) search engine, and tries to access the webpage. That is to say, the user accepting unit 62 of the user terminal 6 accepts an output instruction containing the URL "https://karte.io". The user processing unit 63 reads a user identifier "528" from the user storage unit 61, and configures an output instruction having the user identifier "528" and the page identifier "karte.io". Next, the user transmitting unit 64 transmits the output instruction to the webpage processing apparatus 7. It is assumed that the output instruction contains operation information " . . . "google.com" . . . " indicating that a search engine was used.

Next, it is assumed that the output instruction receiving unit 721 of the webpage processing apparatus 7 receives the output instruction having the user identifier "528" and the page identifier "karte.io".

Next, the block processing unit 731 executes webpage configuring processing as follows. That is to say, the block processing unit 731 acquires the page identifier "karte.io" from the received output instruction. Next, the block processing unit 731 acquires a webpage (an HTML file for configuring information shown in FIG. 26) identified with the page identifier.

Next, the block processing unit 731 acquires the user identifier "528".

Next, the block processing unit 731 acquires the record with "ID=1" in the block information management table in FIG. 26. Next, it is assumed that the block processing unit 731 tries to acquire the number of visits that is paired with the user identifier "528", from the user information management table in FIG. 9. In this case, it is assumed that the block processing unit 731 cannot acquire the number of visits that is paired with the user identifier "528". That is to say, this user is visiting this webpage for the first time. Then, the block processing unit 731 determines that this user does not satisfy the segment condition "number of visits >=3". Then, the partial content of the original webpage is used as the partial content corresponding to the key message.

Next, the block processing unit 731 acquires the record with "ID=2" in the block information management table in FIG. 26. Next, the block processing unit 731 determines that the user satisfies the segment condition of the record with "ID=2", using the received output instruction. Next, the partial content selecting part 5314 selects one piece of partial content at random, using the probability condition of the record with "ID=2". In this case, it is assumed that the partial content selecting part 5314 selects partial content with a partial content identifier "C22". Then, the output page processing part 7315 arranges the partial content with the partial content identifier "C22", at a location specified with the location specifying information contained in the record with "ID=2".

Next, the block processing unit 731 acquires the record with "ID=3" in the block information management table in FIG. 26. Then, since the segment condition is "not given", the partial content selecting part 5314 selects one piece of partial content at random out of the three pieces of partial content contained in the record with "ID=3". In this case, it is assumed that the partial content selecting part 5314 selects partial content with a partial content identifier "C31". Then, the output page processing part 7315 arranges the partial content with the partial content identifier "C31", at a location specified with the location specifying information contained in the record with "ID=3". With the above-described processing, a webpage that is to be output has been configured.

Next, the transmitting unit 74 transmits the configured webpage to the user terminal 6 of the user X.

Next, the user terminal 6 of the user X receives and outputs the webpage. FIG. 27 shows an output example thereof.

Next, it is assumed that a user "A-o Yamada" inputs the URL of a webpage identified with the page identifier "karte.io" to the user terminal 6, and accesses the page. Then, the user terminal 6 transmits the output instruction having the user identifier "1" of A-o Yamada and the page identifier "karte.io", to the webpage processing apparatus 7.

Next, it is assumed that the output instruction receiving unit 721 of the webpage processing apparatus 7 receives the output instruction having the user identifier "1" and the page identifier "karte.io".

Next, the block processing unit 731 executes webpage configuring processing as follows. That is to say, the block processing unit 731 acquires a webpage (an HTML file for configuring information shown in FIG. 27), as with Specific Example 1.

Next, the block processing unit 731 acquires the user identifier "1".

Next, the block processing unit 731 acquires the record with "ID=1" in the block information management table in FIG. 26. Next, the block processing unit 731 acquires the number of visits "21" that is paired with the user identifier "1", from the user information management table in FIG. 9. Then, the block processing unit 731 determines that this user satisfies the segment condition "number of visits >=3. Then, the partial content "CX platform KARTE" in FIG. 26 is acquired as the partial content corresponding to the key message. Next, the output page processing part 7315 arranges the partial content at a location specified with the location specifying information contained in the record with "ID=1".

Next, the block processing unit 731 acquires the record with "ID=2" in the block information management table in FIG. 26. Next, the block processing unit 731 determines that the user does not satisfy the segment condition of the record with "ID=2", using the received output instruction. Then, the original partial content is used as the partial content corresponding to the key visual.

Next, the block processing unit 731 acquires the record with "ID=3" in the block information management table in FIG. 26. Then, since the segment condition is "not given", the partial content selecting part 5314 selects one piece of partial content at random out of the three pieces of partial content contained in the record with "ID=3". In this case, it is assumed that the partial content selecting part 5314 selects partial content with a partial content identifier "C33". Then, the output page processing part 7315 arranges the partial content with the partial content identifier "C33", at a location specified with the location specifying information contained in the record with "ID=3". With the above-described processing, a webpage that is to be output has been configured.

Next, the transmitting unit 74 transmits the configured webpage to the user terminal 6 of A-o Yamada.

Figure 35:
FIG. 35 is a diagram showing an output example in the embodiment.

Next, the user terminal 6 of A-o Yamada receives and outputs the webpage. FIG. 35 shows an output example thereof. In FIG. 35, the partial content in the area "key message" has been changed from the original (see FIG. 27).

Specific Example 3

In Specific Example 3, an example of the user operation analysis processing will be described. As with the processing described in Embodiment 1, the operation information receiving unit 222 of the webpage processing apparatus 7 receives operation information from the user terminals 6 of a large number of users through user's operation on the webpage. Then, it is assumed that the operation information accumulating unit 233 accumulates the dynamic attribute values of the user information management table in FIG. 9.

Furthermore, it is assumed that the processing unit 73 of the webpage processing apparatus 7 determines that it is time to execute statistical processing, and executes statistical processing on each piece of partial content as follows.

That is to say, the block operation information acquiring part 7312 acquires the total time spent on each piece of partial content, using the dynamic attribute values of the user information management table in FIG. 9 or/and the information in the operation information management table in FIG. 11, and accumulates the total time in the attribute value "time spent" in FIG. 26 in association with each piece of partial content. The block operation information acquiring part 7312 calculates the number of pieces of operation information having the partial content identifier or the block identifier of each partial block and "rightButtonON" indicating that designation was made, from the operation information management table in FIG. 11, and accumulates the number in the attribute value "number of times of designation" in FIG. 26 in association with each piece of partial content.

With the above-described processing, "block operation information" in FIG. 26 is accumulated.

Then, it is assumed that the administrator inputs a block information output instruction having the page identifier "karte.io" to the management terminal 8. Next, the management accepting unit 62 of the management terminal 8 accepts the block information output instruction. Next, the management processing unit 83 configures a block information output instruction that is to be transmitted. The management transmitting unit 84 transmits the block information output instruction to the webpage processing apparatus 7.

Next, the receiving unit 72 of the webpage processing apparatus 7 receives the block information output instruction from the management terminal 8. Next, the block processing unit 731 acquires block information (three records in FIG. 26) that is paired with the page identifier "karte.io" contained in the block information output instruction, from the block information storage unit 711. Then, the transmitting unit 74 transmits the acquired three pieces of block information to the management terminal 8.

Figure 36:
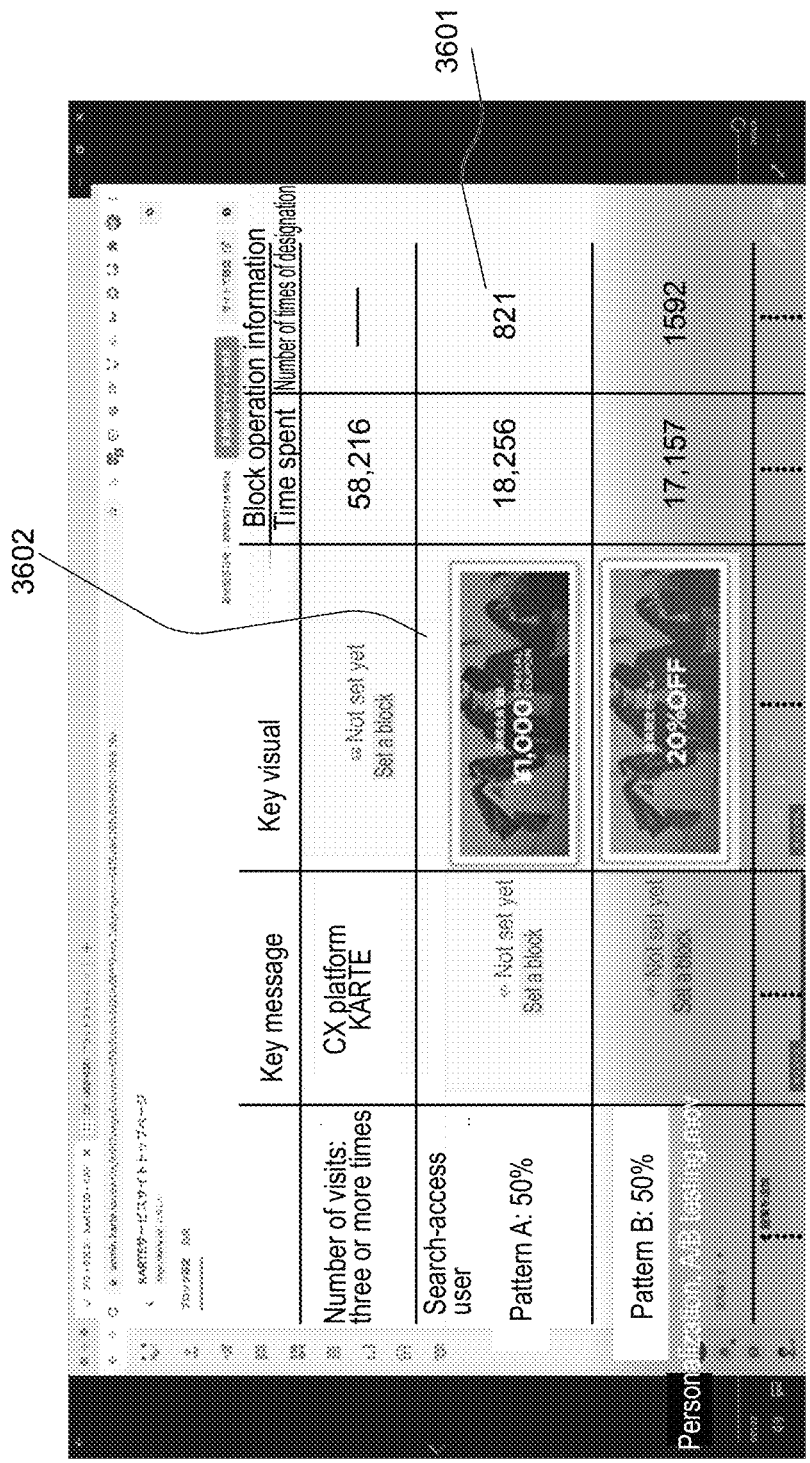
FIG. 36 is a diagram showing an output example in the embodiment.

Next, the management terminal 8 receives and outputs the three pieces of block information. FIG. 36 shows an output example thereof. In FIG. 36, the administrator can edit the block information while viewing block operation information ("time spent" and "number of times of designation" in this example), which is an analysis result of user's operation on partial content. That is to say, it is assumed that the administrator checks block operation information of 3601 in FIG. 36, thinks that the number of times of designation is small for a long time spent, thinks that the partial content 3602 is not good, and determines to issue "1000 yen discount" instead of "1000 yen coupon". That is to say, it is assumed that the administrator changes the partial content 3602 to the image of "1000 yen discount" on the screen shown in FIG. 36, and inputs an editing instruction containing the image to the management terminal 8.

Then, the management accepting unit 82 of the management terminal 8 accepts the editing instruction. The management processing unit 83 configures an editing instruction that is to be transmitted. It is assumed that the editing instruction has the page identifier "karte.io", the partial content identifier "C21", and the partial content "1000 yen discount".

Next, the editing instruction receiving unit 722 of the webpage processing apparatus 7 receives the editing instruction. Next, the partial content editing part 7313 acquires the page identifier "karte.io" contained in the editing instruction. Next, the partial content editing part 7313 acquires the partial content contained in the editing instruction. Next, the partial content editing part 7313 acquires the partial content identifier "C21" contained in the editing instruction. Next, the partial content editing part 7313 overwrites the attribute value "partial content" of the record corresponding to the page identifier "karte.io" and the partial content identifier "C21" with the acquired partial content.

With the above-described processing, the user operation analysis processing on a block-by-block basis has been performed. The partial content has been modified after the check of a result of the user operation analysis processing.
Specific Example 4

Figure 37:
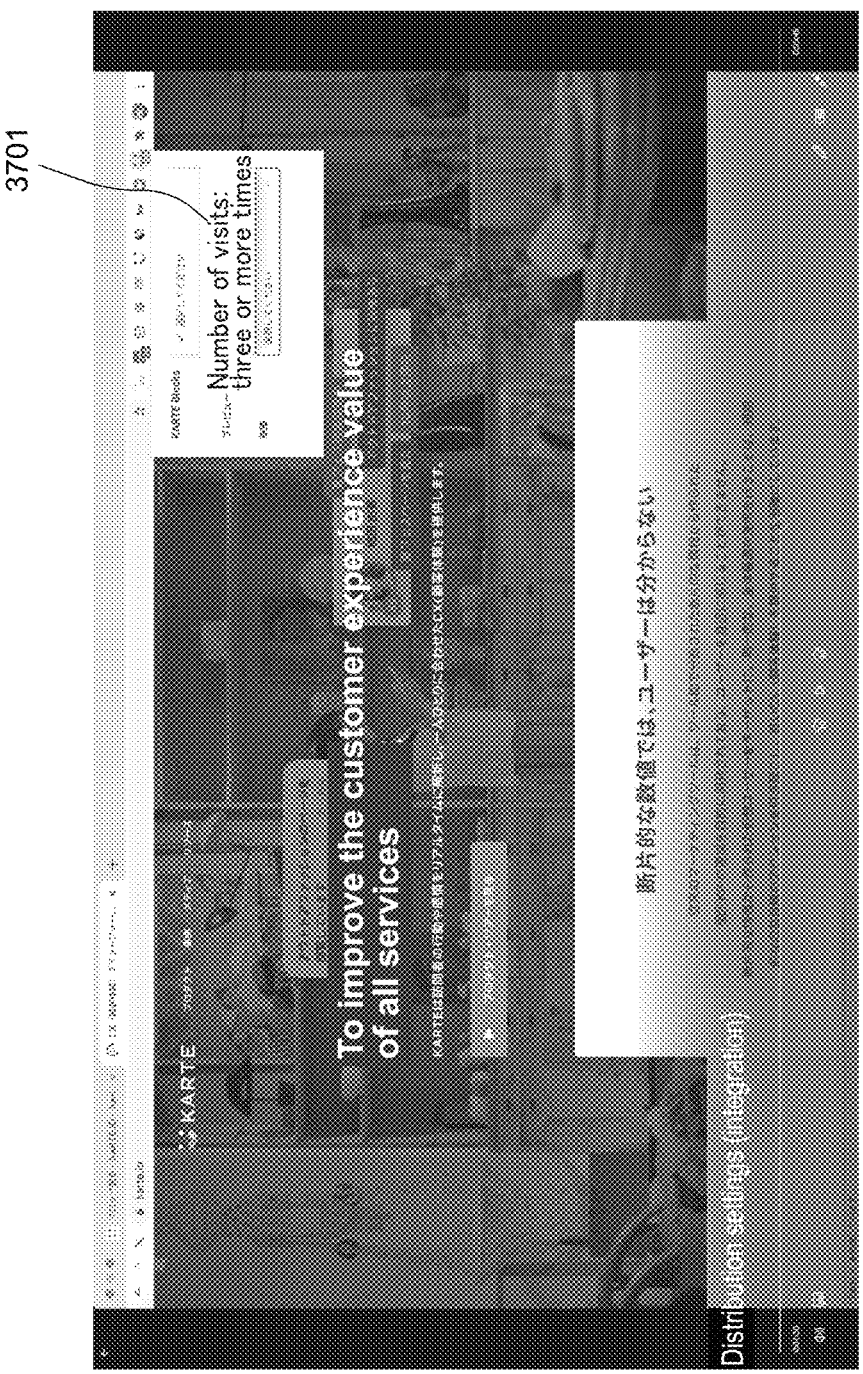
FIG. 37 is a diagram showing an output example in the embodiment.

It is assumed that the administrator outputs the original webpage in FIG. 27 to the management terminal 8. Then, it is assumed that the segment condition "number of visits: three or more times" is designated as indicated by 3701 in FIG. 37. Then, the management accepting unit 82 of the management terminal 8 accepts an output instruction. Next, the management processing unit 83 acquires a page identifier "karte.io" from the management storage unit 81. The management processing unit 83 acquires the designated segment condition "number of visits: three or more times". Next, the management processing unit 83 configures an output instruction having the page identifier "karte.io" and the segment condition "number of visits: three or more times". Next, the management transmitting unit 84 transmits the configured setting instruction to the webpage processing apparatus 7.

Next, the output instruction receiving unit 721 of the webpage processing apparatus 7 receives the output instruction. Next, the block processing unit 731 executes webpage configuring processing corresponding to the output instruction. That is to say, the block processing unit 731 acquires an original webpage identified with the page identifier "karte.io" contained in the output instruction. Then, the block processing unit 731 acquires the segment condition "number of visits: three or more times" contained in the output instruction, and configures a webpage in which the partial content of "key message" is changed to "CX platform KARTE" so as to satisfy the segment condition, from the original webpage, while referring to the block information management table in FIG. 26. Next, the transmitting unit 74 transmits the configured webpage to the management terminal 8 that transmitted the output instruction.

Next, the management receiving unit 85 of the management terminal 8 receives the webpage. The management processing unit 83 configures a webpage that is to be output, from the received webpage. The management output unit 86 outputs the webpage. FIG. 35 shows an output example thereof.

As described above, according to this embodiment, it is possible to manage a block, which is partial content in a webpage, and execute processing on the block.

Furthermore, according to this embodiment, it is possible to acquire information for analyzing a user's operation on a block. The information for analyzing a user's operation is the time spent, the number of times of designation, or the like, for example.

Furthermore, according to this embodiment, it is possible to output a webpage in which one piece of partial content is selected out of the two or more pieces of partial content corresponding to the block.

Furthermore, according to this embodiment, it is possible to select one piece of partial content based on an attribute value of a user who browses the webpage.

Furthermore, according to this embodiment, it is possible to select one piece of partial content at random out of the two or more pieces of partial content corresponding to the block.

Furthermore, according to this embodiment, it is possible to conduct A/B testing on a block-by-block basis.

Furthermore, according to this embodiment, it is possible to edit a block.

Furthermore, according to this embodiment, it is possible to set block information.

Figure 38:
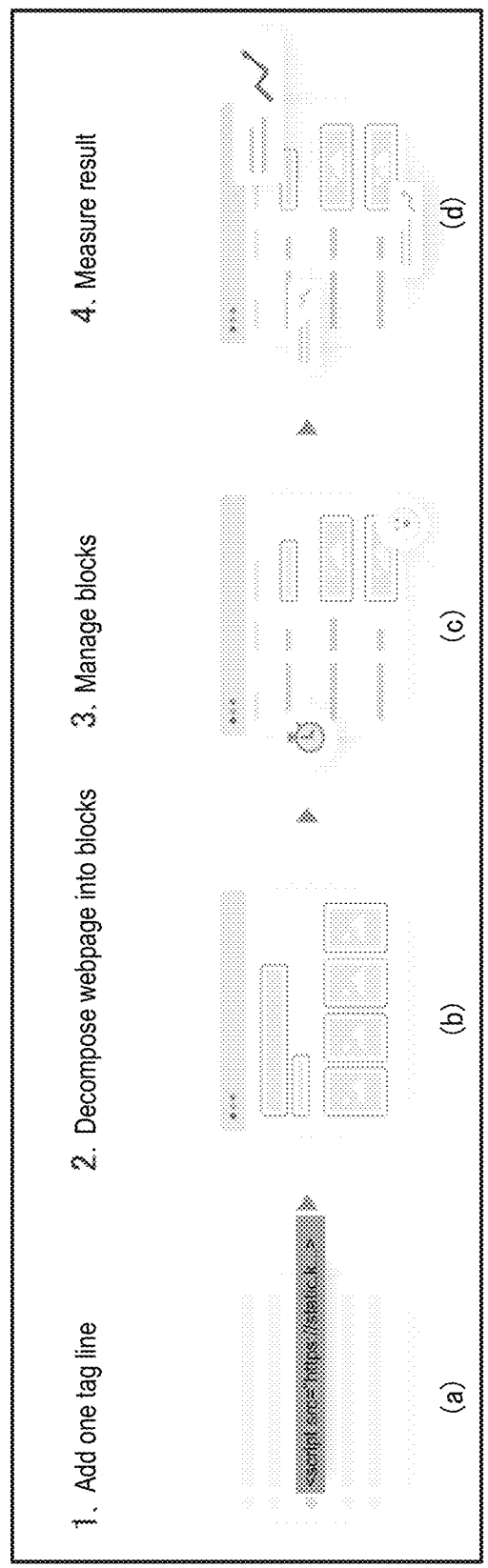
FIG. 38 is a diagram illustrating a concept of an operation example of a webpage processing apparatus 5 in the embodiment.

In this embodiment, in particular, it is possible to realize the concept BMS (Block Management System) by using the webpage processing apparatus 7. That is to say, as shown in FIG. 38, according to the information system C including the webpage processing apparatus 7, (a) merely adding one tag line to a webpage makes it possible (b) to decompose a webpage into blocks and (c) to manage the blocks, as a result of which it is possible (d) to measure the result on a block-by-block basis.

Furthermore, the software that realizes the webpage processing apparatus 7 in this embodiment is the following sort of program. Specifically, for example, this program is a program for causing a computer capable of accessing a block information storage unit in which one or more pieces of block information each having a block identifier for identifying a block, which is partial content in a webpage, and location identifying information for specifying a location of the block in the webpage are stored, to function as: a block processing unit that executes block processing, which is processing regarding a block specified with block information, using location identifying information contained in any one of the one or more pieces of block information; and a result output unit that outputs a block processing result, which is a result of the block processing.

Figure 39:
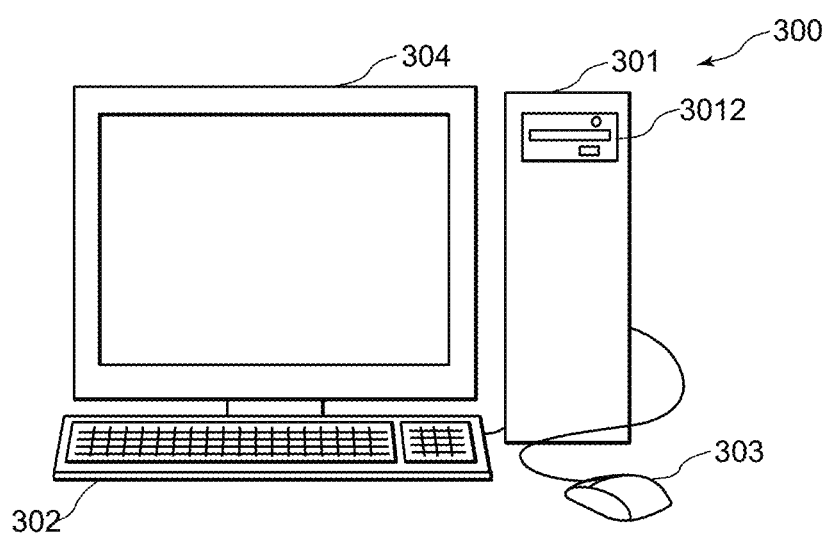
FIG. 39 is a schematic view of a computer system in the embodiments.
Figure 40:
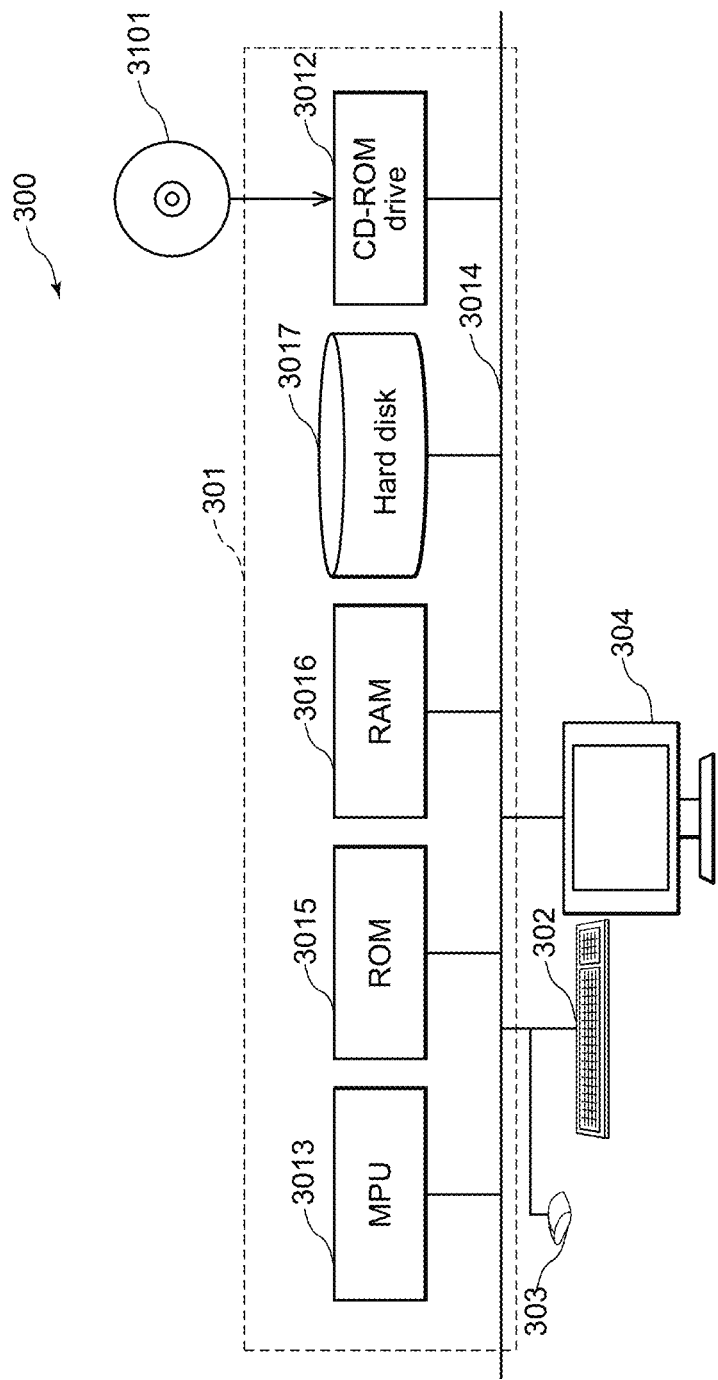
FIG. 40 is a block diagram of the computer system in the embodiments.

FIG. 39 shows the external appearance of a computer that executes the programs described in this specification to realize the webpage processing apparatus 7 and the like in the foregoing various embodiments. The foregoing embodiments may be realized using computer hardware and a computer program executed thereon. FIG. 39 is a schematic view of a computer system 300. FIG. 40 is a block diagram of the system 300.

In FIG. 39, the computer system 300 includes a computer 301 including a CD-ROM drive, a keyboard 302, a mouse 303, and a monitor 304.

In FIG. 40, the computer 301 includes, in addition to the CD-ROM drive 3012, an MPU 3013, a bus 3014 connected to the CD-ROM drive 3012 and the like, a ROM 3015 in which a program such as a boot up program is stored, a RAM 3016 that is connected to the MPU 3013 and is a memory in which a command of an application program is temporarily stored and a temporary storage area is provided, and a hard disk 3017 in which an application program, a system program, and data are stored. Although not shown, the computer 301 may further include a network card that provides connection to a LAN.

The program for causing the computer system 300 to execute the functions of the webpage processing apparatus 7 and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the webpage processing apparatus 7 and the like in the foregoing embodiments. The program may only include a command portion to call an appropriate function (module) in a controlled mode and obtain desired results. The manner in which the computer system 300 operates is well known, and thus a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes the program may be a single computer, or may be multiple computers. That is to say, centralized processing may be performed, or distributed processing may be performed.

Furthermore, in the foregoing embodiments, it will be appreciated that at least two communication parts in one apparatus may be physically realized by one medium.

In the foregoing embodiments, each process may be realized as centralized processing using a single apparatus, or may be realized as distributed processing using multiple apparatuses.

The present invention is not limited to the embodiments set forth herein. Various modifications are possible within the scope of the present invention.

INDUSTRIAL APPLICABILITY

As described above, the webpage processing apparatus according to the present invention has an effect that it is possible to manage a block, which is partial content in a webpage, and execute processing on the block, and thus this apparatus is useful as a webpage processing apparatus and the like.

The invention claimed is:

1. A webpage processing apparatus comprising:
a block information storage unit in which one or more pieces of block information each having a block identifier for identifying a block in a webpage, and location identifying information for specifying a location of the block in the webpage are stored;
a block processing unit that executes block processing, which is processing regarding a block specified with block information, using location identifying information contained in any one of the one or more pieces of block information; and
a result output unit that outputs a block processing result, which is a result of the block processing, wherein:
the webpage processing apparatus receives from an administrator terminal a setting instruction including a segment condition and a predetermined probability condition which indicates a selection probability, as a content to be displayed, for each of a plurality of partial contents, and stores the setting instruction into a block information management table stored in the block information storage unit, the segment condition being associated with the probability condition and the block identifier,
the webpage processing apparatus further comprises an operation information receiving unit that receives operation information, which is information on a user's operation currently being performed on the webpage from a user terminal of a user who is a visitor to the webpage, the user terminal being different from the administrator terminal,
the block processing includes an editing process for editing the block during the user visiting the webpage, based on the operation information and the block information management table, and
the editing process includes selecting a partial content according to the selection probability from the plurality of partial contents when the operation information satisfies the segment condition corresponding to the block.

2. The webpage processing apparatus according to claim 1,
wherein the block information has block operation information on a user's operation on the block,
the operation information comprises information containing operation specifying information for specifying operation content and target specifying information for specifying an operation target, from a user terminal of a user who is a visitor to the webpage, the block processing unit includes:
- a block specifying part that specifies a block corresponding to the target specifying information contained in the operation information; and
- a block operation information acquiring part that acquires a block processing result, which is block operation information on an operation on the block corresponding to the target specifying information that is paired with the operation specifying information, using the operation specifying information contained in the operation information, and
- the result output unit accumulates the block operation information in the block information storage unit in a pair with a block identifier for identifying the block specified by the block specifying part.

3. The webpage processing apparatus according to claim 1,
wherein the block information has partial content,
the webpage processing apparatus further comprises an editing instruction receiving unit that receives an editing instruction on the partial content,
the block processing unit includes a partial content editing part that changes the partial content corresponding to the editing instruction, according to the editing instruction, and
the result output unit executes partial content output processing for outputting the webpage containing the partial content changed and acquired by the partial content editing part.

4. The webpage processing apparatus according to claim 1, further comprising:
- a setting instruction receiving unit that receives a setting instruction, which is an instruction to add block information; and
- a block accumulating unit that configures block information according to the setting instruction and accumulates the block information in the block information storage unit.

5. The webpage processing apparatus according to claim 1,
wherein the operation information includes a time spent on the block or a number of times of designation on the block.

6. A webpage processing apparatus comprising:
a block information storage unit in which one or more pieces of block information each having a block identifier for identifying a block, which is partial content in a webpage, and location identifying information for specifying a location of the block in the webpage are stored;
a block processing unit that executes block processing, which is processing regarding a block specified with block information, using location identifying information contained in any one of the one or more pieces of block information; and
a result output unit that outputs a block processing result, which is a result of the block processing, wherein:
the webpage processing apparatus receives from an administrator terminal a setting instruction including a segment condition and a predetermined probability condition which indicates a selection probability, as a content to be displayed, for each of a plurality of partial contents, and stores the setting instruction into a block information management table stored in the block information storage unit, the segment condition being associated with the probability condition and the block identifier,
the block information includes two or more different pieces of partial content,
the webpage processing apparatus further comprises an output instruction receiving unit that receives an output instruction on a webpage,
the block processing unit includes:
- a partial content selecting part that selects, in a block corresponding to block information having two or more pieces of partial content out of block information corresponding to the webpage corresponding to the output instruction, one piece of partial content out of the two or more pieces of partial content contained in the block information; and
- an output page processing part that executes processing for outputting the webpage containing the partial content selected by the partial content selecting part, thereby acquiring a block processing result, the result output unit outputs the block processing result, the webpage processing apparatus further comprises:
- a user information storage unit in which two or more pieces of user information, each of which comprises one or more dynamic attribute values that are obtained by a user's operation on the webpage and dynamically change with time, are stored;
- an operation information receiving unit that receives operation information, which is information on a user's operation on the webpage and is information containing operation specifying information for specifying operation content and target specifying information for specifying an operation target, from a user terminal of a user who is a visitor to the webpage, the user terminal being different from the administrator terminal; and
- an attribute value acquiring unit that acquires one or more dynamic attribute values of the user, using the operation information received by the operation information receiving unit, and accumulates the one or more dynamic attribute values in the user information storage unit, each of the two or more pieces of partial content contained in the block information is associated with a segment condition, which is a condition regarding a dynamic attribute value,
the partial content selecting part acquires one or more dynamic attribute values contained in the user information of the user of the user terminal that transmitted the output instruction, from the user information storage unit,
the block processing includes an editing process for editing the block during the user visiting the webpage, based on the operation information and the block information management table, and
the editing process includes selecting a partial content according to the selection probability from the plurality of partial contents when the one or more dynamic attribute values satisfy the segment condition corresponding to the block.

7. The webpage processing apparatus according to claim 6, wherein the partial content selecting part selects one piece of partial content at random out of the two or more pieces of partial content contained in the block information.

8. The webpage processing apparatus according to claim 7,
wherein the block processing unit includes:
a block specifying part that specifies partial content corresponding to the target specifying information contained in the operation information; and
a block operation information acquiring part that acquires a block processing result, which is block operation information on an operation on partial content corresponding to the target specifying information that is paired with the operation specifying information, using the operation specifying information contained in the operation information, and
the result output unit accumulates the block operation information in the block information storage unit in a pair with the partial content specified by the block specifying part.

9. The webpage processing apparatus according to claim 6, wherein the one or more dynamic attribute values includes:
a time spent on the webpage by a currently visiting user,
a number of webpages viewed during a current visit,
historical information with respect to one or more past purchases by a user from the webpage,
an average time spent on the webpage,
an average number of page views, or
a number of visits on the webpage.

10. An information processing method realized using a block information storage unit in which one or more pieces of block information each having a block identifier for identifying a block, which is partial content in a webpage, and location identifying information for specifying a location of the block in the webpage are stored, the method comprising:
a block processing step of executing block processing, which is processing regarding a block specified with block information, using location identifying information contained in any one of the one or more pieces of block information; and
a result output step of outputting a block processing result, which is a result of the block processing,
the block information includes two or more different pieces of partial content,
the method further comprises:
a setting instruction receiving step of receiving, from an administrator terminal, a setting instruction including a segment condition and a predetermined probability condition which indicates a selection probability, as a content to be displayed, for each of a plurality of partial contents, and storing the setting instruction into a block information management table stored in the block information storage unit, the segment condition being associated with the probability condition and the block identifier,
an output instruction receiving step of receiving an output instruction on a webpage,
the block processing step includes:
selecting, in a block corresponding to block information having two or more pieces of partial content out of block information corresponding to the webpage corresponding to the output instruction, one piece of partial content out of the two or more pieces of partial content contained in the block information; and
executing processing for outputting the webpage containing the partial content selected, thereby acquiring a block processing result, the webpage processing method further comprises:
storing, in a user information storage unit, two or more pieces of user information, each of which comprises one or more dynamic attribute values that are obtained by a user's operation on the webpage and dynamically change with time;
receiving operation information, which is information on a user's operation on the webpage and is information containing operation specifying information for specifying operation content and target specifying information for specifying an operation target, from a user terminal of a user who is a visitor to the webpage, the user terminal being different from the administrator terminal; and
acquiring one or more dynamic attribute values of the user, using the operation information received, and accumulates the one or more dynamic attribute values in the user information storage unit,
each of the two or more pieces of partial content contained in the block information is associated with a segment condition, which is a condition regarding a dynamic attribute value,
the selecting the partial content includes acquiring one or more dynamic attribute values contained in the user information of the user of the user terminal that transmitted the output instruction, from the user information storage unit,
the block processing includes an editing process for editing the block during the user visiting the webpage, based on the operation information and the block information management table,
the editing process includes selecting a partial content according to the selection probability from the plurality of partial contents when the one or more dynamic attribute values satisfy the segment condition corresponding to the block.

11. The webpage processing method according to claim 10, wherein the one or more dynamic attribute values includes:
a time spent on the webpage by a currently visiting user,
a number of webpages viewed during a current visit,
historical information with respect to one or more past purchases by a user from the webpage,
an average time spent on the webpage,
an average number of page views, or
a number of visits on the webpage.

12. A webpage processing method realized using a block information storage unit in which one or more pieces of block information each having a block identifier for identifying a block, which is partial content in a webpage, and location identifying information for specifying a location of the block in the webpage are stored, the method comprising:
executing block processing, which is processing regarding a block specified with block information, using location identifying information contained in any one of the one or more pieces of block information; and
outputting a block processing result, which is a result of the block processing, wherein:
the webpage processing method further comprises
receiving from an administrator terminal a setting instruction including a segment condition and a predetermined probability condition which indicates a selection probability, as a content to be displayed, for each of a plurality of partial contents, and stores the setting instruction into a block information management table stored in the block information storage unit, the segment condition being associated with the probability condition and the block identifier, receiving operation information, which is information on a user's operation currently being performed on the webpage and is information containing operation specifying information for specifying operation content and target specifying information for specifying an operation target, from a user terminal of a user who is a visitor to the webpage, the user terminal being different from the administrator terminal, the executing block processing includes:
- specifying a block corresponding to the target specifying information contained in the operation information; and
- acquiring a block processing result, which is block operation information on an operation on the block corresponding to the target specifying information that is paired with the operation specifying information, using the operation specifying information contained in the operation information, and the outputting includes accumulating the block operation information in the block information storage unit in a pair with a block identifier for identifying the block specified, the block processing includes an editing process for editing the partial content corresponding to the block during the user visiting the webpage, based on the operation information and the block information management table, and the editing process includes selecting a partial content according to the selection probability from the plurality of partial contents when the operation information satisfies the segment condition corresponding to the block.

13. The webpage processing method according to claim 12, wherein the user's operation on the block includes a time spent on the block or a number of times of designation on the block.

* * * * *